(12) United States Patent
Sato

(10) Patent No.: US 7,738,181 B2
(45) Date of Patent: Jun. 15, 2010

(54) ZOOM LENS AND OPTICAL APPARATUS HAVING ZOOM LENS

(75) Inventor: Susumu Sato, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/031,268

(22) Filed: Feb. 14, 2008

(65) Prior Publication Data
US 2008/0212201 A1    Sep. 4, 2008

(30) Foreign Application Priority Data
Feb. 27, 2007    (JP) .............................. 2007-047253

(51) Int. Cl.
*G02B 15/14* (2006.01)
(52) U.S. Cl. ........................ 359/676; 359/687; 359/689
(58) Field of Classification Search ......... 359/676–687, 359/689
See application file for complete search history.

(56) References Cited

U.S. PATENT DOCUMENTS

| | | | |
|---|---|---|---|
| 5,638,216 A | 6/1997 | Horiuchi et al. | |
| 5,701,204 A * | 12/1997 | Matsumoto | ................. 359/684 |
| 6,016,228 A | 1/2000 | Uzawa | |
| 6,414,800 B1 | 7/2002 | Hamano | |
| 2002/0024732 A1 | 2/2002 | Hamano et al. | |
| 2002/0063961 A1 | 5/2002 | Hamano et al. | |
| 2003/0210476 A1 | 11/2003 | Harada | |
| 2004/0021791 A1 | 2/2004 | Nishina | |
| 2005/0007480 A1 | 1/2005 | Hamano et al. | |
| 2005/0099700 A1 | 5/2005 | Ohtake | |
| 2005/0168807 A1* | 8/2005 | Endo | .......................... 359/354 |
| 2005/0190458 A1 | 9/2005 | Hamano et al. | |
| 2005/0270661 A1 | 12/2005 | Nanba et al. | |

FOREIGN PATENT DOCUMENTS

| | | |
|---|---|---|
| EP | 1 736 814 A1 | 12/2006 |
| JP | 11-295594 A | 10/1999 |
| JP | 2005-134548 A | 5/2005 |
| JP | 2005-157279 A | 6/2005 |
| JP | 2006-189913 A | 7/2006 |

* cited by examiner

*Primary Examiner*—Darryl J Collins
(74) *Attorney, Agent, or Firm*—Miles & Stockbridge P.C.

(57) ABSTRACT

Providing a compact zoom lens exhibiting optical performance, of which a chromatic aberration in a telephoto state is well corrected. The zoom lens includes a plurality of lens groups, the plurality of lens groups includes at least three lens groups with positive refractive power, each of the three lens groups with positive refractive power has a positive lens, and given conditional expressions are satisfied.

17 Claims, 58 Drawing Sheets

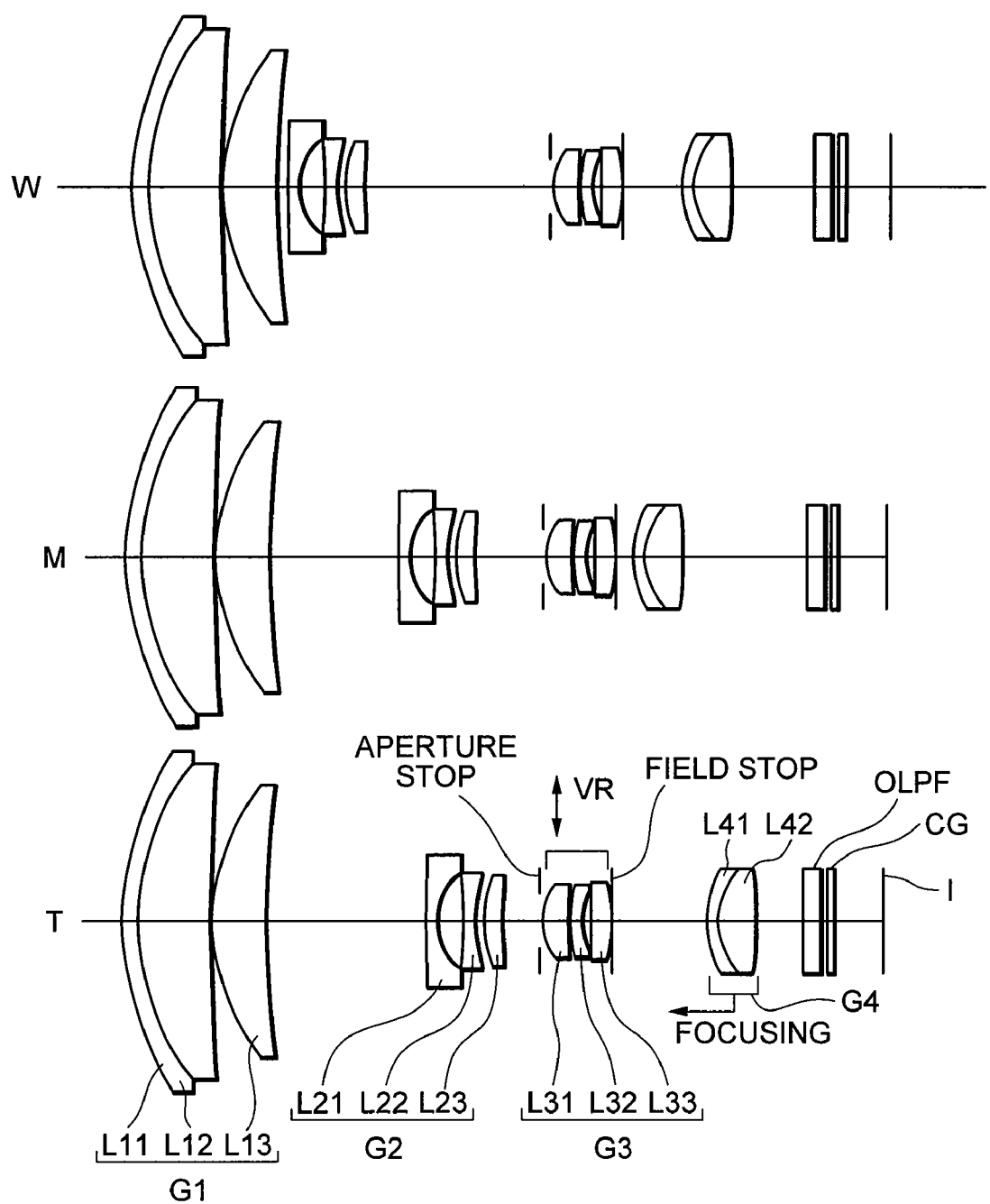

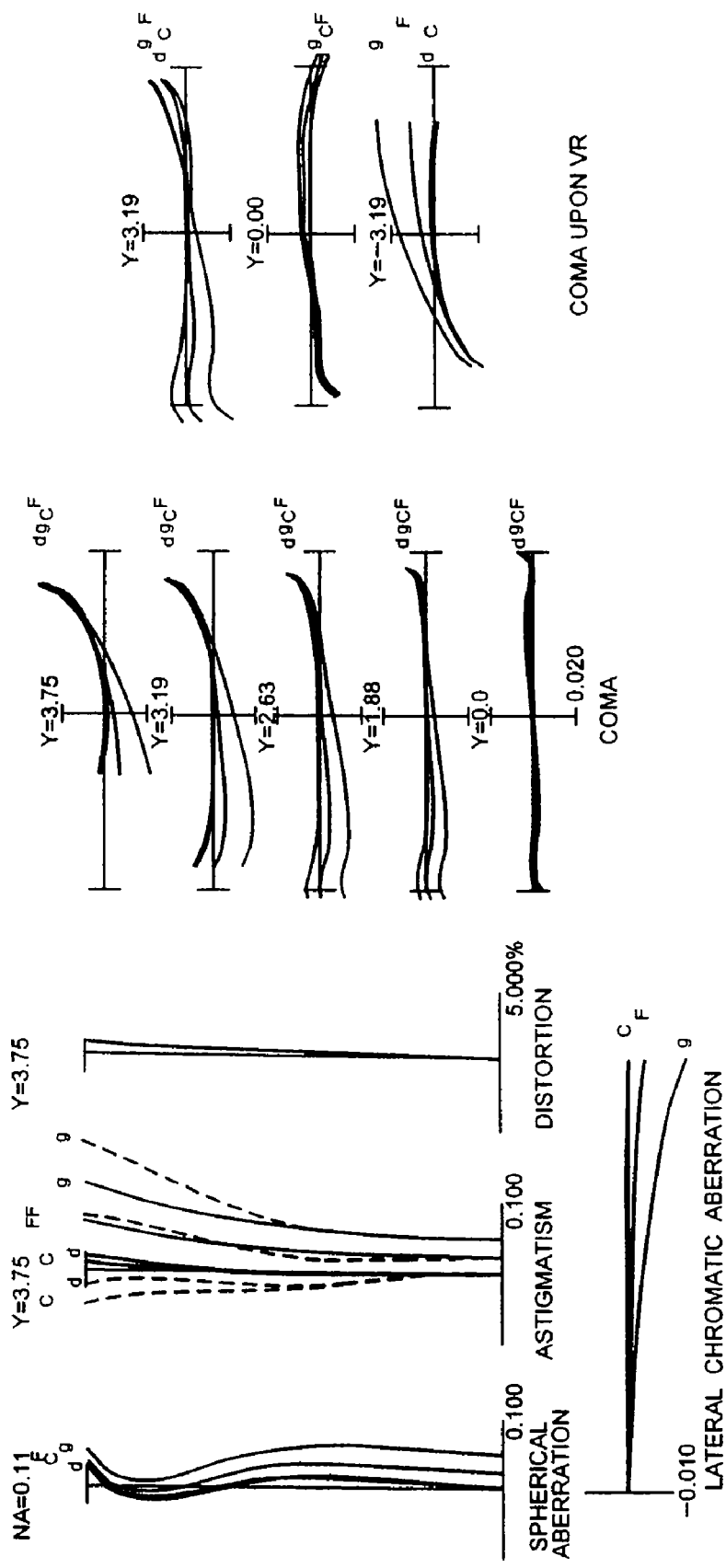

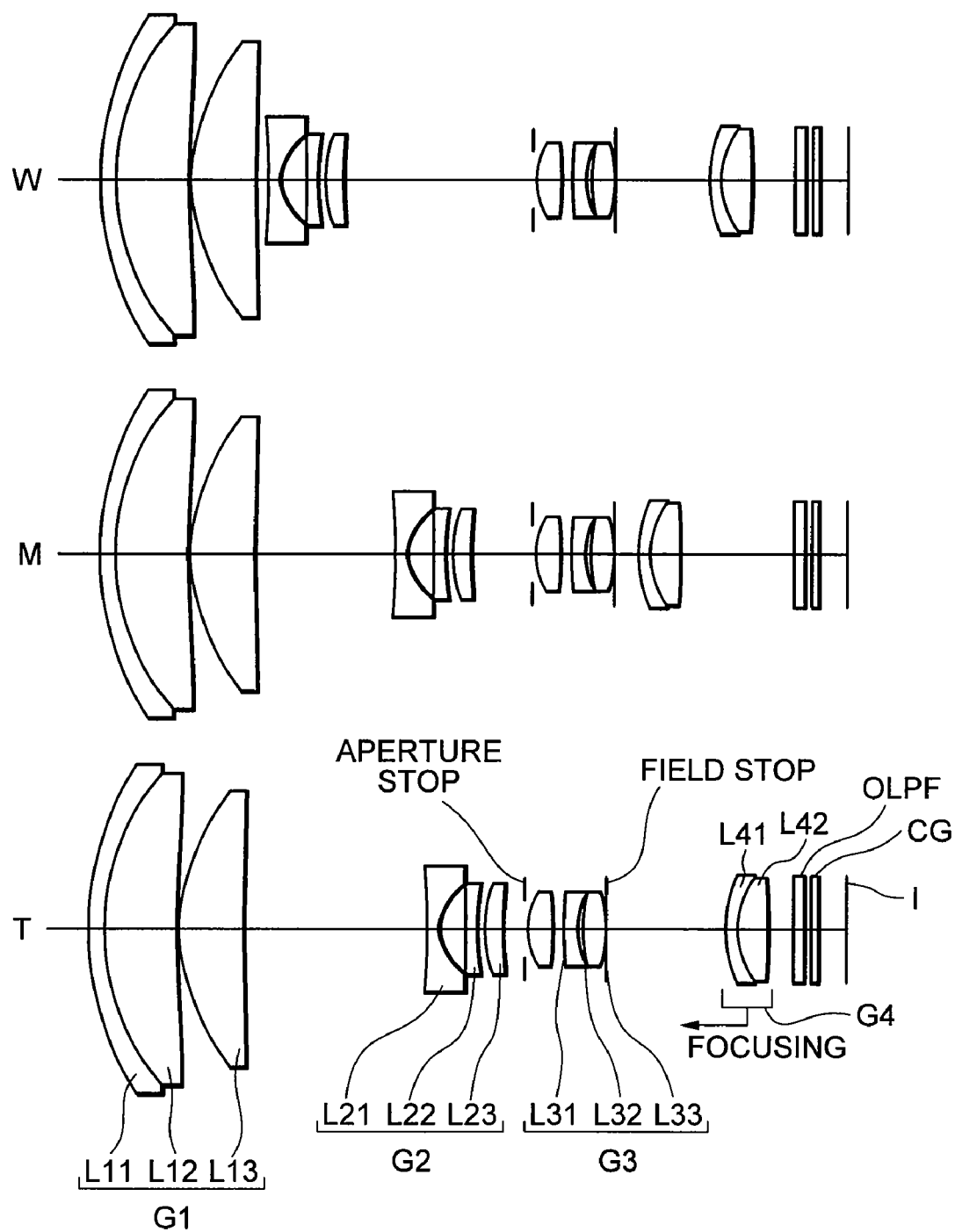

ZOOM LENS AND OPTICAL APPARATUS HAVING ZOOM LENS

The disclosure of the following priority application is herein incorporated by reference:
Japanese Patent Application No. 2007-047253 filed on Feb. 27, 2007.

BACKGROUND OF THE INVENTION

1. Field of the Invention

The present invention relates to a zoom lens and an optical apparatus having the zoom lens.

2. Related Background Art

The zoom lens employed for an electronic still camera has hitherto been proposed (refer to, e.g., Japanese Patent Application Laid-Open No. 2005-157279 and Japanese Patent Application Laid-Open No. 11-295594).

A conventional zoom lens has problems of having a large telephoto ratio in a telephoto end state, a large total length and also a large chromatic aberration in a telescopic photographing area.

SUMMARY OF THE INVENTION

It is an object of the present invention to provide a zoom lens capable of obviating the problems given above. To accomplish the object, according to the present invention, a zoom lens includes: a plurality of lens groups; the plurality of lens groups including at least three lens groups with positive refractive power; each of the at least three lens groups with positive refractive power having a positive lens; wherein the following conditional expression (1) is satisfied:

$$1.440 < Np < 1.525 \qquad (1)$$

where Np is an average refractive index of the positive lenses.

In the first aspect of the present invention, the following conditional expression (2) is preferably satisfied:

$$70.0 < \nu p < 92.0 \qquad (2)$$

where $\nu p$ denotes an average Abbe number of the positive lenses.

In the first aspect of the present invention, it is preferable that the plurality of lens groups includes, in order from an object side, a first lens group with positive refractive power, a second lens group with negative refractive power, a third lens group with positive refractive power and a fourth lens group with positive refractive power, and the at least three lens groups with positive refractive power are the first lens group, the third lens group and the fourth lens group.

In the first aspect of the present invention, it is preferable that the first lens group with positive refractive power includes an aspherical surface.

In the first aspect of the present invention, the following conditional expression (3) is preferably satisfied:

$$3.00 < F1/Fw < 5.50 \qquad (3)$$

where Fw is a focal length in a wide-angle end state, and F1 is a focal length of the first lens group.

In the first aspect of the present invention, the following conditional expression (4) is preferably satisfied:

$$1.900 < Nn < 2.000 \qquad (4)$$

where Nn is an average refractive index of negative lenses of the first lens group, the third lens group and the fourth lens group in the plurality of lens groups.

In the first aspect of the present invention, the following conditional expression (5) is preferably satisfied:

$$27.0 < \nu n < 40.0 \qquad (5)$$

where $\nu n$ is an average Abbe number of negative lenses of the first lens group, the third lens group and the fourth lens group in the plurality of lens groups.

In the first aspect of the present invention, it is preferable that a concave surface of the second lens group has an aspherical surface, and the following conditional expression (6) is preferably satisfied:

$$-1.00 < F2/Fw < -0.50 \qquad (6)$$

where F2 is a focal length of the second lens group, and Fw is a focal length of the zoom lens in the wide-angle end state.

In the first aspect of the present invention, the following conditional expression (7) is preferably satisfied:

$$1.85 < N2 < 1.95 \qquad (7)$$

where N2 is an average refractive index of all of the lenses in the second lens group.

In the first aspect of the present invention, it is preferable that upon zooming from a wide-angle end state to a telephoto end state, a distance between the first lens group and the second lens group increases, while a distance between the second lens group and the third lens group decreases, and the lens group closest to an image plane side in the plurality of lens groups moves along an optical axis.

In the first aspect of the present invention, it is preferable that each of the at least three lens groups with positive refractive power has a positive lens including an aspherical surface.

According to a second aspect of the present invention, there is provided an optical apparatus including the zoom lens according to the first aspect.

According to a third aspect of the present invention, there is provided a method for forming an image of an object by a zoom lens, the method comprising steps of: providing the zoom lens including: a plurality of lens groups, the plurality of lens groups including at least three lens groups with positive refractive power, each of the at least three lens groups with positive refractive power having a positive lens, wherein the following conditional expression (1) is satisfied:

$$1.440 < Np < 1.525 \qquad (1)$$

where Np is an average refractive index of the positive lenses; and forming the image of the object by the zoom lens.

In the third aspect of the present invention, the following conditional expression (2) is preferably satisfied:

$$70.0 < \nu p < 92.0 \qquad (2)$$

where $\nu p$ denotes an average Abbe number of the positive lenses

In the third aspect of the present invention, it is preferable that the plurality of lens groups includes, in order from an object side, a first lens group with positive refractive power, a second lens group with negative refractive power, a third lens group with positive refractive power and a fourth lens group with positive refractive power, and the at least three lens groups with positive refractive power are the first lens group, the third lens group and the fourth lens group.

According to the present invention, it is feasible to provide a compact zoom lens exhibiting optical performance, of which chromatic aberration in a telescopic photographing area is well corrected, and to provide an optical apparatus including the zoom lens.

BRIEF DESCRIPTION OF THE DRAWINGS

FIG. 1 is a diagram showing a lens configuration of a zoom lens according to Example 1, wherein W represents a wide-angle end state, M connotes an intermediate focal length state, and T represents a telephoto end sate, respectively.

FIG. 2A showing the aberrations in the wide-angle end state; FIG. 2B showing the aberrations in the intermediate focal length state; and FIG. 2C showing the aberrations in the telephoto end state.

FIGS. 3A-3C are diagrams showing the various types of aberrations in a close photographing distance focusing state of the zoom lens and coma when making the vibration-reduction correction in Example 1; FIG. 3A showing the respective aberrations when Rw=205 mm; FIG. 3B showing the aberrations when Rm=749 mm; and FIG. 3C showing the aberrations when Rt=538 mm.

FIG. 4 is a diagram showing a lens configuration of the zoom lens according to Example 2, wherein W represents the wide-angle end state, M connotes the intermediate focal length state, and T represents the telephoto end sate, respectively.

FIG. 5A showing the respective aberrations in the wide-angle end state; FIG. 5B showing the aberrations in the intermediate focal length state; and FIG. 5C showing the aberrations in the telephoto end state.

FIG. 6A showing the respective aberrations when Rw=204 mm; FIG. 6B showing the aberrations when Rm=737 mm; and FIG. 6C showing the aberrations when Rt=515 mm.

FIG. 8A showing the respective aberrations in the wide-angle end state; FIG. 8B showing the aberrations in the intermediate focal length state; and FIG. 8C showing the aberrations in the telephoto end state.

FIG. 9A showing the respective aberrations when Rw=202 mm; FIG. 9B showing the aberrations when Rm=738 mm; and FIG. 9C showing the aberrations when Rt=513 mm.

FIG. 11A showing the respective aberrations in the wide-angle end state; FIG. 11B showing the aberrations in the intermediate focal length state; and FIG. 11C shows the aberrations in the telephoto end state.

FIG. 12A showing the respective aberrations when Rw=201 mm; FIG. 12B showing the aberrations when Rm=728 mm; and FIG. 12C showing the aberrations when Rt=487 mm.

FIG. 14A showing the respective aberrations in the wide-angle end state; FIG. 14B showing the aberrations in the intermediate focal length state; and FIG. 14C showing the aberrations in the telephoto end state.

FIG. 15A showing the respective aberrations when Rw=204 mm; FIG. 15B showing the aberrations when Rm=737 mm; and FIG. 15C showing the aberrations when Rt=515 mm.

FIG. 17A showing the respective aberrations in the wide-angle end state; FIG. 17B showing the aberrations in the intermediate focal length state; and FIG. 17C showing the aberrations in the telephoto end state.

FIG. 18A showing the respective aberrations when Rw=205 mm; FIG. 18B showing the aberrations when Rm=748 mm; and FIG. 18C showing the aberrations when Rt=538 mm.

FIG. 20A showing the respective aberrations in the wide-angle end state; FIG. 20B showing the aberrations in the intermediate focal length state; and FIG. 20C showing the aberrations in the telephoto end state.

FIG. 21A showing the respective aberrations when Rw=204 mm; FIG. 21B showing the aberrations when Rm=737 mm; and FIG. 21C showing the aberrations when Rt=516 mm.

FIG. 23A showing the respective aberrations in the wide-angle end state; FIG. 23B showing the aberrations in the intermediate focal length state; and FIG. 23C shows the aberrations in the telephoto end state.

FIG. 24A showing the respective aberrations when Rw=206 mm; FIG. 24B showing the aberrations when Rm=732 mm; and FIG. 24C showing the aberrations when Rt=500 mm.

FIG. 25A showing a front view thereof; and FIG. 25B showing a rear view thereof.

DETAILED DESCRIPTION OF THE MOST PREFERRED EMBODIMENT

Figure 2A:
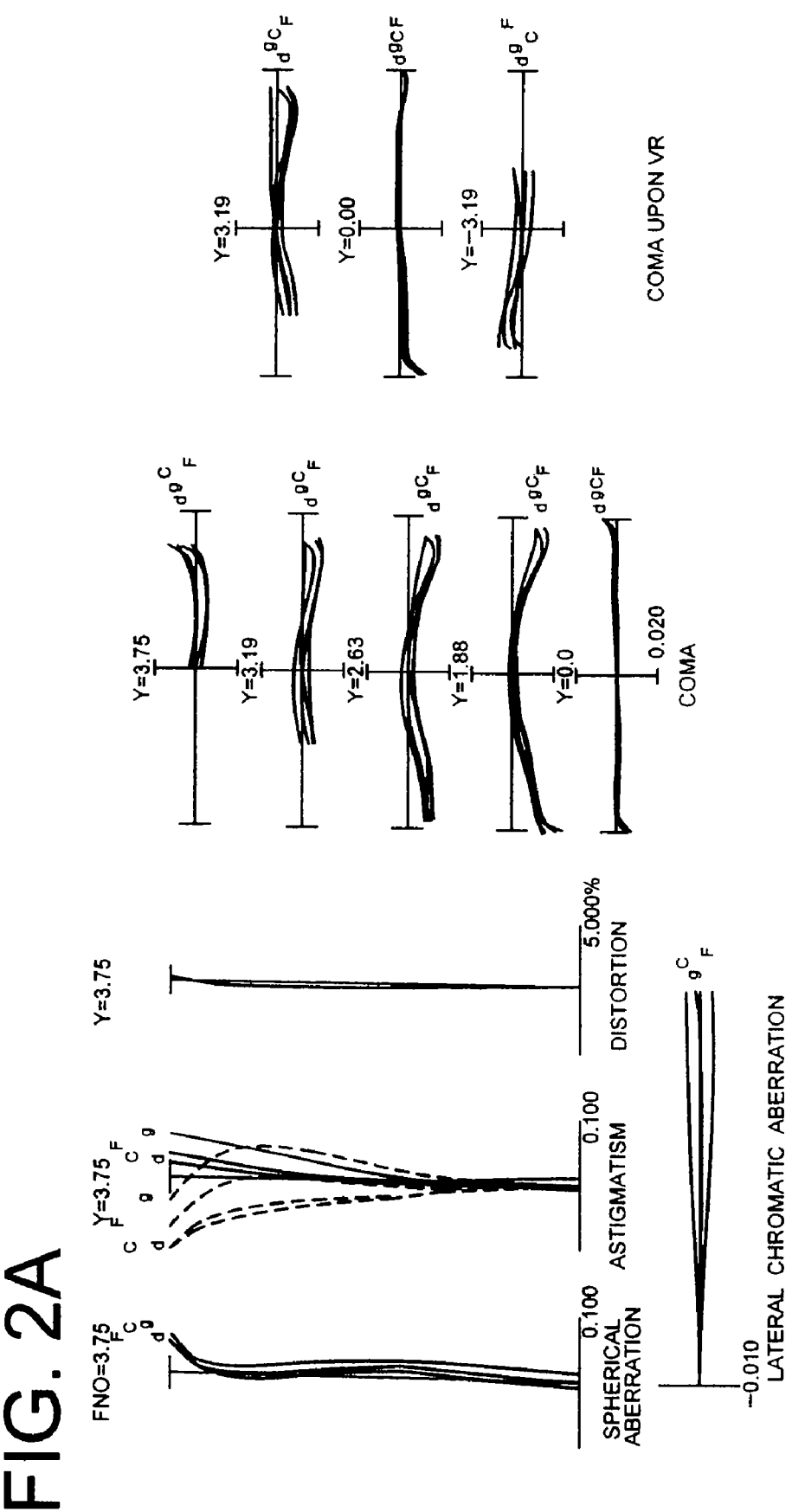
FIGS. 2A-2C are diagrams showing various types of aberrations in an infinite distance state of the zoom lens and coma when making a vibration-reduction correction in Example 1.

A zoom lens according to an embodiment of the present invention will be described.

The zoom lens according to the embodiment is constructed of a plurality of lens groups. The plurality of lens groups has at least three positive lens groups with refractive power. Each of the at least three lens groups with positive refractive power includes a positive lens. Let Np be an average refractive index of the positive lenses and νp be an average Abbe number, and the following conditional expressions (1) and (2) are satisfied:

$$1.440 < Np < 1.525 \tag{1}$$

$$70.0 < \nu p < 92.0. \tag{2}$$

The zoom lens, which is composed of the plurality of lens groups including the at least three lens groups with positive refractive power, strengthens the refractive power of each lens group in order to attain downsizing, with the result that a tremendous chromatic aberration occurs.

Conditional expressions (1) and (2) are conditions for preferably correcting spherical aberration and chromatic aberration. Spherical aberration, chromatic aberration, etc can be preferably corrected by satisfying the conditional expressions (1) and (2), and high optical performance can be also attained.

When the value Np is equal to or falls below conditional expression (1), spherical aberration of the zoom lens undesirably increases. When the value Np is equal to or exceeds the upper limit value of the conditional expression (1), there is no alternative but to conspicuously decrease Abbe number of the positive lens, and longitudinal chromatic aberration in the telephoto end state of the zoom lens rises undesirably.

Note that the lower limit value of the conditional expression (1) is set to 1.450 for assuring the effects of the embodiment. Further, the assurance of the effects of the embodiment involves setting the upper limit value of the conditional expression (1) preferably to 1.50.

When the value νp is equal to or falls below the lower limit value of the conditional expression (2), longitudinal chromatic aberration in the telephoto end state of the zoom lens undesirably rises. When the value νp is equal to or exceeds the upper limit value of the conditional expression (2), there is no alternative but to conspicuously reduce a refractive index of the positive lens, and spherical aberration of the zoom lens undesirably increases.

It is to be noted that the lower limit value of the conditional expression (2) is set to preferably 75.0 in order to assure the effects of the embodiment. Moreover, the assurance of the effects of the embodiment entails setting the upper limit value of the conditional expression (2) to preferably 90.0.

Further, in the zoom lens according to the embodiment, it is desirable that the plurality of lens groups includes, in order from the object side, a first lens group with positive refractive power, a second lens group with negative refractive power, a third lens group with positive refractive power and a fourth lens group with positive refractive power. It is also desirable that the at least three positive refractive power lens groups are the first lens group, the third lens group and the fourth lens group.

A scheme for decreasing the total length takes a telephoto type configuration in which a lens group with positive refractive power is disposed closest to the object side, and a lens group with negative refractive power is disposed subsequent thereto. The positive/positive lens groups are disposed as the rear groups for attaining a configuration having a short back-focus (Bf).

The first lens group and the second lens group largely change in their incidence heights of light beams and incidence angles of the light beams on the occasion of zooming, and therefore greatly contribute to fluctuate spherical aberration and curvature of field upon zooming.

Moreover, a preferable configuration is that the third lens group has an aperture stop within or in the vicinity of the third lens group. Then, the incidence height and the incident angle of the light beam slightly change on the occasion of zooming, and hence there is small contribution to the fluctuations in the various aberrations upon zooming. An image is, however, formed by further converging a flux of light beams converged by the first lens group, so that strong refractive power must be obtained, and a lens configuration comes to have a small radius of curvature. This leads to a tendency that a high-order spherical aberration largely occurs.

Further, the fourth lens group has a small incident light beam diameter with respect to each image height and therefore more greatly contributes to the fluctuation in curvature of field than in the spherical aberration. Moreover, the fourth lens group has a function of setting an exit pupil farther on the object side than on the image plane in order to take matching between a solid-state imaging device and a photographing optical system as represented by shading.

Moreover, in the zoom lens according to the embodiment, it is desirable that the first lens group with positive refractive power has an aspherical surface.

Spherical aberration occurs in the vicinity of the lower limit value in conditional expression (1) and in the vicinity of the upper limit value of conditional expression (2). It is desirable for correcting spherical aberration at a highly acceptable level that an aspherical surface is applied to one positive lens as a component lens within each lens group with positive refractive power. Further, the aspherical surface is formed on the positive lens of the first lens group, thereby enabling a total thickness of the first lens group to be reduced and the first lens group to be downsized. Moreover, if the aspherical surface is applied to a convex surface of the positive lens, spherical aberration can be corrected more desirably.

Further, in the zoom lens according to the embodiment, let Fw be a focal length of the zoom lens in a wide-angle end state and F1 be a focal length of the first lens group, and it is desirable to satisfy the following conditional expression (3):

$$3.00 < F1/Fw < 5.50. \tag{3}$$

Conditional expression (3) is a condition for downsizing the zoom lens by correcting aberrations at a satisfactory level. Curvature of field and spherical aberration are corrected excellently by satisfying conditional expression (3), whereby the downsized zoom lens can be attained.

When the ratio F1/Fw is equal to or falls below the lower limit value of conditional expression (3), an undesirable fluctuation occurs in curvature of field upon zooming. When the ratio F1/Fw is equal to or exceeds the upper limit value of conditional expression (3), a moving quantity of the second lens group upon zooming increases. Air-spacing between the second lens group and the third lens group must be thereby ensured large, and therefore the total lens length increases. For attaining the downsizing under this condition, the back focal length of the whole optical system may be reduced by strengthening the refractive power of the third lens group. This method is, however, unsatisfactory due to increased spherical aberration.

Note that the lower limit value of the conditional expression (3) is, it is preferable, set to 3.50 for ensuring the effects of the embodiment. It is also preferable that the upper limit value of the conditional expression (3) is set to 4.36 in order to ensure the effects of the embodiment.

Moreover, in the zoom lens according to the embodiment, let Nn be an average refractive index of negative lenses of the at least three lens groups with positive refractive power and vn be an average Abbe number thereof, it is desirable to satisfy the following conditional expressions (4) and (5):

$$1.900<Nn<2.000 \qquad (4)$$

$$27.0<vn<40.0. \qquad (5)$$

Conditional expressions (4) and (5) are conditions for obtaining satisfactory optical performance. Curvature of field and longitudinal chromatic aberration are corrected at the highly acceptable level by satisfying conditional expressions (4) and (5), thereby enabling high optical performance to be attained.

When the value Nn is equal to or falls below the lower limit value of the conditional expression (4), curvature of field in the wide-angle end state undesirably increases. When the value Nn is equal to or exceeds the upper limit value of the conditional expression (4), there is no alternative but to conspicuously decrease Abbe number of the negative lens, and, as a result of this decrease, longitudinal chromatic aberration in the telephoto end state undesirably increases.

Note that the lower limit value of conditional expression (4) is set to preferably 1.910 for ensuring the effects of the embodiment. Further, it is also preferable that the upper limit value of conditional expression (4) is set to 1.960 in order to ensure the effects of the embodiment.

When the value vn is equal to or falls below the lower limit value of conditional expression (5), fluctuation in longitudinal chromatic aberration upon zooming undesirably rises. When the value vn is equal to or exceeds the upper limit value of conditional expression (5), there is no alternative but to decrease the refractive index of the negative lens, and curvature of field in the wide-angle end state undesirably increases.

It is to be noted that the lower limit value of conditional expression (5) is set to preferably 28.0 for ensuring the effects of the embodiment. Further, it is also preferable that the upper limit value of conditional expression (5) is set to 35.0 in order to ensure the effects of the embodiment.

Moreover, in the zoom lens according to the embodiment, let F2 be a focal length of the second lens group, and it is desirable to satisfy the following conditional expression (6):

$$-1.00<F2/Fw<-0.50. \qquad (6)$$

Conditional expression (6) is a condition for obtaining satisfactory image forming performance by attaining the downsized zoom lens. Aberrations such as spherical aberration and curvature of field are corrected at the highly acceptable level by satisfying conditional expression (6), whereby the downsized zoom lens can be acquired.

In a state where the ratio F2/Fw is equal to or falls below the lower limit value of conditional expression (6), if the air-spacing between the first lens group and the second lens group is ensured, the air-spacing between the second lens group and the third lens group is reduced, and the focal length at the telephoto end state can not be ensured. Accordingly, the air-spacing between the second lens group and the third lens group must be set large, and hence the total lens length increases. For attaining the downsizing under this condition, the back focal length of the whole optical system may be shortened by strengthening refractive power of the third lens group. This method is not, however, preferable because of spherical aberration being increased. When the ratio F2/Fw is equal to or exceeds the upper limit value of conditional expression (6), fluctuation in curvature of field upon zooming undesirably increases.

It is preferable that the lower limit value of conditional expression (6) is set to −0.836 in order to ensure the effects of the embodiment. Further, for ensuring the effects of the embodiment, it is also preferable that the upper limit value of conditional expression (6) is set to −0.600.

Moreover, it is desirable for downsizing the zoom lens to strengthen refractive power of the second lens group. However, spherical aberration and curvature of field are easy to occur. Accordingly, it is desirable that an aspherical surface is applied to a concave surface within the second lens group. The aspherical surface is applied to the concave surface, thereby enabling the occurrence of spherical aberration and curvature of field to be restrained.

Further, in the zoom lens according to the embodiment, let N2 be an average refractive index of the whole lenses building up the second lens group, and it is desirable to satisfy the following conditional expression (7):

$$1.85<N2<1.95. \qquad (7)$$

Conditional expression (7) is a condition for obtaining satisfactory optical performance. Aberrations such as curvature of field, lateral chromatic aberration, etc can be preferably corrected by satisfying the conditional expression (7), whereby high optical performance can be attained.

When the value N2 is equal to or falls below the lower limit value of conditional expression (7), fluctuation in curvature of field upon zooming undesirably increases. When the value N2 is equal to or exceeds the upper limit value of conditional expression (7), there is no alternative but to decrease Abbe number, and fluctuation in lateral chromatic aberration undesirably gets large.

Note that the lower limit value of conditional expression (7) is, it is preferable, set to 1.86 in order to ensure the effects of the embodiment. Moreover, it is also preferable in terms of ensuring the effects of the embodiment that the upper limit value of conditional expression (7) is set to 1.92.

Moreover, in the zoom lens according to the embodiment, it is desirable that each of the at least three lens groups with positive refractive power includes one positive lens having an aspherical surface. With this configuration, the individual lens groups can be reduced in thickness, and the zoom lens can be downsized over the total length.

Further, in the zoom lens according to the embodiment, upon zooming from the wide-angle end state to the telephoto end state when the photographing object is at the infinite distance, it is desirable that the spacing between the first lens group and the second lens group increases, while the spacing between the second lens group and the third lens group decreases, and the lens group closest to the image plane side in the plurality of lens groups moves along the optical axis. If the first lens group is fixed upon zooming, deterioration of flatness of the image plane due to a decentering gets hard to occur, which is a preferable aspect. Further, if the third lens group is fixed upon zooming and is constructed as a vibration-reduction lens group, a zooming driving mechanism for the third lens group is not required, and hence it comes to a layout enabling such a configuration that a vibration-reduction driving mechanism is set independently of the zooming driving mechanism. Moreover, the optical system can be reduced in dimension of its outside diameter.

Respective Examples of the zoom lens according to the embodiment will be described with reference to the drawings.

The zoom lens according to each of Example 1 through Example 7 is composed of, in order from an object side, a first lens group G1 with positive refractive power, a second lens group G2 with negative refractive power, an aperture stop, a third lens group G3 with positive refractive power, a field stop, a fourth lens group G4 with positive refractive power, an optical low-pass filter OLPF and a cover glass CG of the solid-state imaging device disposed on the image plane I.

The first lens group G1 is composed of, in order from the object side, a cemented lens of a negative meniscus lens L11 having a convex surface on the object side cemented with a positive meniscus lens L12 having a convex surface on the object side, and a positive lens L13 of which a radius of curvature of the surface on the object side is smaller than 1/6 of an absolute value of a radius of curvature of the surface on the image side.

The second lens group G2 is composed of, in order from the object side, a negative lens L21 having a concave surface on the image side, a negative lens L22 having a concave surface on the image side, and a positive meniscus lens L23 having a convex surface on the object side.

The third lens group G3 is composed of, in order from the object side, a positive lens L31 having a convex surface on the object side, a negative lens L32 having a concave surface on the image side and a positive lens L33 having a convex surface on the image side.

The fourth lens group G4 is composed of, in order from the object side, a cemented lens of a negative meniscus lens L41 having a convex surface on the object side cemented with a biconvex positive lens L42.

Formed as aspherical surfaces are the object side surface of the positive meniscus lens L13, the image side surface of the negative lens L21 that is concave on the image side surface, the object side surface of the positive lens L31 that is convex on the object side surface and the image side surface of the biconvex positive lens L42.

Upon zooming from a wide-angle end state W to a telephoto end state T, the first lens group G1 is fixed, the second lens group G2 moves toward the image plane I, the third lens group G3 is fixed, and the fourth lens group G4 moves along the optical axis with a zoom locus having a convex shape on the object side.

On the occasion of focusing when the photographing object is at a finite distance, the fourth lens group G4 moves along the optical axis. Further, a diagonal length IH from the center of the solid-state imaging device according to the embodiment to a corner is on the order of 3.75 mm.

Example 1

FIG. 1 is a diagram showing a lens configuration of the zoom lens according to Example 1, wherein W represents a wide-angle end state, M connotes an intermediate focal length state, and T represents a telephoto end sate, respectively. It should be noted that the symbols specifying the lenses used in the following discussion are described only in the telephoto end state T, and the descriptions thereof are omitted in those other states. This notation is the same with the other Examples.

In the zoom lens according to example 1, the third lens group G3 has a configuration of correcting an image blur by shifting in a direction perpendicular to the optical axis.

Values of data of the zoom lens according to Example 1 are given in Table 1 shown below. In Table 1, the symbol f stands for a focal length, Bf represents a back focal length, and FNO denotes an f-number (which are given in [Specifications]), respectively.

Further, a first column shows a lens surface number from the object side, a second column r represents a radius of curvature of the lens surface, a third column d designates spacing between the lens surfaces, a fourth column vd denotes an Abbe number of a medium with respect to a d-line (wavelength $\lambda$=587.6 nm), and a fifth column represents a refractive index of the medium with respect to the d-line (wavelength $\lambda$=587.6 nm) (which are given in [Lens Data]), respectively. Note that when r=0.0000, this represents a plane surface.

Moreover, an aspherical surface coefficient given in the case of expressing the aspherical surface in the following expression, is shown in [Aspherical Data]. The aspherical surface is expressed by the following mathematical expression, where y is a height in the direction perpendicular to the optical axis, X(y) is a distance (sag amount) along the optical axis from a tangential plane of a vertex of each aspherical surface at the height y, r is a radius of curvature (paraxial radius of curvature) of the reference spherical surface, K is a conical coefficient, and Cn is an n-th order aspherical coefficient. Note that in the aspherical surface data, [E-n] (n is an integer) represents [X 10$^{-n}$].

$$X(y) = y^2 / [r \cdot \{1 + (1 - K \cdot y^2 / r^2)^{1/2}\}] + C4 \cdot y^4 + C6 \cdot y^6 + C8 \cdot y^8 + C10 \cdot y^{10}$$

Further, a value of [variable Distances] at a focal length f and a magnification $\beta$ in each of the wide-angle end state, the intermediate focal length state and the telephoto end state when focusing at the infinite distance and when focusing at a close distance, is shown in [Variable Distances]. The symbol D0 represents a distance from the object to the lens surface closest to the object side, Bf stands for the back focal length, and TL designates a value of the total length of the zoom lens, respectively. Moreover, a lens shifting quantity and an image shifting quantity with respect to the lens shifting quantity upon focusing on the infinite distance and upon focusing on a close distance are shown in [Shifting Amounts of VR Lens Group and Image upon VR], respectively. Still further, values corresponding to the respective conditional expressions are indicated in [Values for Conditional Expressions].

Note that in all of the following data values, the focal length f, the radius of curvature r, the surface to surface spacing d and other lengths, which are described therein, generally involve using a millimeter [mm] unless mentioned specially, however, the same optical performance of the optical system is acquired even when proportionally enlarged or proportionally reduced, and hence the notation is not limited to the unit [mm]. Further, other proper units can be employed without being limited to the unit [mm]. Note that in all of the following Examples, the same symbols as those in Example 1 are used, and the descriptions thereof are omitted.

TABLE 1

[Specifications]

|   | W | M | T |
|---|---|---|---|
| f = | 6.50 | 30.00 | 61.00 |
| FNO = | 3.8 | 4.1 | 3.7 |

[Lens Data]

| | r | d | νd | nd |
|---|---|---|---|---|
| 1) | 25.9603 | 1.4000 | 17.98 | 1.945950 |
| 2) | 21.0289 | 6.1000 | 82.56 | 1.497820 |
| 3) | 327.6951 | 0.1000 | | |
| 4) | 17.2279 | 4.7000 | 82.56 | 1.497820 |
| 5) | 129.9432 | (d5) | | |
| 6) | −2681.7744 | 1.0000 | 40.19 | 1.850490 |
| 7) | 4.9916 | 2.2000 | | |
| 8) | −38.8019 | 1.0000 | 40.77 | 1.883000 |
| 9) | 11.1696 | 0.9000 | | |
| 10) | 11.6255 | 1.6000 | 17.98 | 1.945950 |
| 11) | 92.2561 | (d11) | | |
| 12> | 0.0000 | 0.5000 | Aperture Stop | |
| 13) | 5.3318 | 2.1000 | 64.06 | 1.516330 |
| 14) | 41.8200 | 0.1000 | | |
| 15) | 12.6924 | 1.0000 | 42.72 | 1.834810 |
| 16) | 5.7137 | 0.8000 | | |
| 17) | −114.0651 | 2.0000 | 91.20 | 1.456000 |
| 18) | −12.1743 | 0.0000 | | |
| 19) | 0.0000 | (d19) | Field Stop | |
| 20) | 9.2880 | 1.0000 | 25.46 | 2.000690 |
| 21) | 6.4169 | 3.5000 | 91.20 | 1.456000 |
| 22) | −19.3341 | (d22) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Data]

Surface Number: 4

K = 0.4808
C4 = 5.42353E−06
C6 = 3.74245E−09
C8 = 0.00000E+00

Surface Number: 7

K = 0.2537
C4 = 3.70121E−04
C6 = 8.82513E−06
C8 = 6.13778E−10

Surface Number: 13

K = 0.1321
C4 = 1.00826E−04
C6 = 1.60307E−05
C8 = −9.89080E−07

Surface Number: 22

K = 1.0000
C4 = −8.66901E−05
C6 = 0.00000E+00
C8 = 0.00000E+00

[Variable Distances]

|   | W | M | T |
|---|---|---|---|
| Focusing on infinity | | | |
| f | 6.50000 | 30.00000 | 61.00000 |
| D0 | ∞ | ∞ | ∞ |
| d5 | 0.90000 | 10.93565 | 13.96348 |
| d11 | 15.40831 | 5.37266 | 2.34483 |
| d20 | 5.02154 | 1.42306 | 8.06457 |
| d22 | 6.51775 | 10.11623 | 3.47472 |
| Bf | 4.20934 | 4.20934 | 4.20934 |
| TL | 64.65693 | 64.65693 | 64.65693 |
| Focusing on a close object | | | |
| β | −0.04000 | −0.04000 | −0.10000 |
| D0 | 140.9181 | 683.8795 | 473.4833 |
| d5 | 0.90000 | 10.93565 | 13.96348 |
| d11 | 15.40831 | 5.37266 | 2.34483 |
| d20 | 4.74165 | 0.21801 | 1.66443 |
| d22 | 6.79764 | 11.32128 | 9.87486 |
| Bf | 4.20934 | 4.20934 | 4.20914 |
| TL | 64.65693 | 64.65693 | 64.65693 |

[Shifting Amounts of VR Lens Group and Image upon VR]

|   | W | M | T |
|---|---|---|---|
| Focusing on Infinity | | | |
| f | 6.50000 | 30.00000 | 61.00000 |
| lens | ±0.124 | ±0.248 | ±0.383 |
| image | ±0.118 | ±0.253 | ±0.361 |
| Focusing on a Close Object | | | |
| β | −0.04000 | −0.04000 | −0.10000 |
| lens | ±0.123 | ±0.239 | ±0.355 |
| image | ±0.118 | ±0.253 | ±0.361 |

[Values for Conditional Expressions]

(1): Np = 1.4848
(2): νp = 82.32
(3): F1/Fw = 4.096
(4): Nn = 1.9272
(5): νn = 28.72
(6): F2/Fw = −0.790
(7): N2 = 1.8931

Figure 2B:
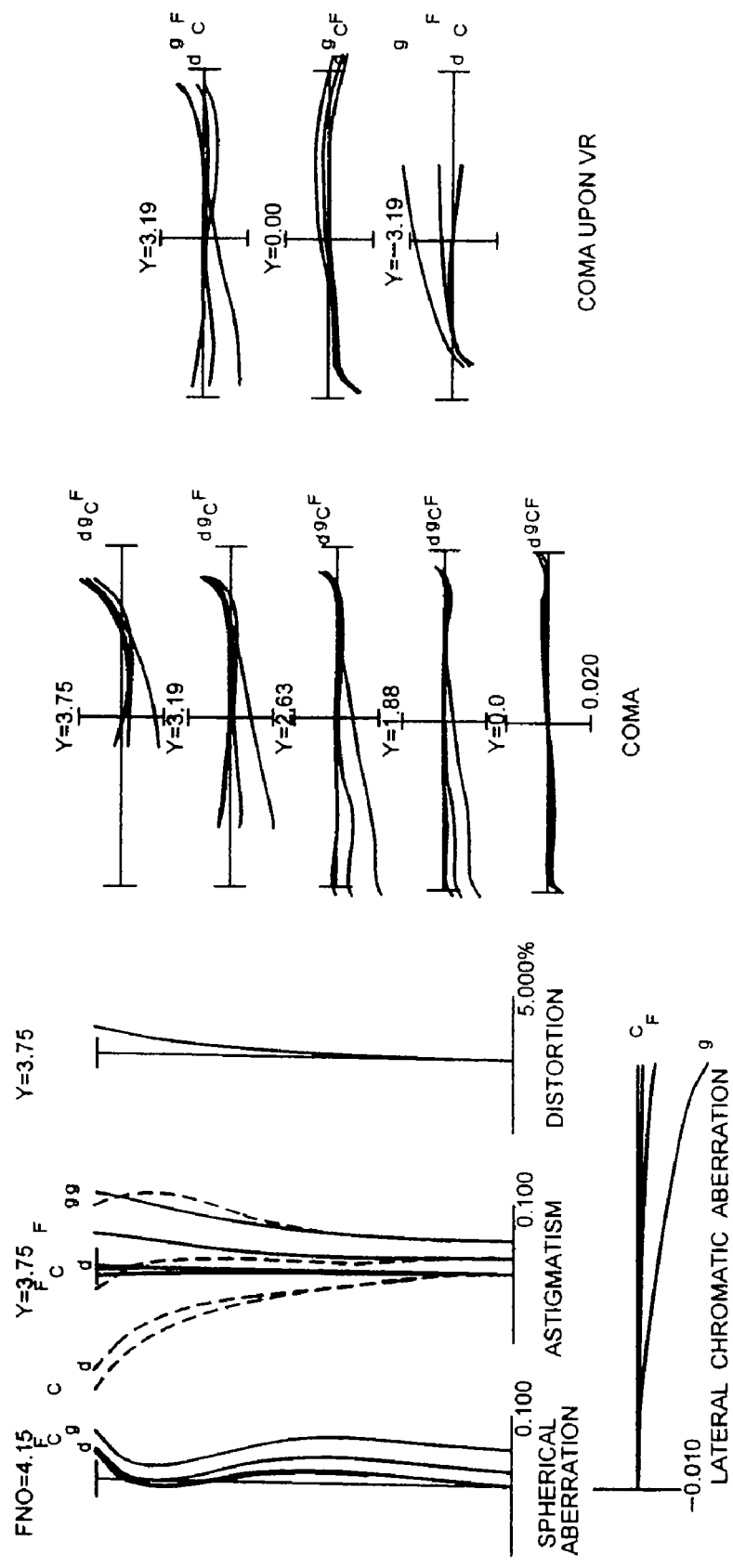
Figure 2C:
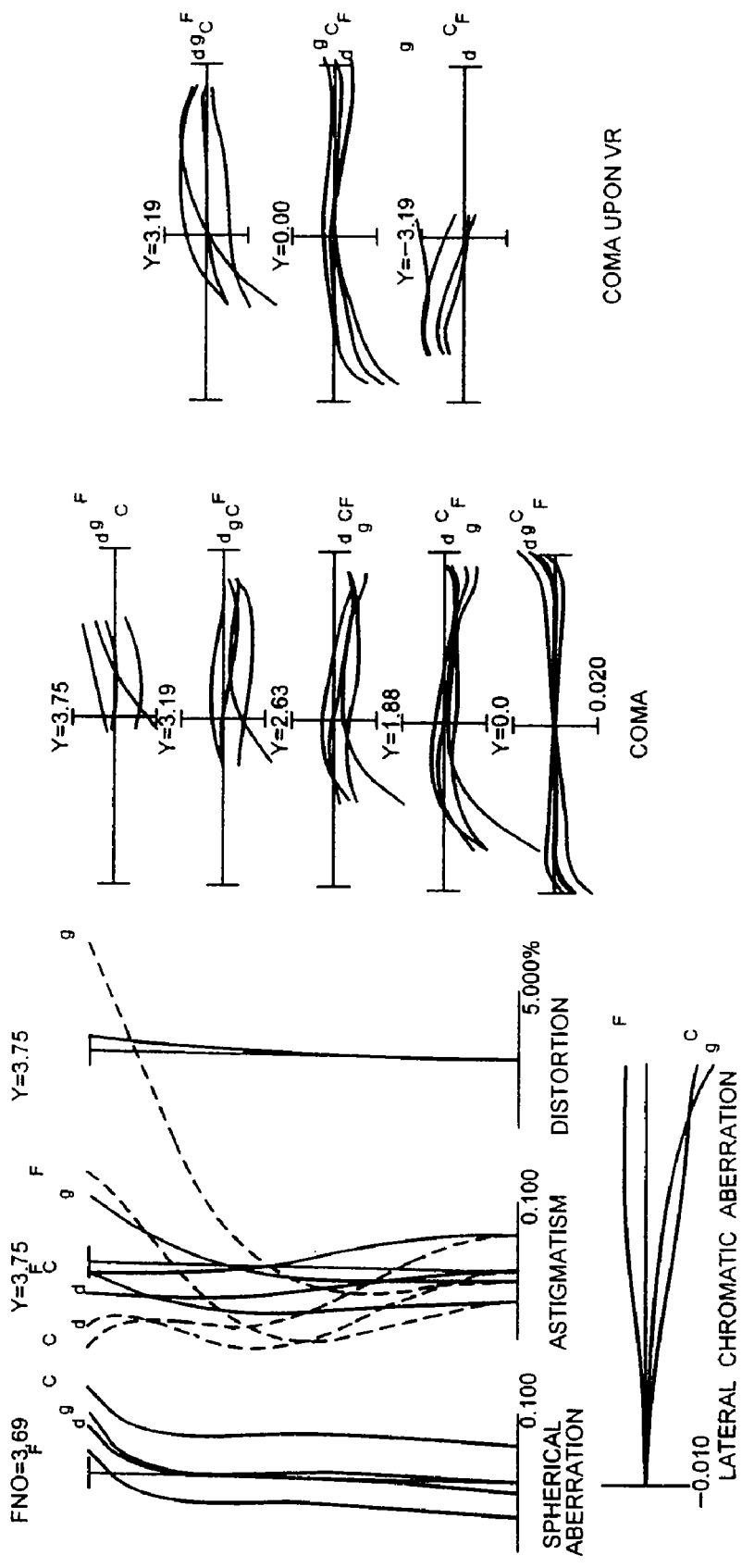
Figure 3A:
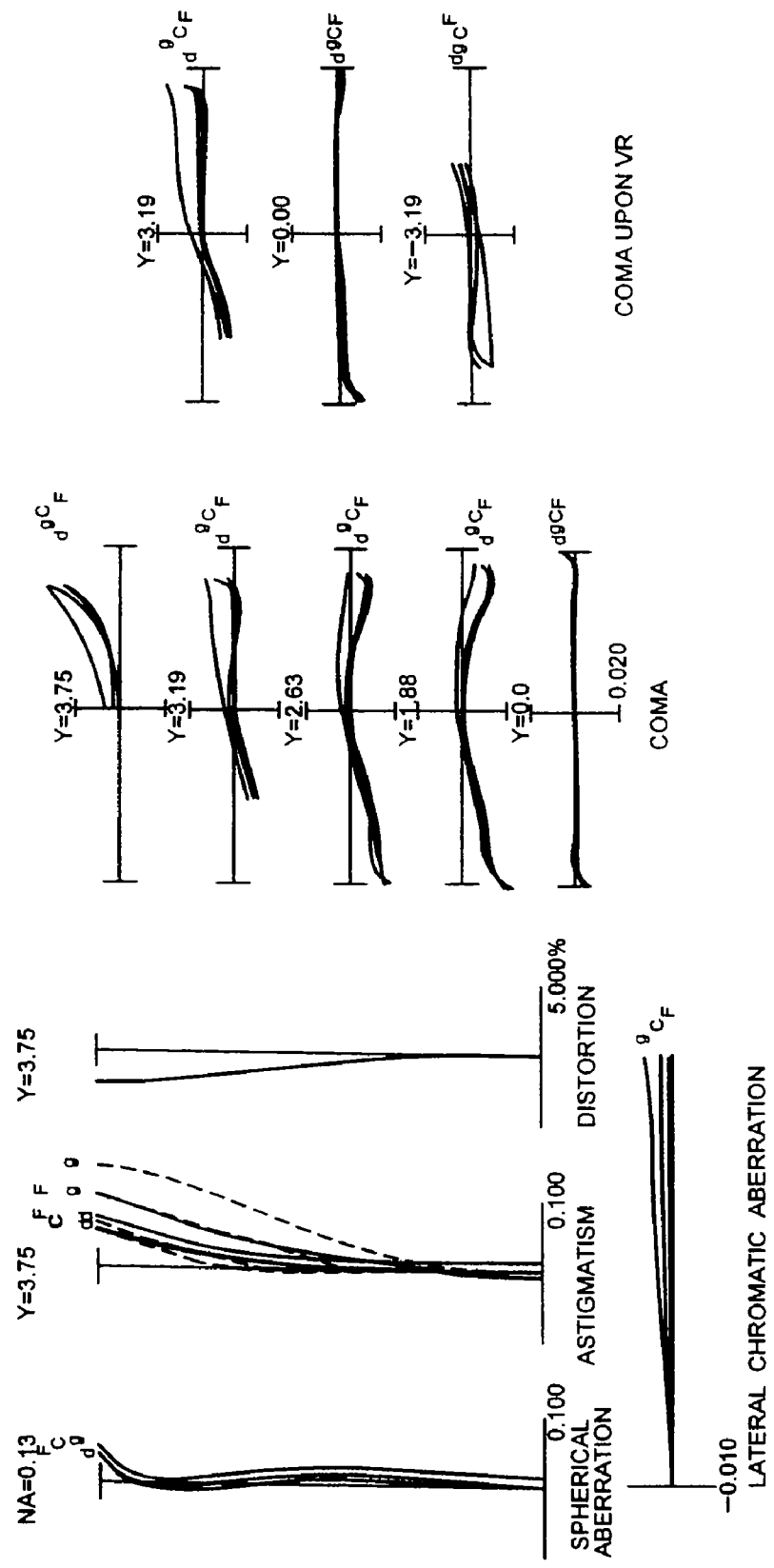
Figure 3C:
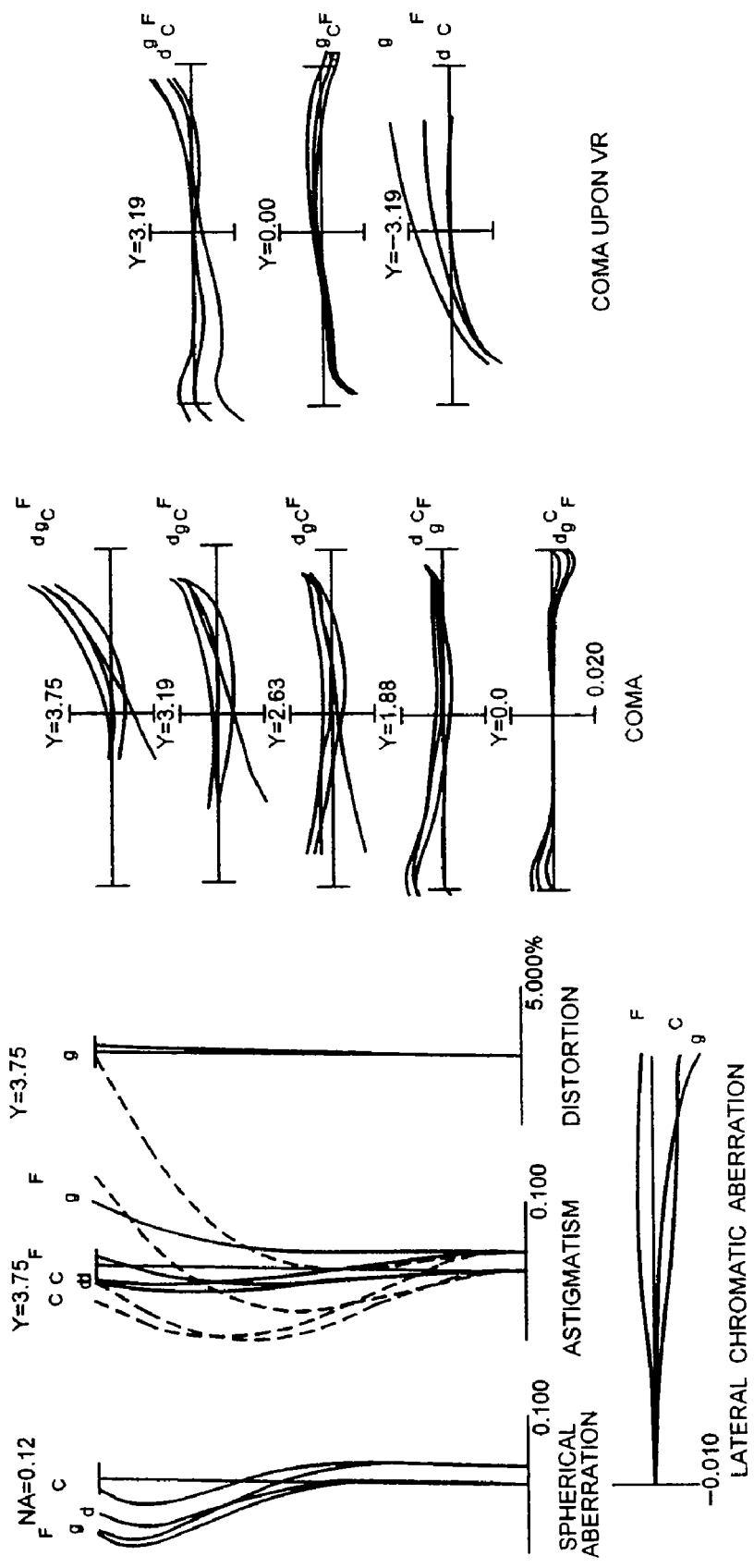

FIGS. 2A-2C are diagrams showing various types of aberrations in an infinite distance state of the zoom lens and coma when making a vibration-reduction correction in Example 1; FIG. 2A showing the aberrations in the wide-angle end state; FIG. 2B showing the aberrations in the intermediate focal length state; and FIG. 2C showing the aberrations in the telephoto end state. FIGS. 3A-3C are diagrams showing the various types of aberrations in a close photographing distance focusing state of the zoom lens and coma when making the vibration-reduction correction in Example 1; FIG. 3A showing the respective aberrations when Rw=205 mm; FIG. 3B showing the aberrations when Rm=749 mm; and FIG. 3C showing the aberrations when Rt=538 mm.

In the diagrams showing the respective aberrations, Y represents an image height, NA indicates a numerical aperture, D stands for the d-line (λ=587.6 nm), G designates the g-line (λ=435.6 nm), C denotes the C-line (λ=656.3 nm), and F represents the F-line (λ=486.1 nm). Note that in the aberration diagram showing astigmatism, the solid line indicates a sagittal image plane, and the broken line shows a meridional image plane. Further, in the aberration diagram showing the power chromatic aberration, the aberration is illustrated based on the d-line. Note that in the diagrams showing the aberrations in all of the following Examples, the same symbols as those in Example 1 are used, and the descriptions thereof are omitted.

It is recognized from the individual aberration diagrams that the zoom lens according to Example 1 exhibits an excellent image forming characteristic, wherein the various aberrations are well corrected over a range covering the wide-angle end state through the telephoto end state and further covering when making the vibration-reduction correction in each state.

Example 2

FIG. 4 is a diagram showing a lens configuration of the zoom lens according to Example 2. Table 2 given below shows values in the data table of the zoom lens according to Example 2.

TABLE 2

[Specifications]

|  | W | M | T |
|---|---|---|---|
| f = | 6.55 | 30.00 | 61.00 |
| FNO = | 3.6 | 3.8 | 3.7 |

[Lens Data]

|  | r | d | νd | nd |
|---|---|---|---|---|
| 1) | 25.7235 | 1.4000 | 20.88 | 1.922860 |
| 2) | 20.6571 | 5.9000 | 90.22 | 1.456500 |
| 3) | 212.5954 | 0.1000 |  |  |
| 4) | 17.1979 | 5.3000 | 90.91 | 1.454570 |
| 5) | 321.2332 | (d5) |  |  |
| 6) | −50.6548 | 1.0000 | 40.10 | 1.851350 |
| 7) | 4.2633 | 2.2000 |  |  |
| 8) | −92.4310 | 1.0000 | 40.77 | 1.883000 |
| 9) | 23.5051 | 0.6000 |  |  |
| 10) | 11.8678 | 1.5000 | 17.98 | 1.945950 |
| 11) | 55.8154 | (d11) |  |  |
| 12> | 0.0000 | 0.3000 | Aperture Stop |  |
| 13) | 5.5193 | 2.1000 | 63.97 | 1.514280 |
| 14) | −37.8518 | 0.9000 |  |  |
| 15) | 49.7862 | 1.0000 | 42.72 | 1.834810 |
| 16) | 6.0285 | 0.5000 |  |  |
| 17) | 12.6257 | 1.8000 | 91.20 | 1.456000 |
| 18) | −11.7685 | 0.0000 |  |  |
| 19) | 0.0000 | (d19) | Field Stop |  |
| 20) | 9.8698 | 1.0000 | 25.46 | 2.000690 |
| 21) | 6.7108 | 2.6000 | 91.30 | 1.455590 |
| 22) | −51.2524 | (d22) |  |  |
| 23) | 0.0000 | 0.9000 | 70.51 | 1.544370 |
| 24) | 0.0000 | 0.5000 |  |  |
| 25) | 0.0000 | 0.5000 | 64.12 | 1.516800 |
| 26) | 0.0000 | Bf |  |  |

[Aspherical Data]

Surface Number: 4

K = 0.5000
C4 = 3.64840E−06
C6 = 0.00000E+00
C8 = 0.00000E+00

Surface Number: 7

K = −0.8591
C4 = 1.93500E−03
C6 = −2.58040E−05
C8 = 0.00000E+00

Surface Number: 13

K = 0.5519
C4 = −3.03330E−04
C6 = 0.00000E+00
C8 = 0.00000E+00

Surface Number: 22

K = −99.0000
C4 = −2.56430E−04
C6 = 0.00000E+00
C8 = 0.00000E+00

TABLE 2-continued

[Variable Distances]

|  | W | M | T |
|---|---|---|---|
| Focusing on infinity | | | |
| f | 6.55000 | 30.00000 | 60.10000 |
| D0 | ∞ | ∞ | ∞ |
| d5 | 1.02022 | 12.17260 | 15.26469 |
| d11 | 15.97509 | 4.82271 | 1.73062 |
| d19 | 8.08567 | 2.30237 | 9.98218 |
| d22 | 3.99302 | 9.77632 | 2.09651 |
| Bf | 2.37189 | 2.37189 | 2.37189 |
| TL | 62.54589 | 62.54589 | 62.54589 |
| Focusing on a close object | | | |
| β | −0.04000 | −0.04000 | −0.10000 |
| D0 | 141.5092 | 674.0564 | 452.9397 |
| d5 | 1.02022 | 12.17260 | 15.26469 |
| d11 | 15.97509 | 4.82271 | 1.73062 |
| d19 | 7.63484 | 0.80981 | 1.26412 |
| d22 | 4.44385 | 11.26888 | 10.81457 |
| Bf | 2.37189 | 2.37189 | 2.37189 |
| TL | 62.54589 | 62.54589 | 62.54589 |

[Values for Conditional Expressions]

(1): Np = 1.4674
(2): νp = 85.52
(3): F1/Fw = 4.358
(4): Nn = 1.9195
(5): νn = 29.69
(6): F2/Fw = −0.835
(7): N2 = 1.8934

Figure 5A:
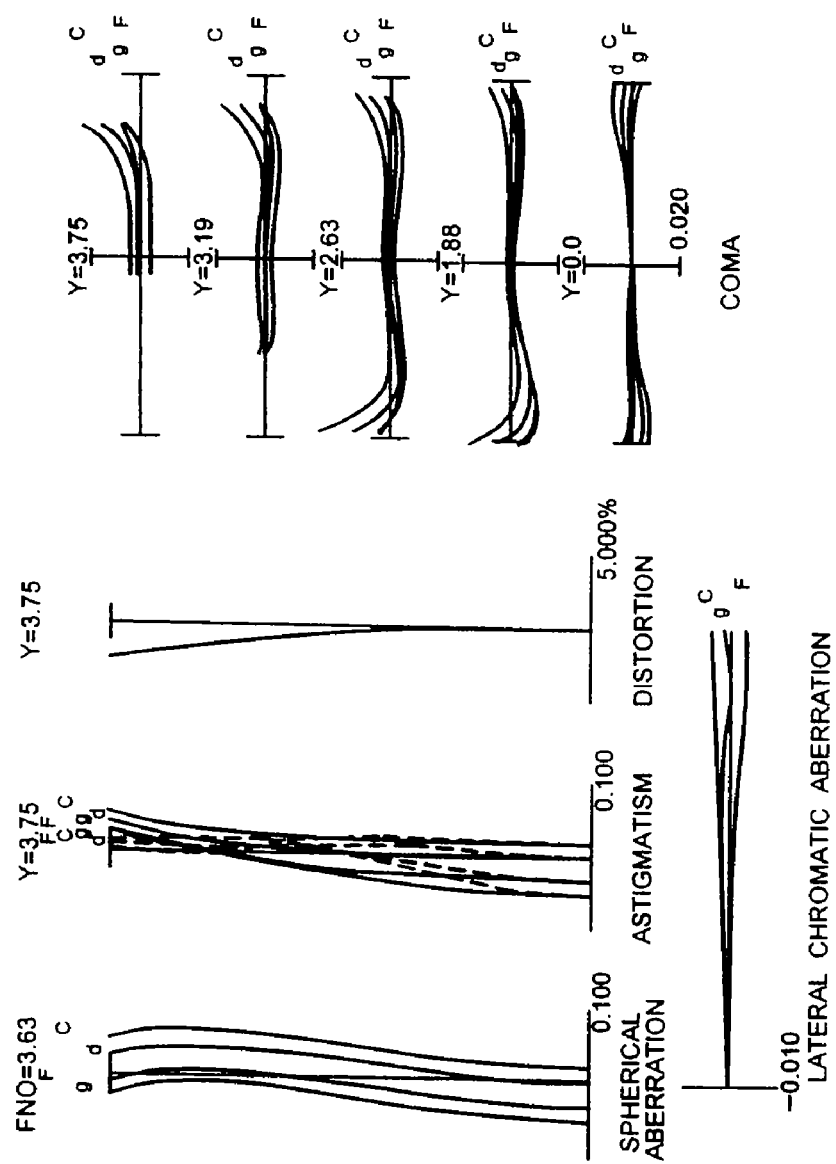
FIGS. 5A-5C are diagrams showing the various types of aberrations in the infinite distance state of the zoom lens in Example 2.
Figure 5B:
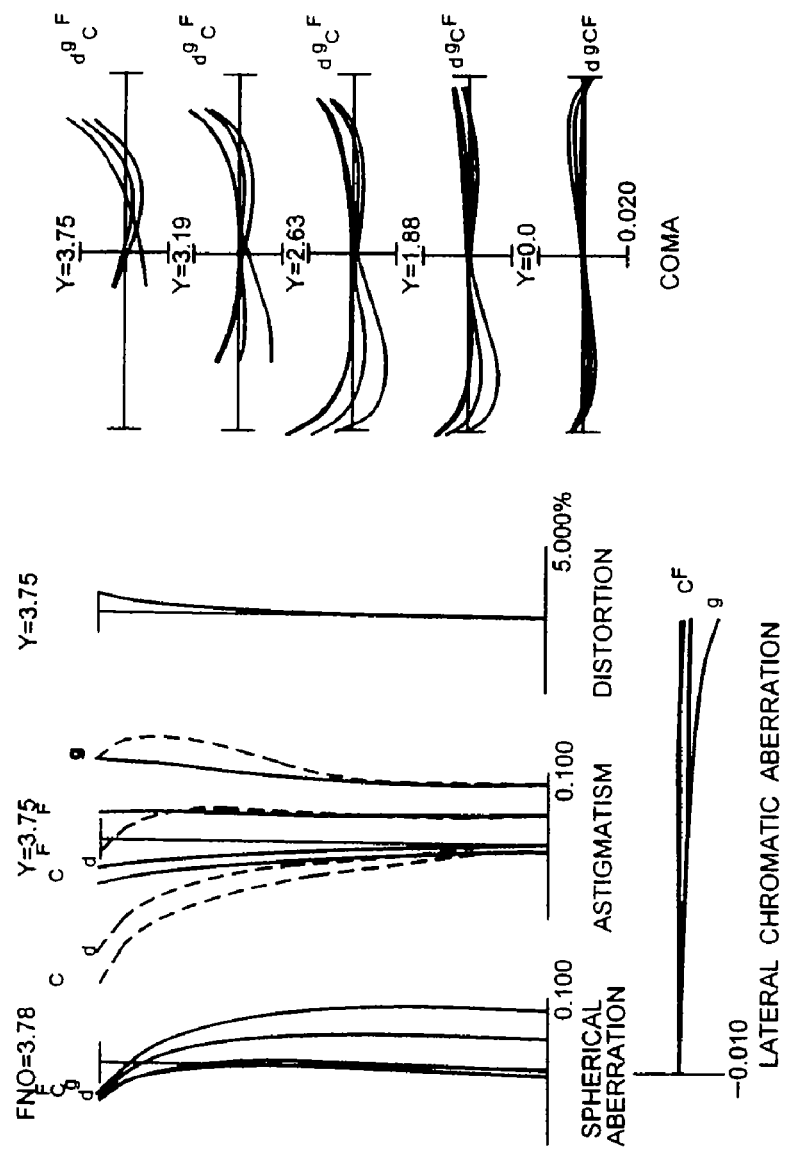
Figure 5C:
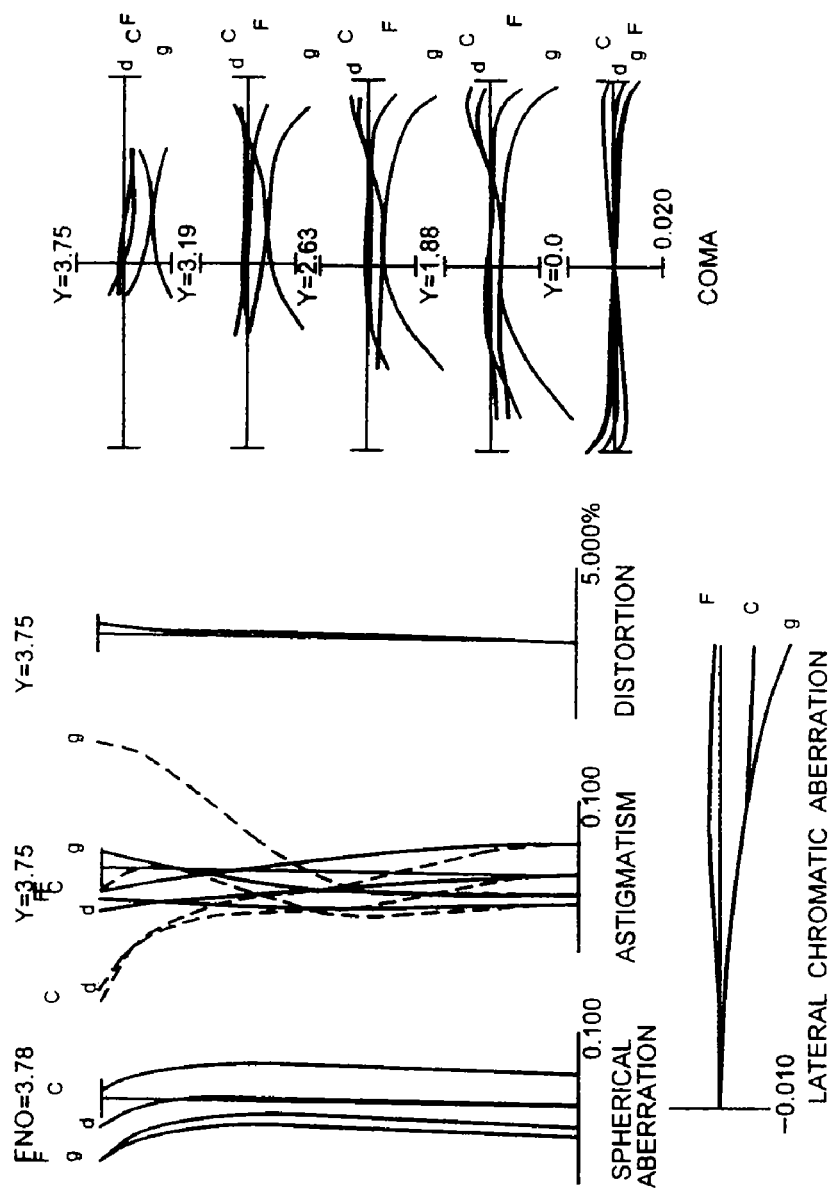
Figure 6A:
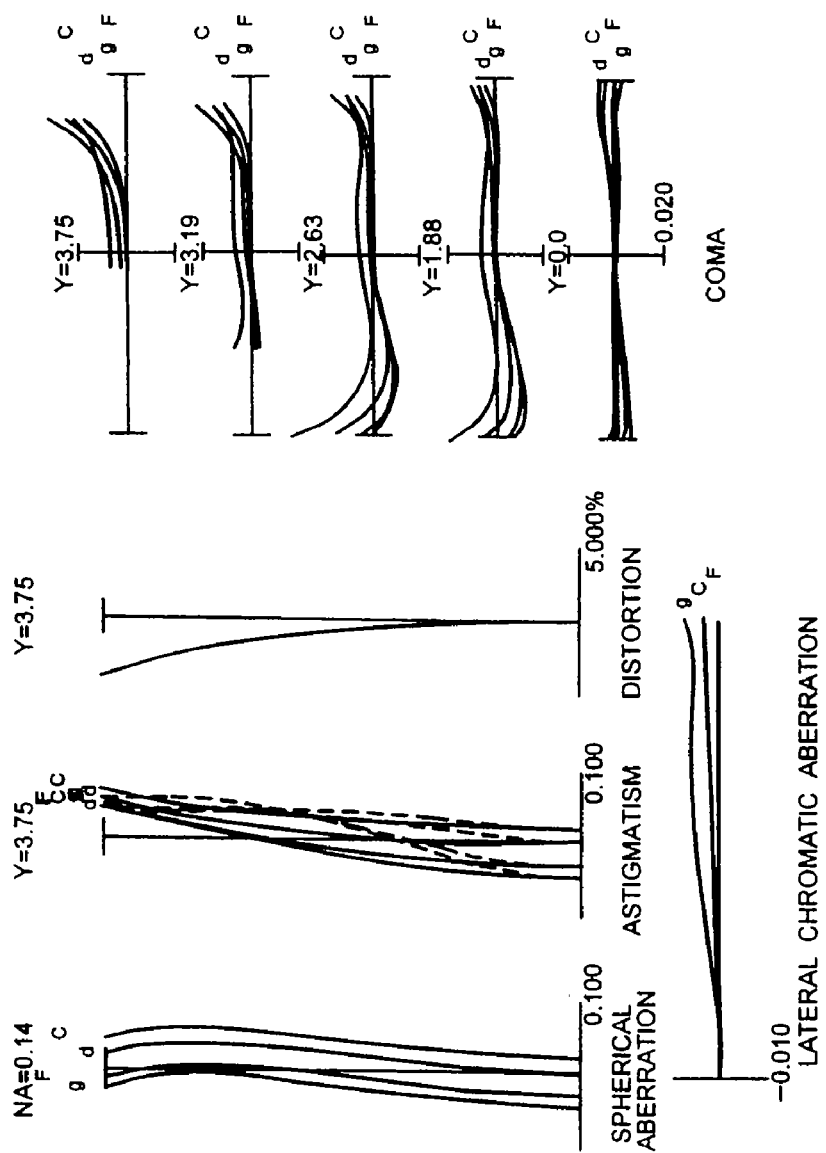
FIGS. 6A-6C are diagrams showing the various types of aberrations in the close photographing distance focusing state of the zoom lens in Example 2.
Figure 6B:
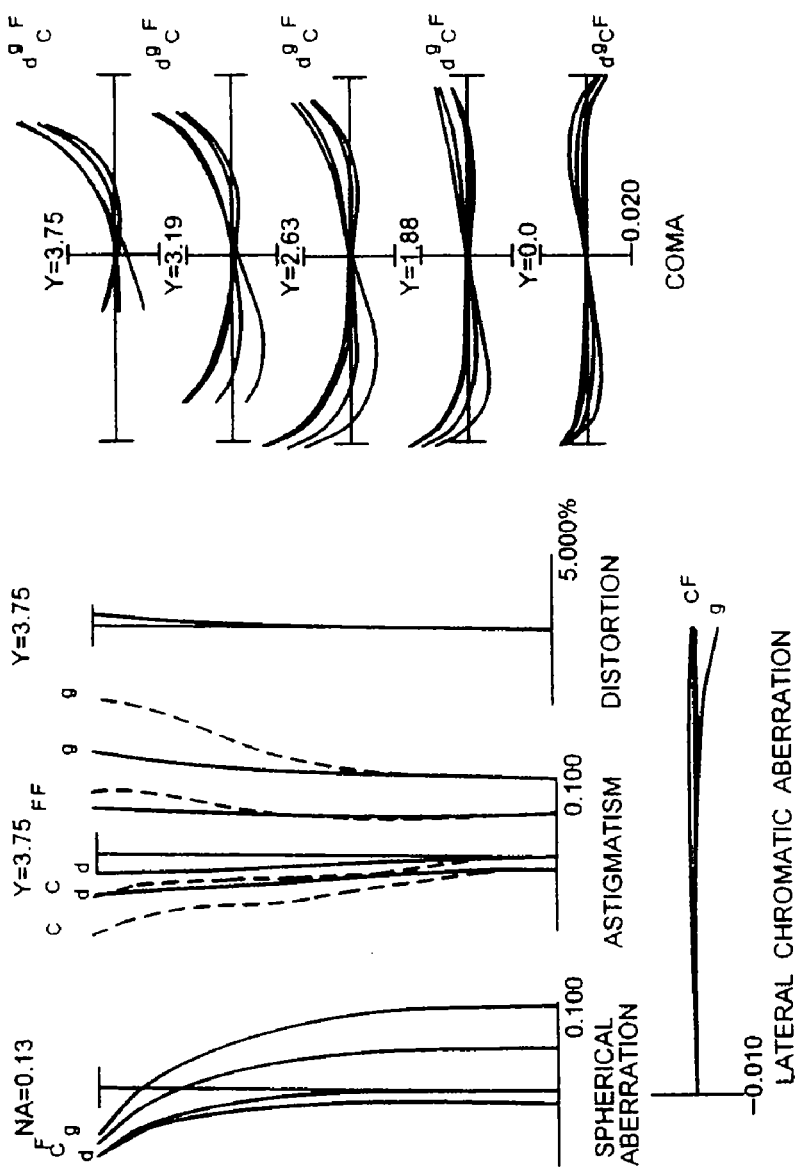
Figure 6C:
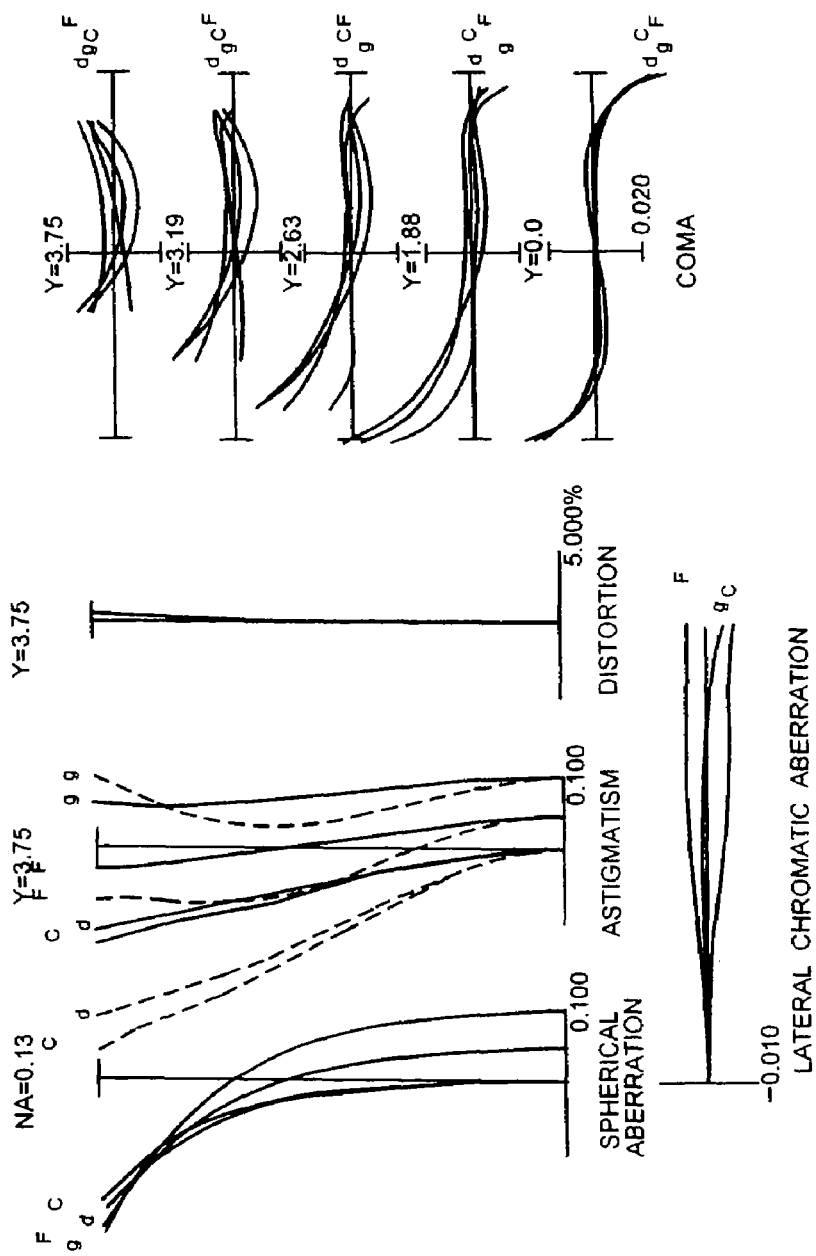

FIGS. 5A-5C are diagrams showing the various types of aberrations in the infinite distance state of the zoom lens in Example 2; FIG. 5A showing the respective aberrations in the wide-angle end state; FIG. 5B showing the aberrations in the intermediate focal length state; and FIG. 5C showing the aberrations in the telephoto end state. FIGS. 6A-6C are diagrams showing the various types of aberrations in the close photographing distance focusing state of the zoom lens in Example 2; FIG. 6A showing the respective aberrations when Rw=204 mm; FIG. 6B showing the aberrations when Rm=737 mm; and FIG. 6C showing the aberrations when Rt=515 mm.

It is recognized from the individual aberration diagrams that the zoom lens according to Example 2 exhibits an excellent image forming characteristic, wherein the various aberrations are well corrected over a range covering the wide-angle end state through the telephoto end state and further covering when making the vibration-reduction correction in each state.

Example 3

Figure 7:
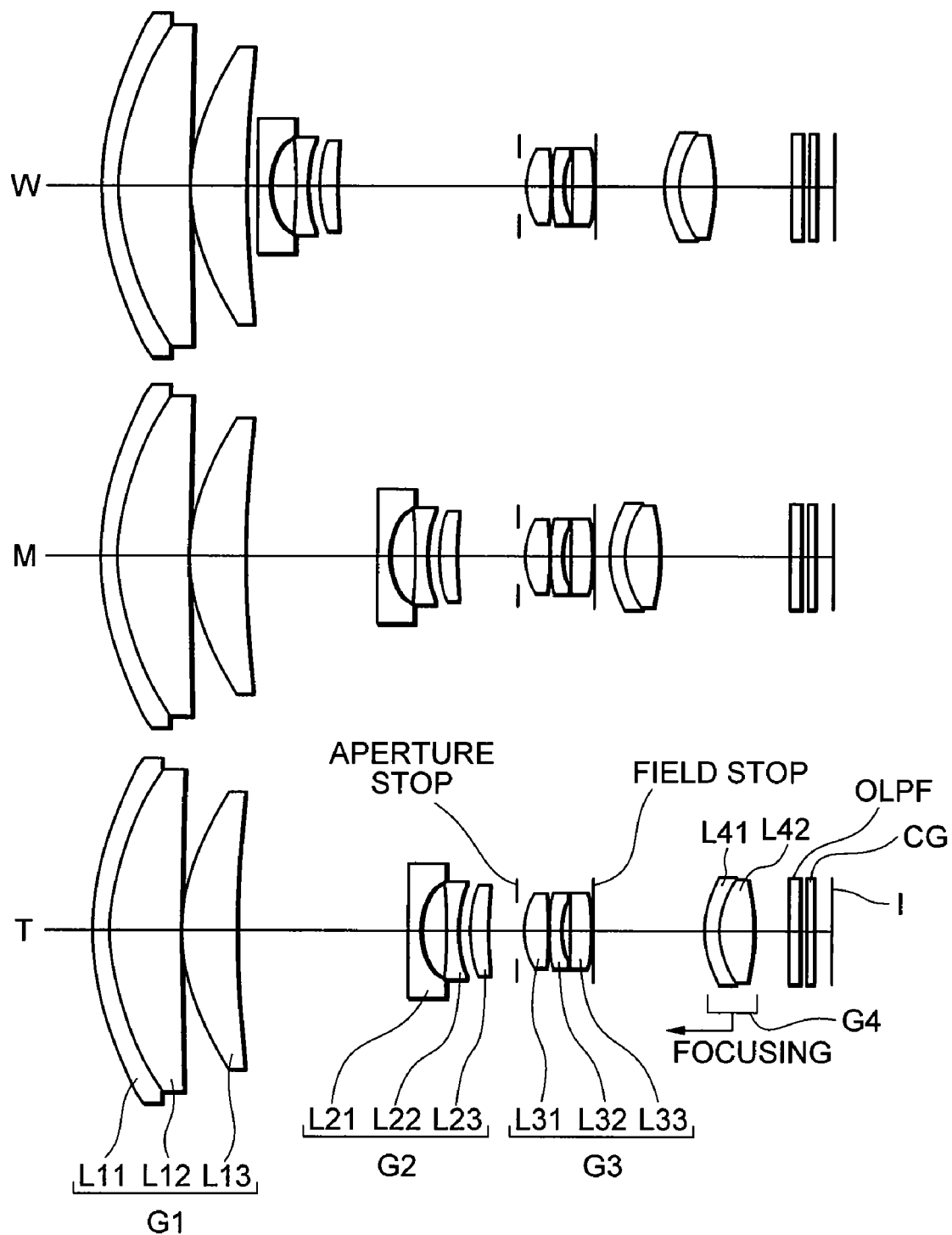
FIG. 7 is a diagram showing a lens configuration of the zoom lens according to Example 3, wherein W represents the wide-angle end state, M connotes the intermediate focal length state, and T represents the telephoto end sate, respectively.

FIG. 7 is a diagram showing a lens configuration of the zoom lens according to Example 3. Table 3 given below shows values in the data table of the zoom lens according to Example 3.

TABLE 3

[Specifications]

| | W | M | T |
|---|---|---|---|
| f = | 6.50 | 30.00 | 61.00 |
| FNO = | 3.7 | 4.0 | 3.8 |

[Lens Data]

| | r | d | νd | nd |
|---|---|---|---|---|
| 1) | 25.9116 | 1.4000 | 17.98 | 1.945950 |
| 2) | 21.0025 | 6.1000 | 82.56 | 1.497820 |
| 3) | 347.3024 | 0.1000 | | |
| 4) | 17.1452 | 4.7000 | 82.56 | 1.497820 |
| 5) | 120.0854 | (d5) | | |
| 6) | 1316.3968 | 1.0000 | 40.19 | 1.850490 |
| 7) | 4.8440 | 2.2000 | | |
| 8) | −38.8019 | 1.0000 | 40.77 | 1.883000 |
| 9) | 11.8322 | 0.9000 | | |
| 10) | 11.4204 | 1.6000 | 17.98 | 1.945950 |
| 11) | 74.3334 | (d11) | | |
| 12> | 0.0000 | 0.5000 | Aperture Stop | |
| 13) | 5.0459 | 2.1000 | 64.06 | 1.516330 |
| 14) | −15.9483 | 0.1000 | | |
| 15) | 25.7688 | 1.0000 | 42.72 | 1.834810 |
| 16) | 5.4774 | 0.7000 | | |
| 17) | 61.0443 | 2.0000 | 91.20 | 1.456000 |
| 18) | −15.0266 | 0.0000 | | |
| 19) | 0.0000 | (d19) | Field Stop | |
| 20) | 10.2508 | 1.0000 | 25.46 | 2.000690 |
| 21) | 6.8801 | 3.0000 | 91.20 | 1.456000 |
| 22) | −26.6761 | (d22) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Data]

Surface Number: 4

K = 0.4287
C4 = 6.72320E−06
C6 = 8.65870E−09
C8 = 0.00000E+00

Surface Number: 7

K = 0.6444
C4 = 1.19890E−05
C6 = 4.36360E−06
C8 = −1.60260E−07

Surface Number: 13

K = 0.1247
C4 = −2.33820E−04
C6 = 9.48600E−06
C8 = −9.89080E−07

Surface Number: 22

K = 1.0000
C4 = −1.49710E−04
C6 = 0.00000E+00
C8 = 0.00000E+00

[Variable Distances]

| | W | M | T |
|---|---|---|---|
| | Focusing on infinity | | |
| f | 6.50000 | 30.00000 | 60.10000 |
| D0 | ∞ | ∞ | ∞ |
| d5 | 0.90000 | 11.04804 | 13.87679 |
| d11 | 15.23960 | 5.09156 | 2.26281 |
| d19 | 5.79062 | 1.55117 | 9.48020 |
| d22 | 6.49556 | 10.73501 | 2.80598 |
| Bf | 1.30180 | 1.30180 | 1.30180 |
| TL | 61.72758 | 61.72758 | 61.72758 |

TABLE 3-continued

| | | | |
|---|---|---|---|
| | Focusing on a close object | | |
| β | −0.04000 | −0.04000 | −0.10000 |
| D0 | 140.4928 | 676.3819 | 451.3168 |
| d5 | 0.90000 | 11.04804 | 13.87679 |
| d11 | 15.23960 | 5.09156 | 2.26281 |
| d19 | 5.42736 | 0.18034 | 1.32246 |
| d22 | 6.85882 | 12.10584 | 10.96372 |
| Bf | 1.30180 | 1.30180 | 1.30180 |
| TL | 61.72758 | 61.72758 | 61.72758 |

[Values for Conditional Expressions]

(1): Np = 1.4848
(2): νp = 82.32
(3): F1/Fw = 4.096
(4): Nn = 1.9272
(5): νn = 28.72
(6): F2/Fw = −0.790
(7): N2 = 1.8931

Figure 8A:
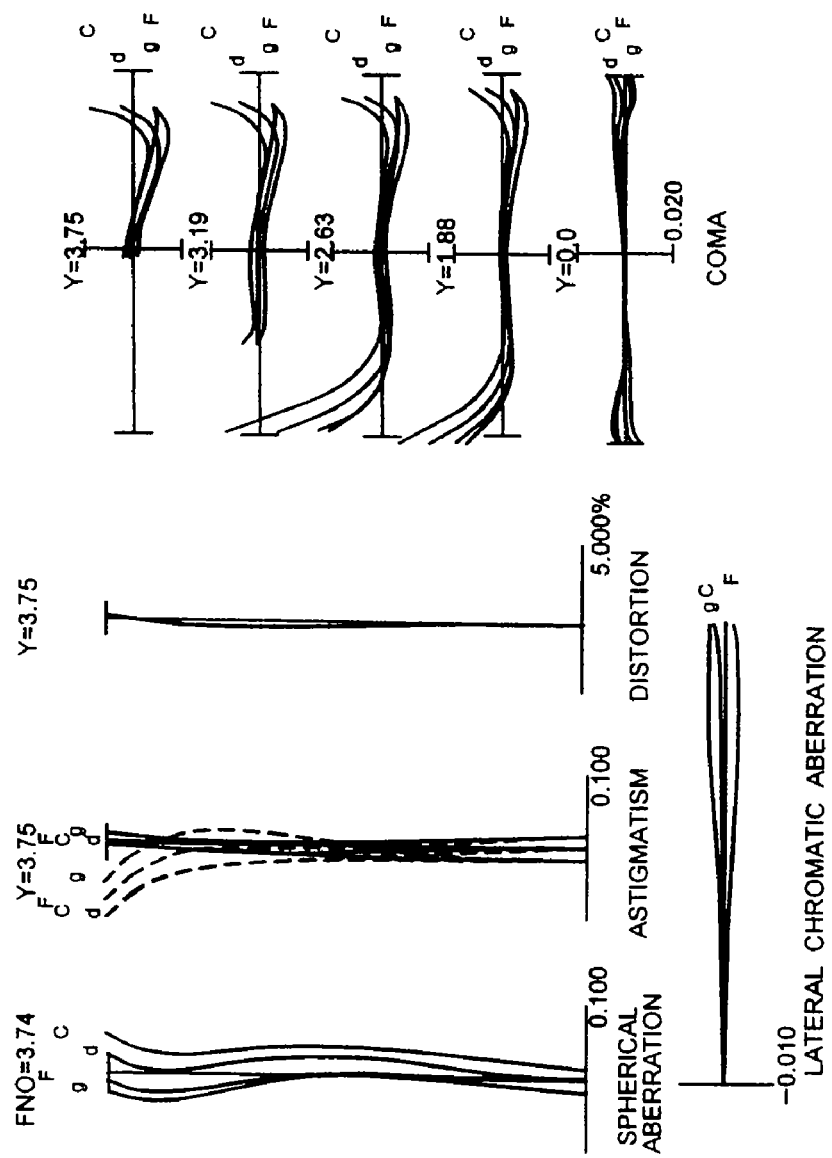
FIGS. 8A-8C are diagrams showing the various types of aberrations in the infinite distance state of the zoom lens in Example 3.
Figure 8B:
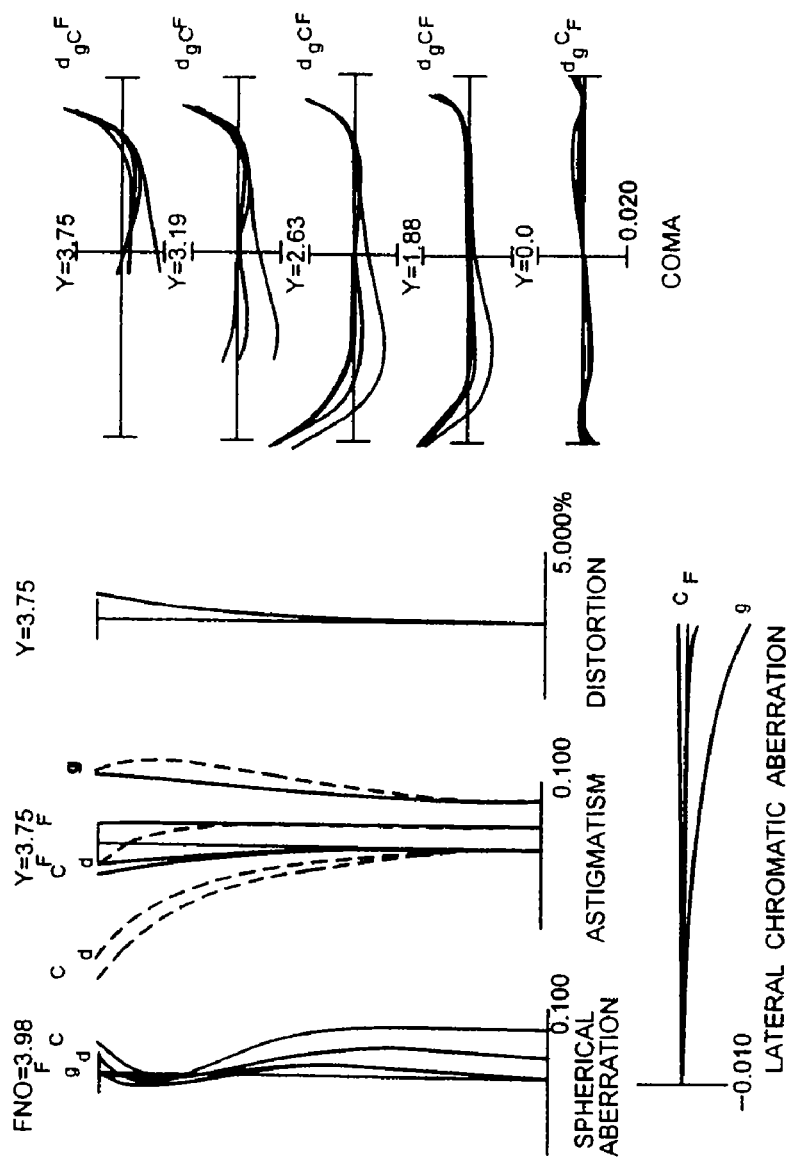
Figure 8C:
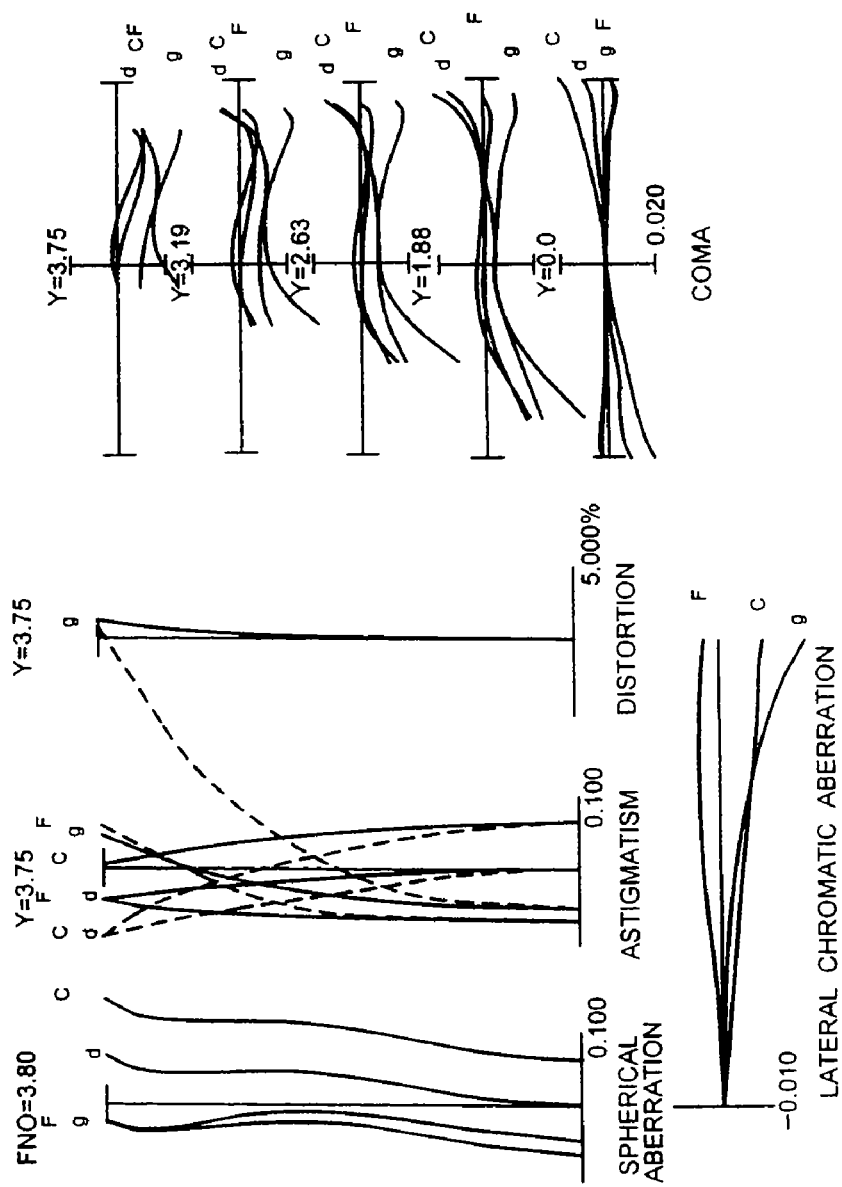
Figure 9A:
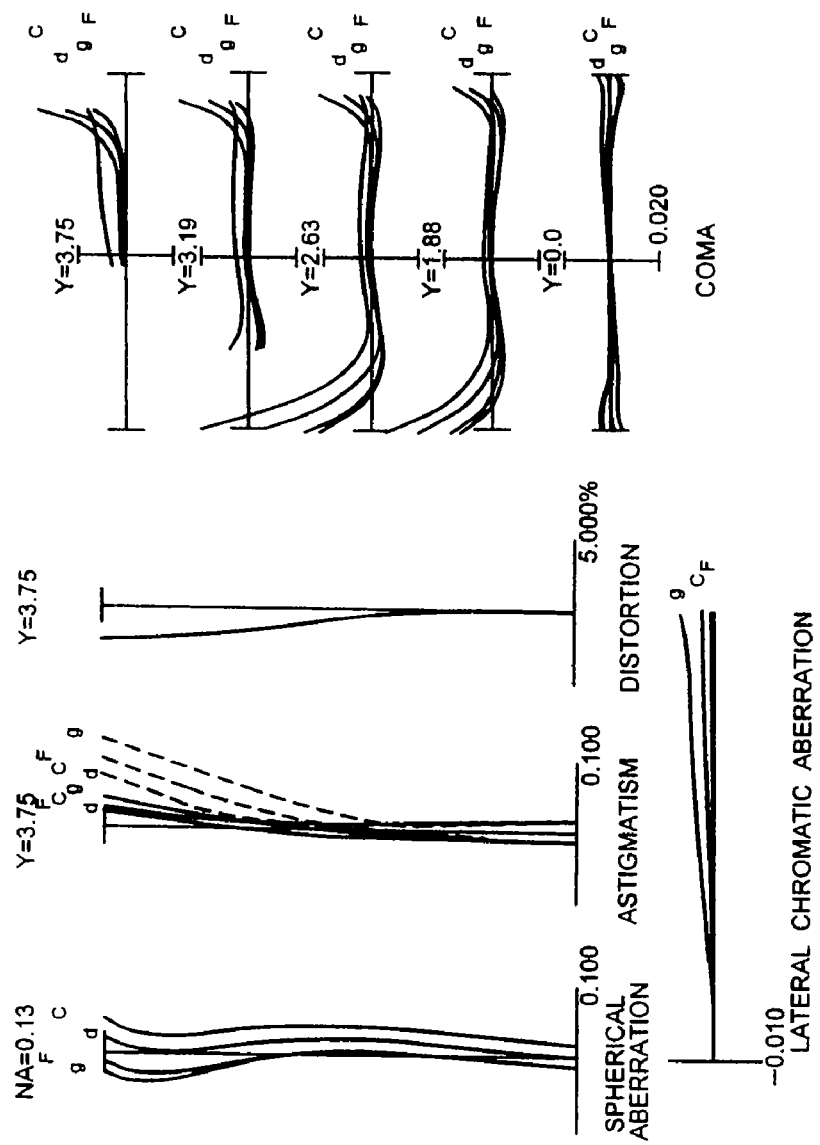
FIGS. 9A-9C are diagrams showing the various types of aberrations in the close photographing distance focusing state of the zoom lens in Example 3.
Figure 9B:
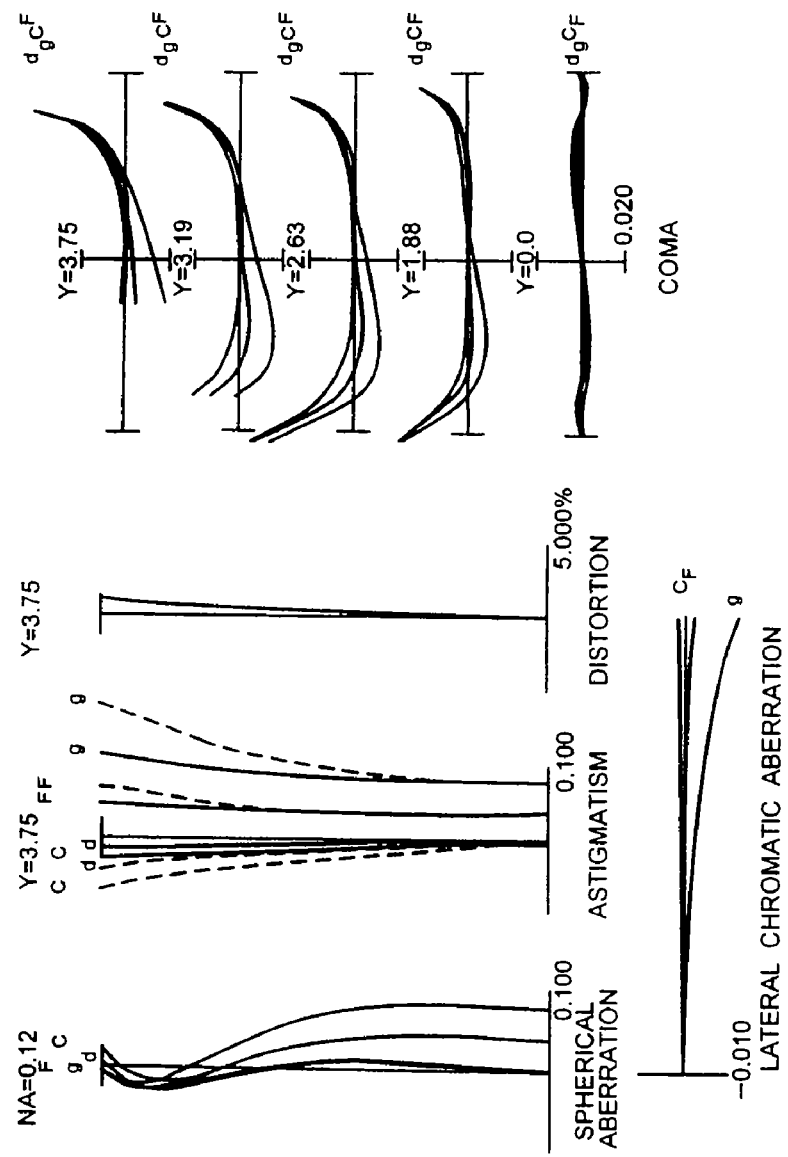
Figure 9C:
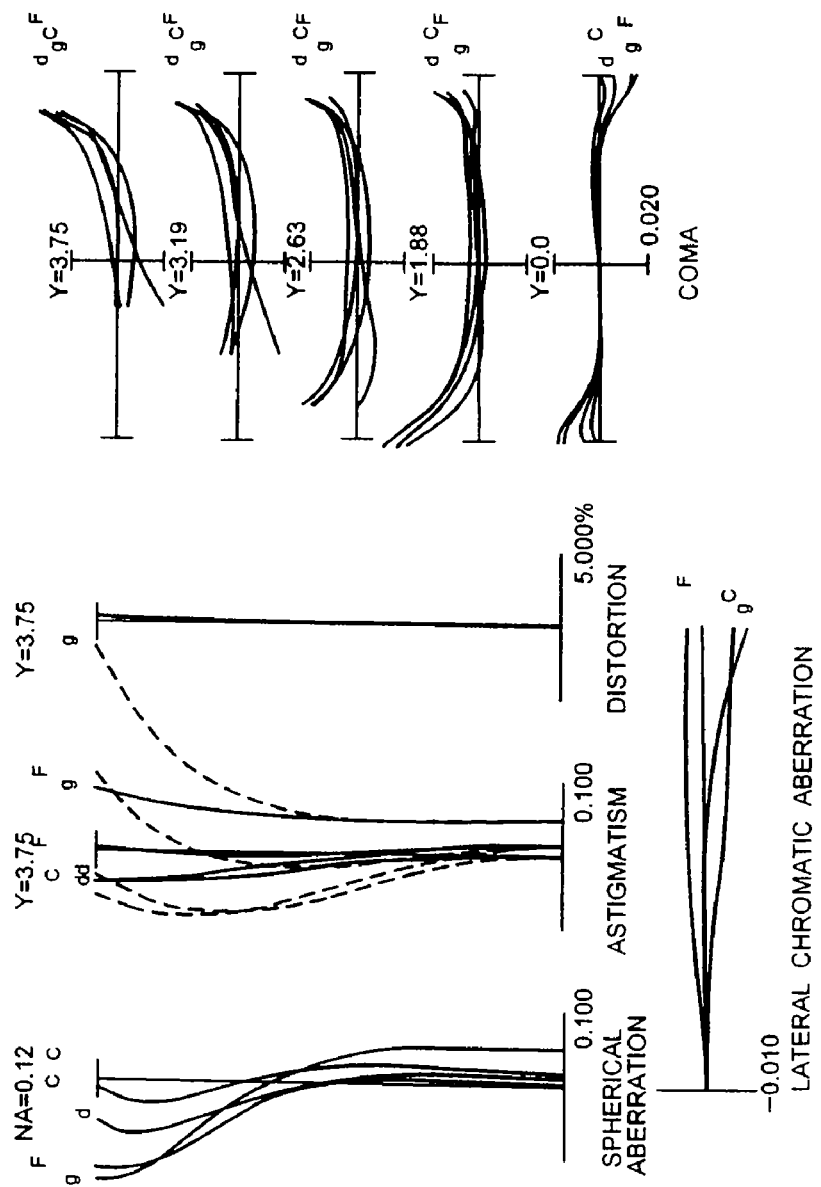

FIGS. 8A-8C are diagrams showing the various types of aberrations in the infinite distance state of the zoom lens in Example 3; FIG. 8A showing the respective aberrations in the wide-angle end state; FIG. 8B showing the aberrations in the intermediate focal length state; and FIG. 8C showing the aberrations in the telephoto end state. FIGS. 9A-9C are diagrams showing the various types of aberrations in the close photographing distance focusing state of the zoom lens in Example 3; FIG. 9A showing the respective aberrations when Rw=202 mm; FIG. 9B showing the aberrations when Rm=738 mm; and FIG. 9C showing the aberrations when Rt=513 mm.

It is recognized from the individual aberration diagrams that the zoom lens according to Example 3 exhibits an excellent image forming characteristic, wherein the various aberrations are well corrected over a range covering the wide-angle end state through the telephoto end state and further covering when making the vibration-reduction correction in each state.

Example 4

Figure 10:
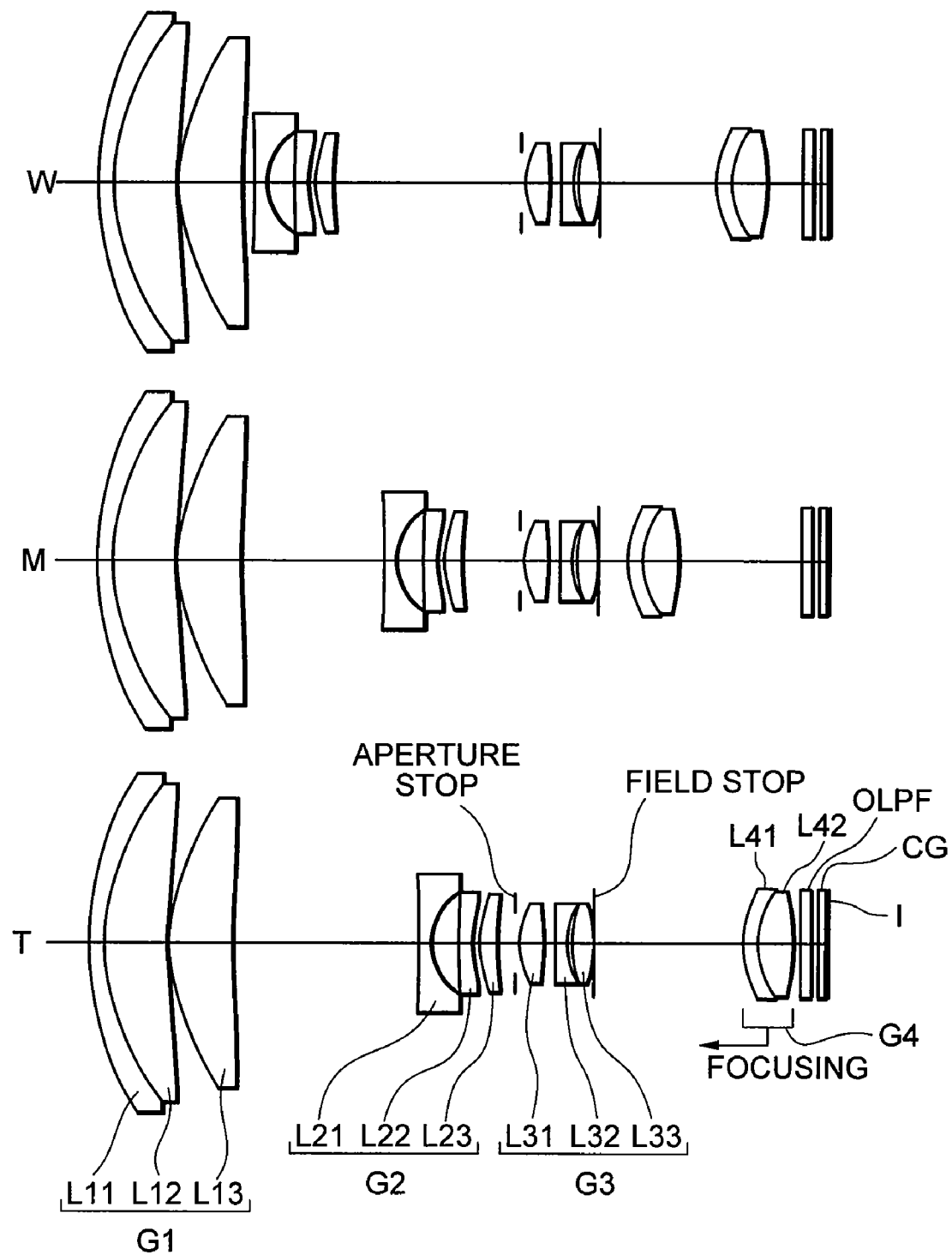
FIG. 10 is a diagram showing a lens configuration of the zoom lens according to Example 4, wherein W represents the wide-angle end state, M connotes the intermediate focal length state, and T represents the telephoto end sate, respectively.

FIG. 10 is a diagram showing a lens configuration of the zoom lens according to Example 4. Table 4 given below shows values in the data table of the zoom lens according to Example 4.

TABLE 4

[Specifications]

| | W | M | T |
|---|---|---|---|
| f = | 6.55 | 30.00 | 61.00 |
| FNO = | 3.5 | 3.5 | 3.7 |

[Lens Data]

| | r | d | νd | nd |
|---|---|---|---|---|
| 1) | 24.5909 | 1.4000 | 20.88 | 1.922860 |
| 2) | 19.4777 | 5.2000 | 82.56 | 1.497820 |
| 3) | 115.1591 | 0.1000 | | |
| 4) | 18.4332 | 5.0000 | 82.56 | 1.497820 |
| 5) | 195.1358 | (d5) | | |
| 6) | −80.2684 | 1.0000 | 40.10 | 1.851350 |
| 7) | 4.3262 | 2.2000 | | |
| 8) | 89.2950 | 1.0000 | 40.77 | 1.883000 |
| 9) | 15.1775 | 0.6000 | | |
| 10) | 10.0334 | 1.5000 | 17.98 | 1.945950 |

TABLE 4-continued

| | | | | |
|---|---|---|---|---|
| 11) | 28.1713 | (d11) | | |
| 12> | 0.0000 | 0.3000 | Aperture stop | |
| 13) | 5.6537 | 2.1000 | 63.97 | 1.514280 |
| 14) | −23.6916 | 0.9000 | | |
| 15) | −327.0168 | 1.0000 | 42.72 | 1.834810 |
| 16) | 6.2930 | 0.4000 | | |
| 17) | 10.6945 | 1.8000 | 91.20 | 1.456000 |
| 18) | −8.9087 | 0.0000 | | |
| 19) | 0.0000 | (d19) | Field Stop | |
| 20) | 13.0182 | 1.0000 | 25.46 | 2.000690 |
| 21) | 8.7558 | 2.6000 | 91.30 | 1.455590 |
| 22) | −37.1642 | (d22) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Data]

Surface Number: 4

K = 0.5000
C4 = 2.43110E−06
C6 = 0.00000E+00
C8 = 0.00000E+00

Surface Number: 7

K = −0.8038
C4 = 1.87930E−03
C6 = −1.33170E−05
C8 = 0.00000E+00

Surface Number: 13

K = 0.5707
C4 = −4.07580E−04
C6 = 0.00000E+00
C8 = 0.00000E+00

Surface Number: 22

K = −99.0000
C4 = −3.32860E−04
C6 = 0.00000E+00
C8 = 0.00000E+00

[Variable Distances]

| | W | M | T |
|---|---|---|---|
| | Focusing on infinity | | |
| f | 6.55000 | 30.00000 | 60.10000 |
| D0 | ∞ | ∞ | ∞ |
| d5 | 1.02020 | 12.36308 | 15.22189 |
| d11 | 15.63505 | 4.29217 | 1.43336 |
| d19 | 10.13097 | 3.05373 | 12.83541 |
| d22 | 3.47935 | 10.55659 | 0.77491 |
| Bf | 0.15320 | 0.15320 | 0.15320 |
| TL | 60.41878 | 60.41878 | 60.41878 |
| | Focusing on a close object | | |
| β | −0.04000 | −0.04000 | −0.10000 |
| D0 | 140.5720 | 667.7010 | 426.1274 |
| d5 | 1.02020 | 12.36308 | 15.22189 |
| d11 | 15.63505 | 4.29217 | 1.43336 |
| d19 | 9.46632 | 1.30190 | 1.39860 |
| d22 | 4.14400 | 12.30842 | 12.21172 |
| Bf | 0.15320 | 0.15320 | 0.15320 |
| TL | 60.41878 | 60.41878 | 60.41878 |

[Values for Conditional Expressions]

(1): Np = 1.4843
(2): νp = 82.32
(3): F1/Fw = 4.358
(4): Nn = 1.9195
(5): νn = 29.69
(6): F2/Fw = −0.835
(7): N2 = 1.8934

Figure 11A:
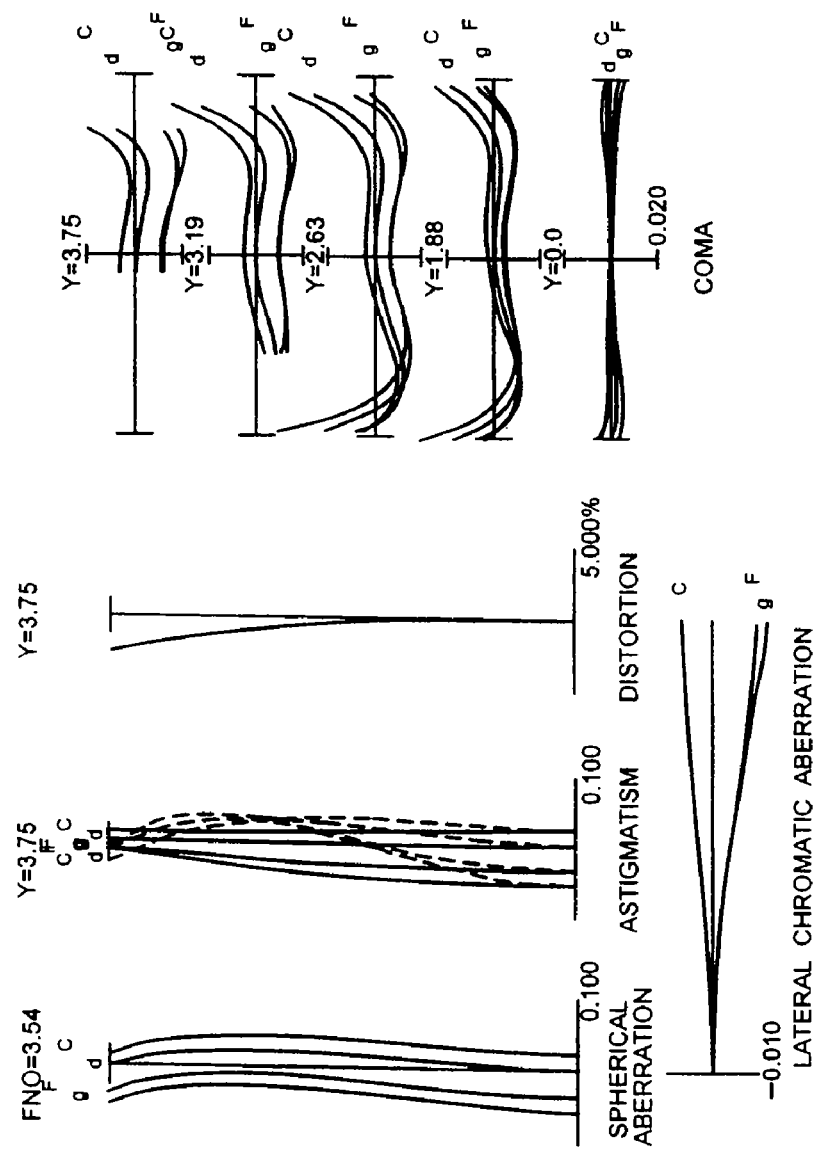
FIGS. 11A-11C are diagrams showing the various types of aberrations in the infinite distance state of the zoom lens in Example 4.
Figure 11B:
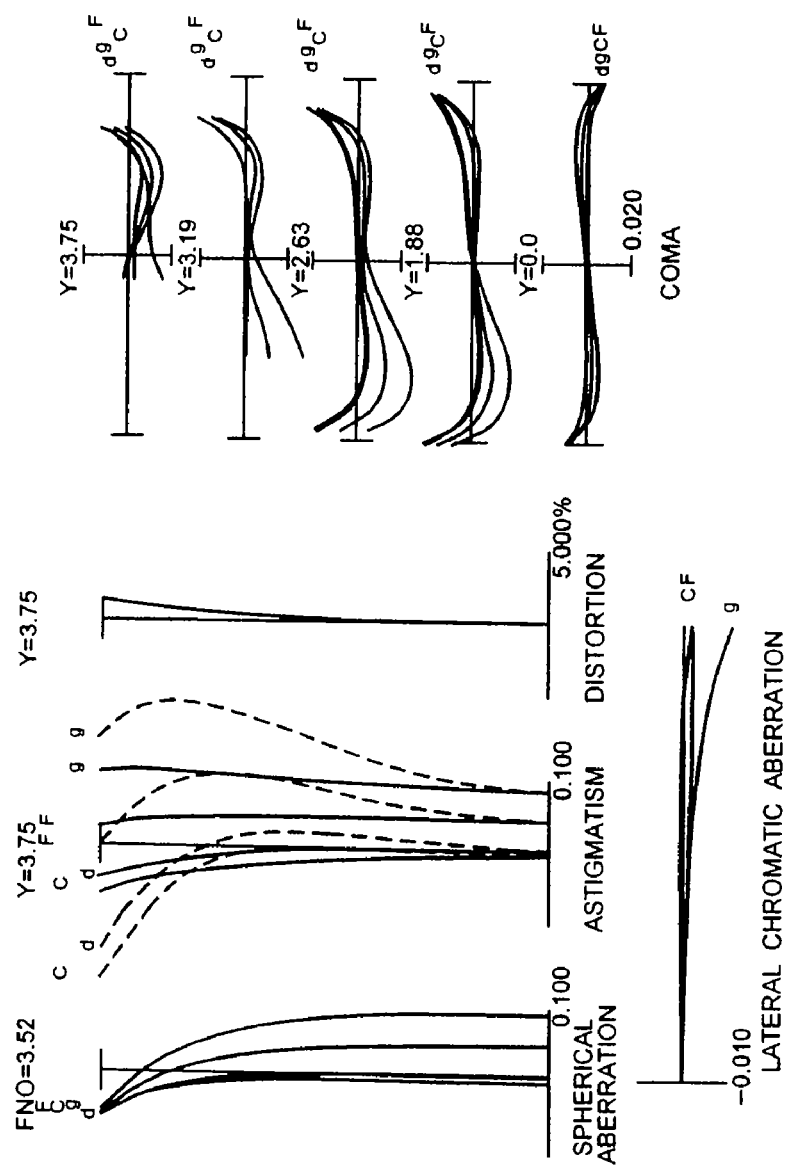
Figure 11C:
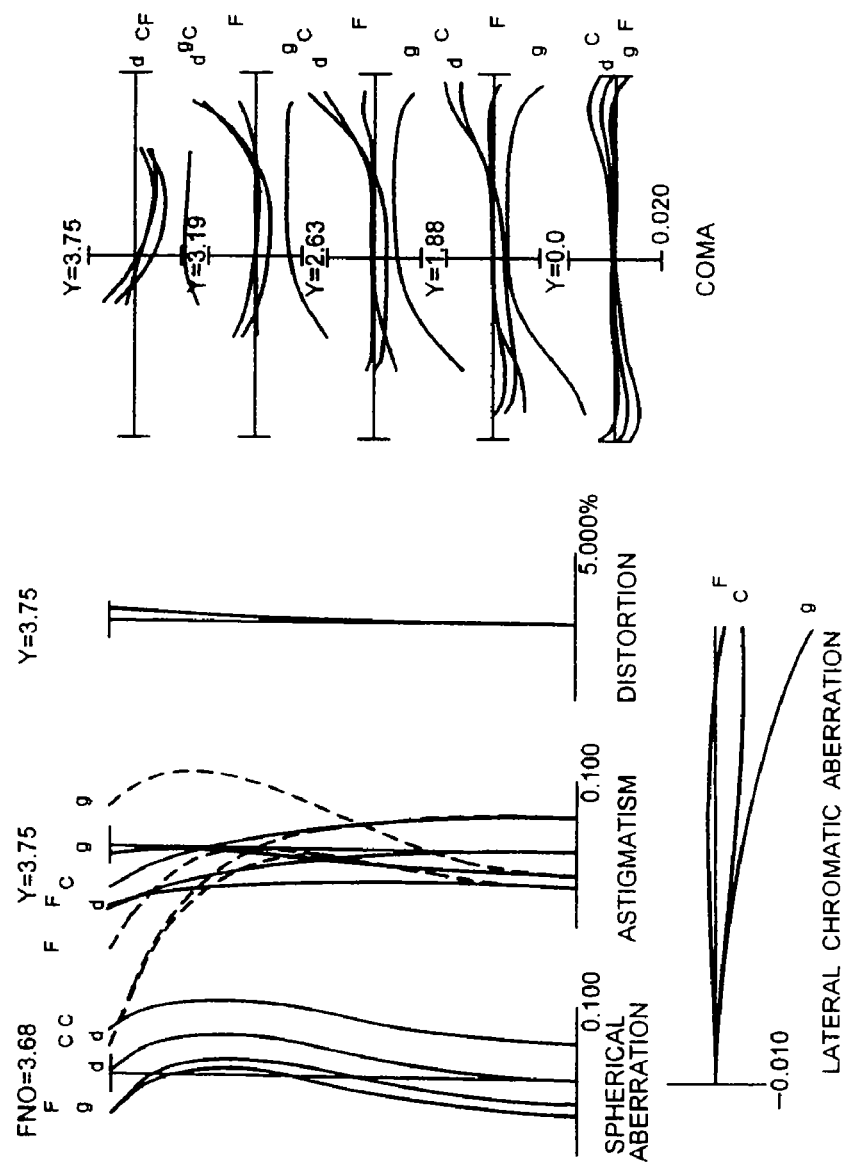
Figure 12A:
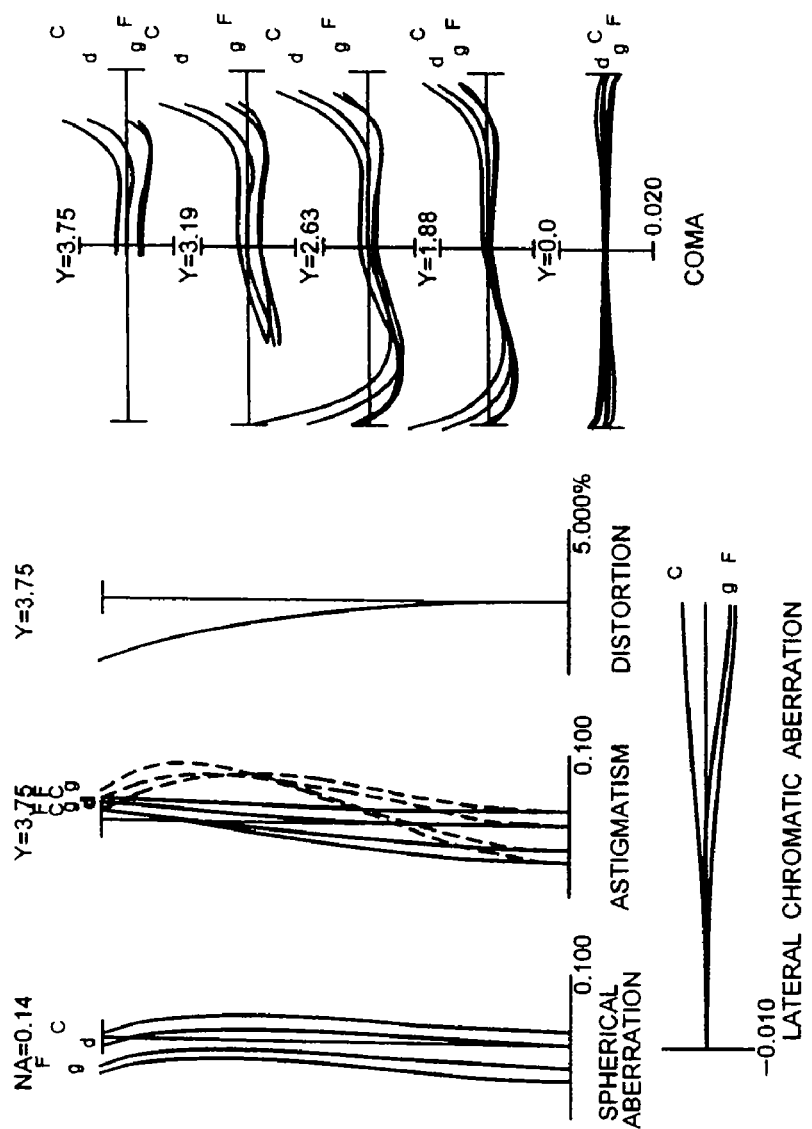
FIGS. 12A-12C are diagrams showing the various types of aberrations in the close photographing distance focusing state of the zoom lens in Example 4.
Figure 12B:
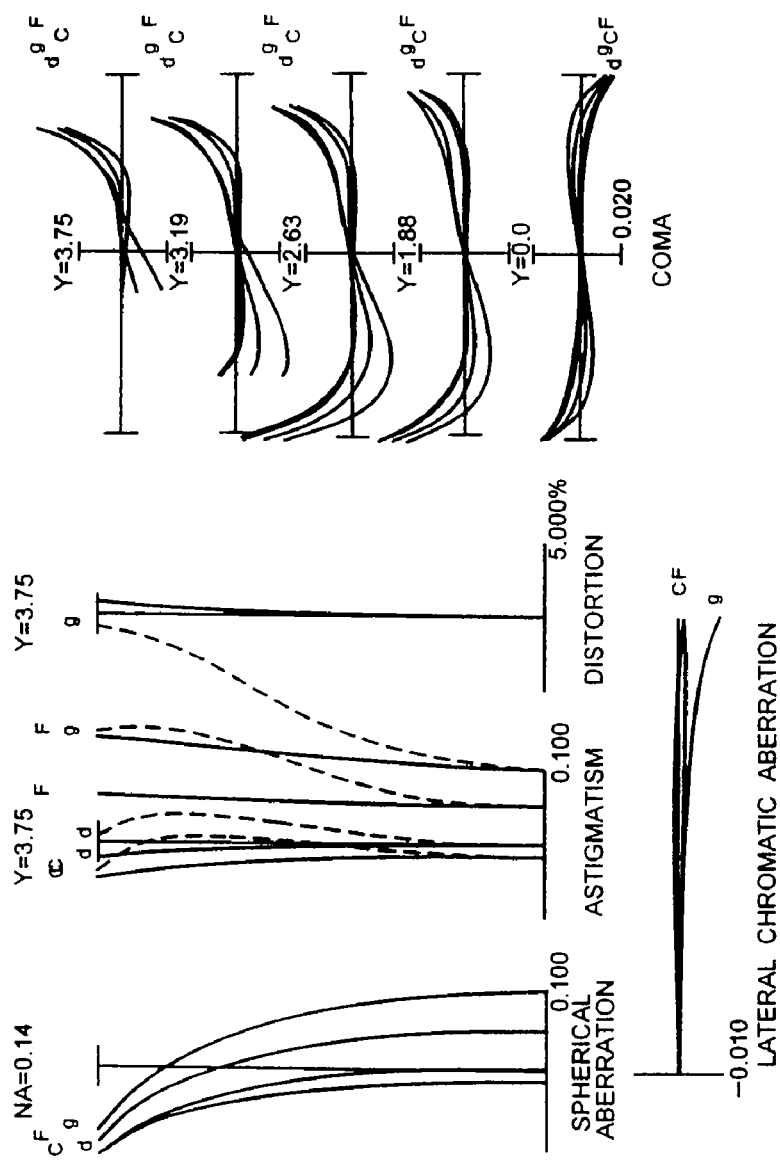
Figure 12C:
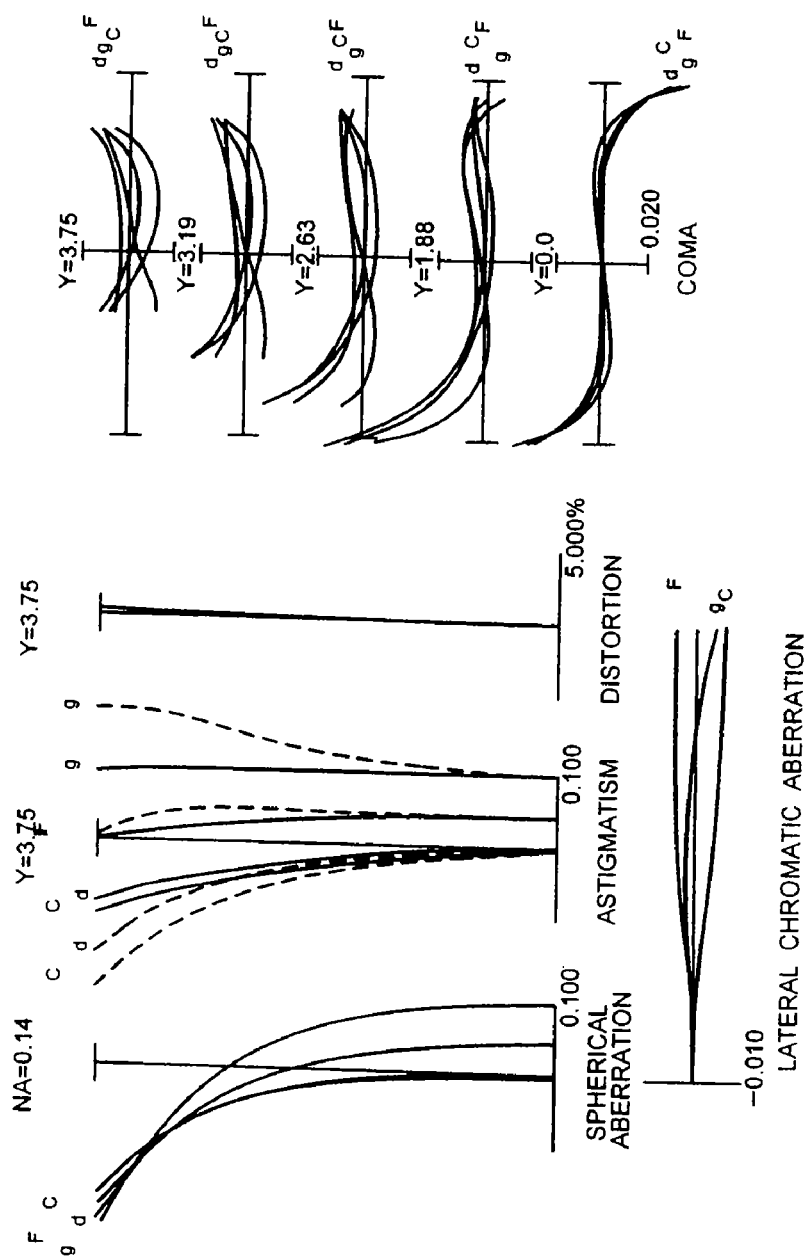

FIGS. 11A-11C are diagrams showing the various types of aberrations in the infinite distance state of the zoom lens in Example 4; FIG. 11A showing the respective aberrations in the wide-angle end state; FIG. 11B showing the aberrations in the intermediate focal length state; and FIG. 11C shows the aberrations in the telephoto end state. FIGS. 12A-12C are diagrams showing the various types of aberrations in the close photographing distance focusing state of the zoom lens in Example 4; FIG. 12A showing the respective aberrations when Rw=201 mm; FIG. 12B showing the aberrations when Rm=728 mm; and FIG. 12C showing the aberrations when Rt=487 mm.

It is recognized from the individual aberration diagrams that the zoom lens according to Example 4 exhibits an excellent image forming characteristic, wherein the various aberrations are well corrected over a range covering the wide-angle end state through the telephoto end state and further covering when making the vibration-reduction correction in each state.

Example 5

Figure 13:
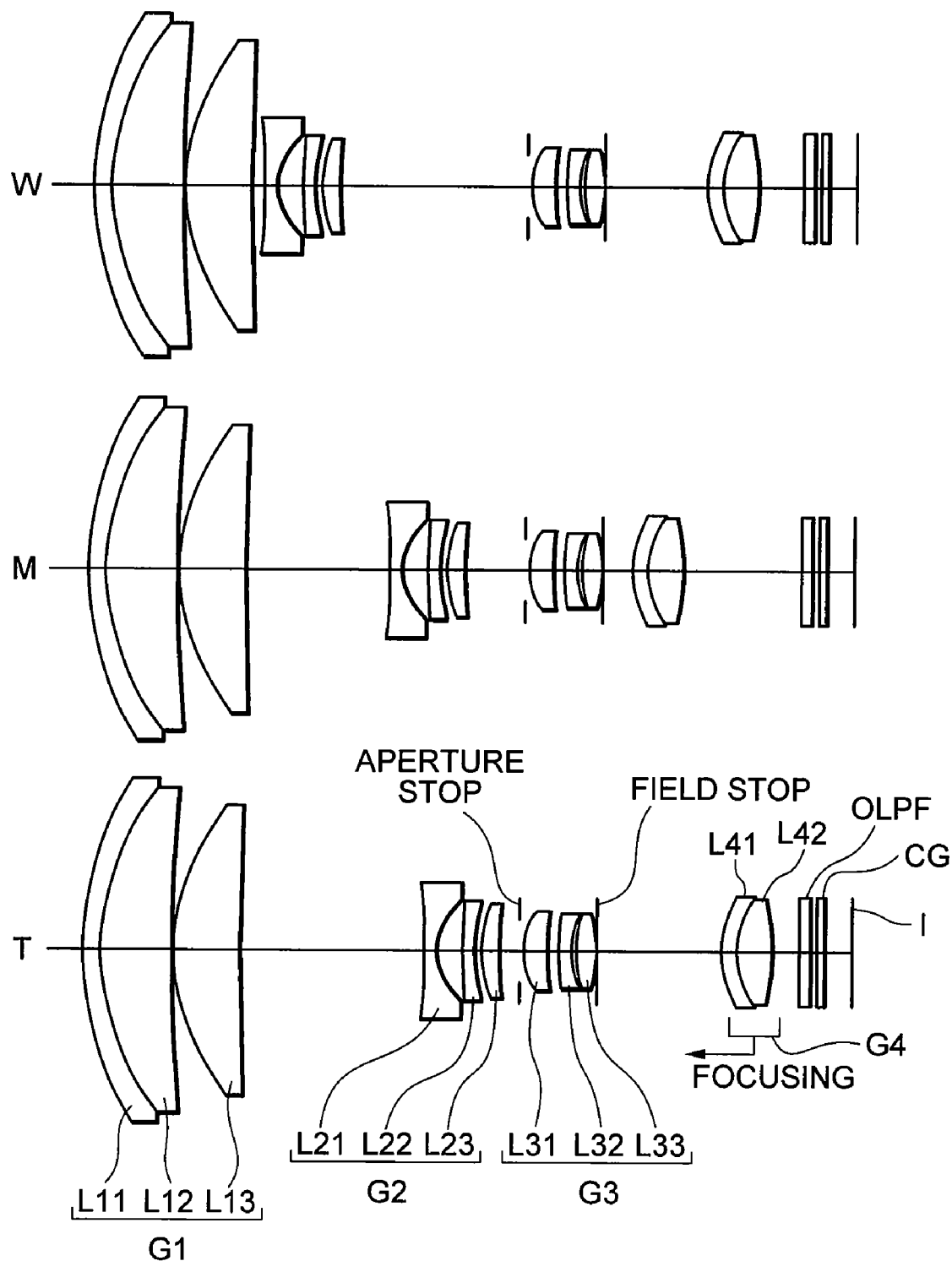
FIG. 13 is a diagram showing a lens configuration of the zoom lens according to Example 5, wherein W represents the wide-angle end state, M connotes the intermediate focal length state, and T represents the telephoto end sate, respectively.

FIG. 13 is a diagram showing a lens configuration of the zoom lens according to Example 5. Table 5 given below shows values in the data table of the zoom lens according to Example 5.

TABLE 5

| [Specifications] | | | |
|---|---|---|---|
| | W | M | T |
| f = | 6.55 | 30.00 | 60.10 |
| FNO = | 3.5 | 3.6 | 3.6 |

[Lens Data]

| | r | d | νd | nd |
|---|---|---|---|---|
| 1) | 26.2824 | 1.4000 | 20.83 | 1.922860 |
| 2) | 21.0438 | 5.9000 | 90.22 | 1.456500 |
| 3) | 228.8413 | 0.1000 | | |
| 4) | 17.1969 | 5.3000 | 90.91 | 1.454570 |
| 5) | 384.2679 | (d5) | | |
| 6) | −48.0949 | 1.0000 | 40.10 | 1.851350 |
| 7) | 4.3298 | 2.2000 | | |
| 8) | 67.2370 | 1.0000 | 40.77 | 1.883000 |
| 9) | 14.7215 | 0.6000 | | |
| 10) | 10.4892 | 1.5000 | 17.98 | 1.945950 |
| 11) | 35.3651 | (d11) | | |
| 12> | 0.0000 | 0.3000 | Aperture Stop | |
| 13) | 5.3545 | 2.1000 | 63.97 | 1.514280 |
| 14) | 20.6091 | 0.9000 | | |
| 15) | 22.0033 | 1.0000 | 42.72 | 1.834810 |
| 16) | 6.1272 | 0.4000 | | |
| 17) | 10.2439 | 1.8000 | 91.20 | 1.456000 |
| 18) | −9.5325 | 0.0000 | | |
| 19) | 0.0000 | (d19) | | |
| 20) | 9.9547 | 1.0000 | 25.46 | 2.000690 |
| 21) | 6.7749 | 2.6000 | 91.30 | 1.455590 |
| 22) | −50.2288 | (d22) | | |
| 23) | 0.0000 | 0.9000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Data]

Surface Number: 4

K = 0.5000
C4 = 3.76710E−06
C6 = 0.00000E+00
C8 = 0.00000E+00

TABLE 5-continued

Surface Number: 7

K = −0.7125
C4 = 1.62070E−03
C6 = −2.29890E−05
C8 = 0.00000E+00

Surface Number: 13

K = 0.6618
C4 = −3.30480E−04
C6 = 0.00000E+00
C8 = 0.00000E+00

Surface Number: 22

K = −99.0000
C4 = −2.73180E−04
C6 = 0.00000E+00
C8 = 0.00000E+00

[Variable Distances]

|  | W | M | T |
|---|---|---|---|
| Focusing on infinity | | | |
| f | 6.55000 | 30.00000 | 60.10000 |
| D0 | ∞ | ∞ | ∞ |
| d5 | 1.02020 | 12.17258 | 15.26467 |
| d11 | 15.30818 | 4.15580 | 1.06371 |
| d19 | 8.76585 | 2.98255 | 10.66236 |
| d22 | 4.01583 | 9.79913 | 2.11932 |
| Bf | 2.37189 | 2.37189 | 2.37189 |
| TL | 62.48195 | 62.48195 | 62.48195 |
| Focusing on a close object | | | |
| β | −0.04000 | −0.04000 | −0.10000 |
| D0 | 141.5092 | 674.0564 | 452.9397 |
| d5 | 1.02020 | 12.17258 | 15.26467 |
| d11 | 15.30818 | 4.15580 | 1.06371 |
| d19 | 8.31502 | 1.48999 | 1.94430 |
| d22 | 4.46666 | 11.29169 | 10.83738 |
| Bf | 2.37189 | 2.37189 | 2.37189 |
| TL | 62.48195 | 62.48195 | 62.48195 |

[Values for Conditional Expressions]

(1): Np = 1.4674
(2): vp = 85.52
(3): F1/Fw = 4.358
(4): Nn = 1.9195
(5): vn = 29.96
(6): F2/Fw = −0.835
(7): N2 = 1.8934

Figure 14A:
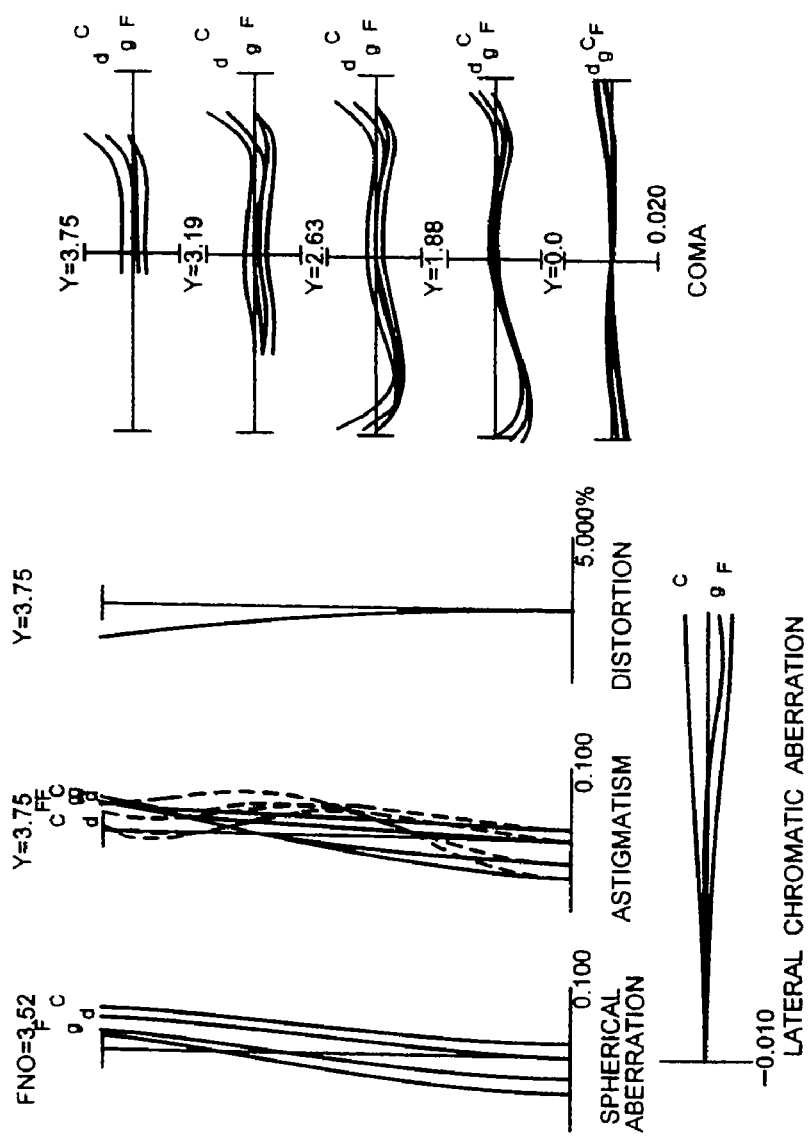
FIGS. 14A-14C are diagrams showing the various types of aberrations in the infinite distance state of the zoom lens in Example 5.
Figure 14B:
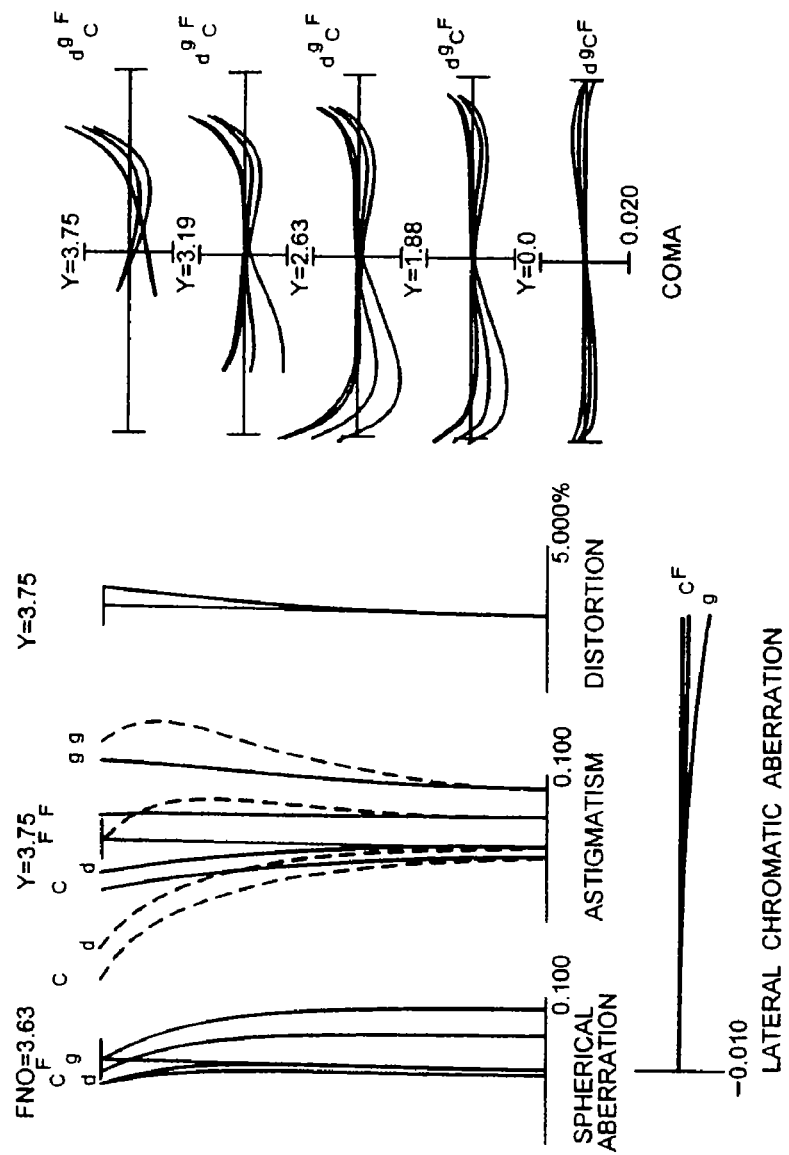
Figure 14C:
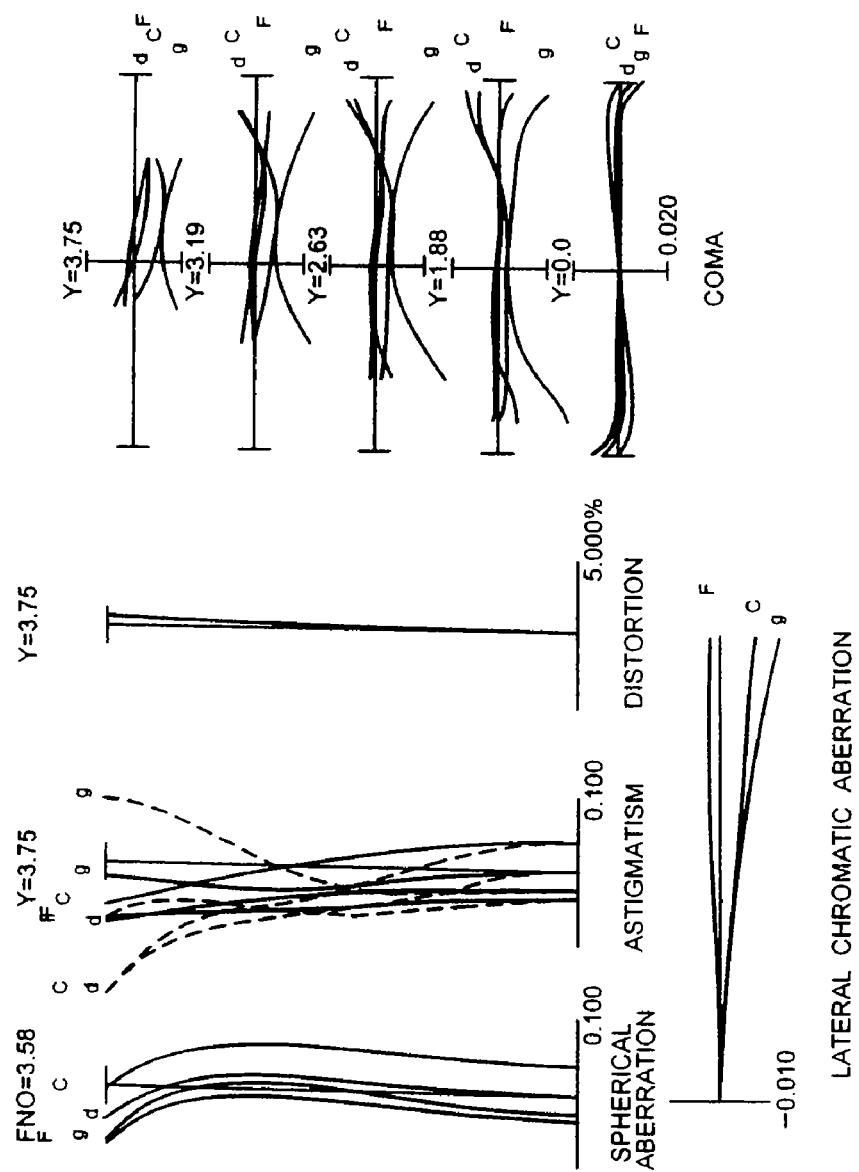
Figure 15A:
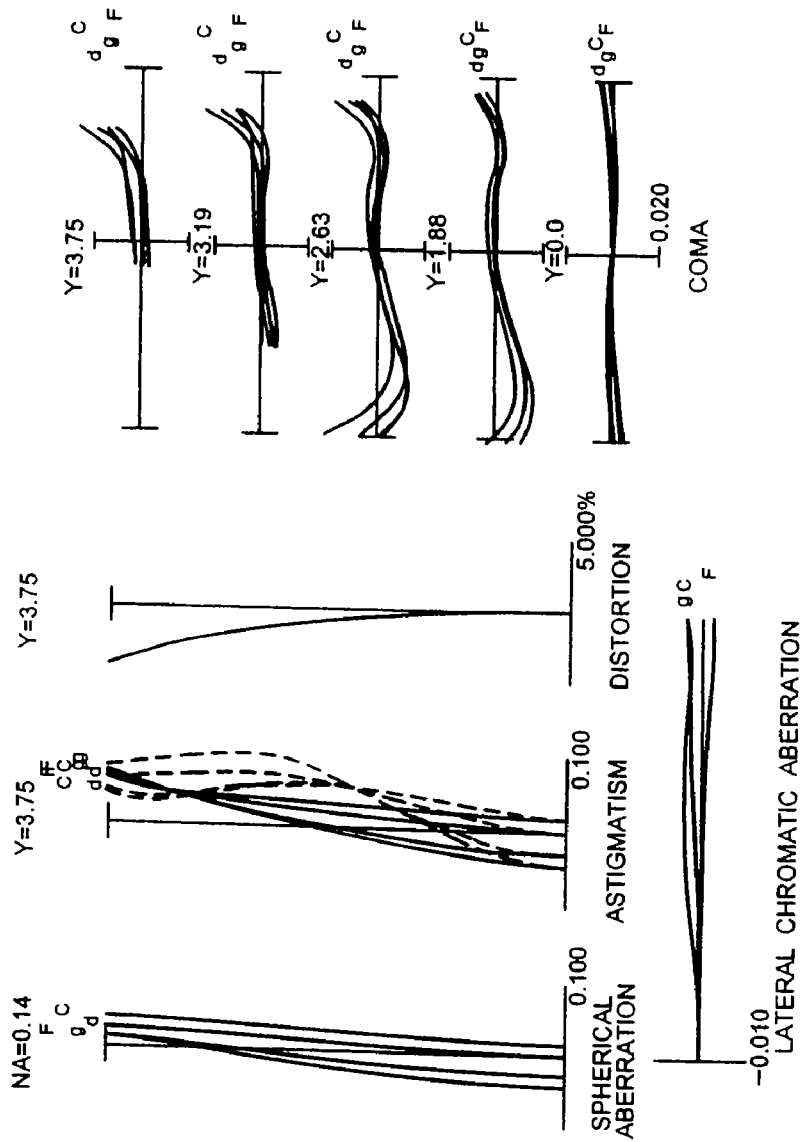
FIGS. 15A-15C are diagrams showing the various types of aberrations in the close photographing distance focusing state of the zoom lens in Example 5.
Figure 15B:
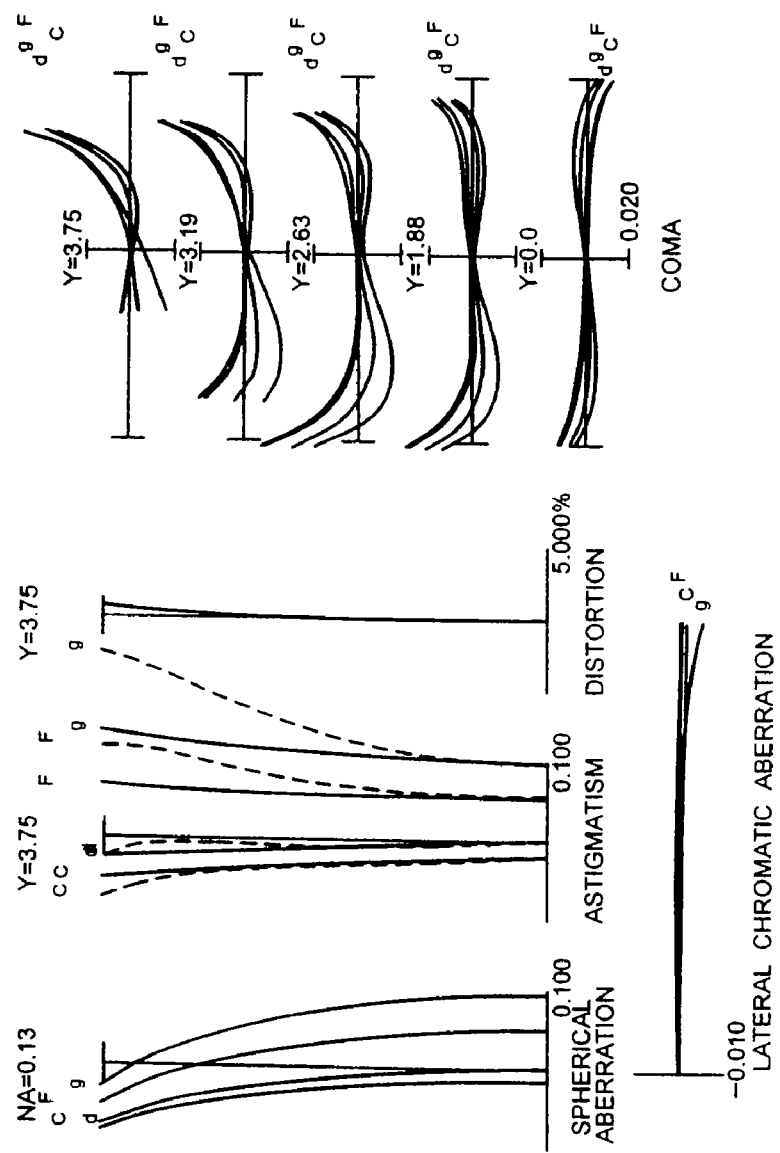
Figure 15C:
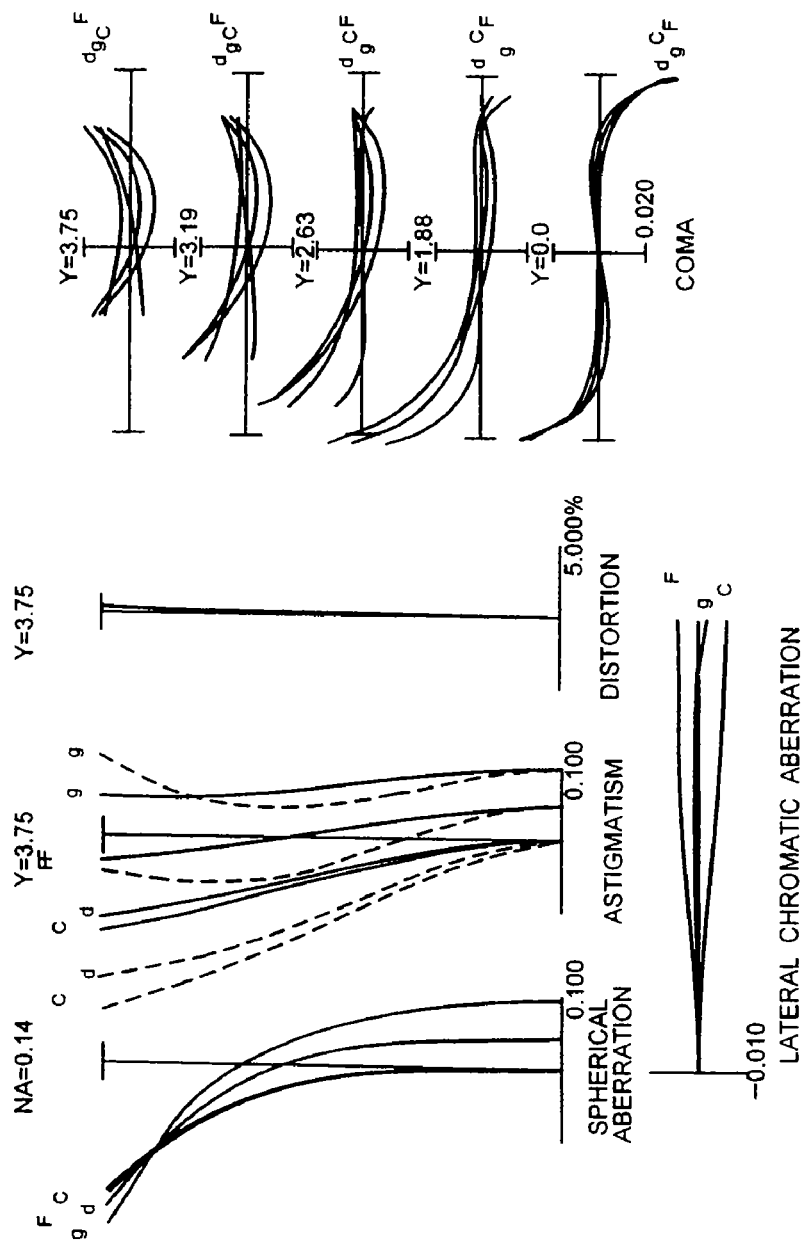

FIGS. 14A-14C are diagrams showing the various types of aberrations in the infinite distance state of the zoom lens in Example 5; FIG. 14A showing the respective aberrations in the wide-angle end state; FIG. 14B showing the aberrations in the intermediate focal length state; and FIG. 14C showing the aberrations in the telephoto end state. FIGS. 15A-15C are diagrams showing the various types of aberrations in the close photographing distance focusing state of the zoom lens in Example 5; FIG. 15A showing the respective aberrations when Rw=204 mm; FIG. 15B showing the aberrations when Rm=737 mm; and FIG. 15C showing the aberrations when Rt=515 mm.

It is recognized from the individual aberration diagrams that the zoom lens according to Example 5 exhibits an excellent image forming characteristic, wherein the various aberrations are well corrected over a range covering the wide-angle end state through the telephoto end state and further covering when making the vibration-reduction correction in each state.

Example 6

Figure 16:
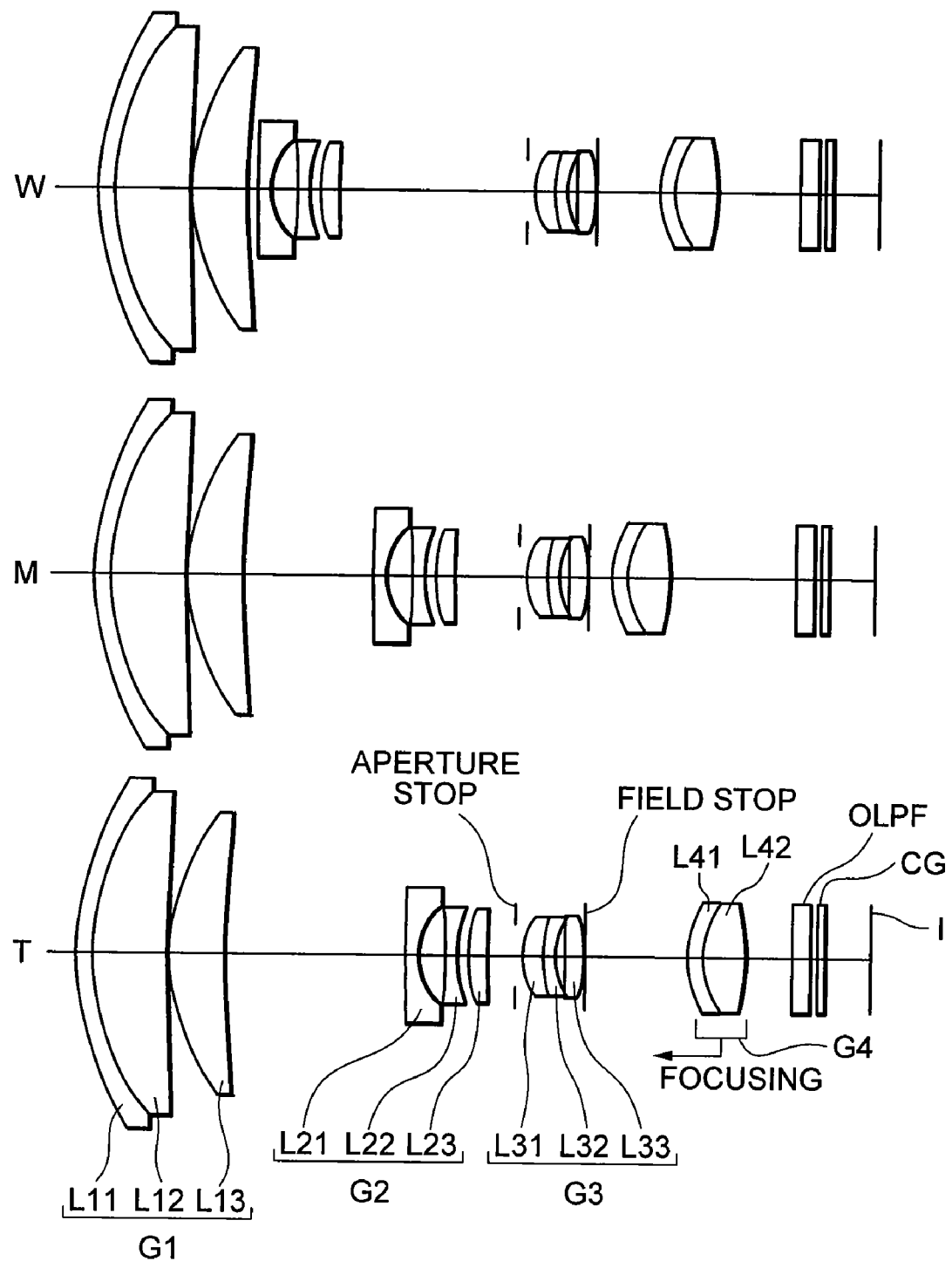
FIG. 16 is a diagram showing a lens configuration of the zoom lens according to Example 6, wherein W represents the wide-angle end state, M connotes the intermediate focal length state, and T represents the telephoto end sate, respectively.

FIG. 16 is a diagram showing a lens configuration of the zoom lens according to Example 6. Table 6 given below shows values in the data table of the zoom lens according to Example 6.

TABLE 6

[Specifications]

|  | W | M | T |
|---|---|---|---|
| f = | 6.50 | 30.00 | 60.10 |
| FNO = | 3.5 | 3.8 | 3.4 |

[Lens Data]

|  | r | d | vd | nd |
|---|---|---|---|---|
| 1) | 25.9678 | 1.4000 | 17.98 | 1.945950 |
| 2) | 21.0210 | 6.1000 | 82.56 | 1.497820 |
| 3) | 339.3220 | 0.1000 | | |
| 4) | 17.2833 | 4.7000 | 82.56 | 1.497820 |
| 5) | 132.3282 | (d5) | | |
| 6) | −1236.7392 | 1.0000 | 40.19 | 1.850490 |
| 7) | 5.0328 | 2.2000 | | |
| 8) | −38.8019 | 1.0000 | 40.77 | 1.883000 |
| 9) | 11.0291 | 0.9000 | | |
| 10) | 11.6547 | 1.6000 | 17.98 | 1.945950 |
| 11) | 96.0997 | (d11) | | |
| 12> | 0.0000 | 0.5000 | Aperture Stop | |
| 13) | 4.8302 | 1.8000 | 70.45 | 1.487490 |
| 14) | 11.7906 | 0.1000 | | |
| 15) | 9.0250 | 1.0000 | 42.72 | 1.834810 |
| 16) | 5.3685 | 0.8000 | | |
| 17) | −83.9696 | 1.7000 | 82.56 | 1.497820 |
| 18) | −10.6798 | 0.0000 | | |
| 19) | 0.0000 | (d19) | Field Stop | |
| 20) | 9.8440 | 1.0000 | 25.46 | 2.000690 |
| 21) | 6.4780 | 3.5000 | 82.56 | 1.497820 |
| 22) | −21.7650 | (d22) | | |
| 23) | 0.0000 | 1.6000 | 70.51 | 1.544370 |
| 24) | 0.0000 | 0.5000 | | |
| 25) | 0.0000 | 0.5000 | 64.12 | 1.516800 |
| 26) | 0.0000 | Bf | | |

[Aspherical Data]

Surface Number: 4

K = 0.4504
C4 = 6.12900E−06
C6 = 4.75680E−09
C8 = 0.00000E+00

Surface Number: 7

K = 0.2496
C4 = 3.63880E−04
C6 = 7.00120E−06
C8 = −1.36530E−08

Surface Number: 13

K = 0.1671
C4 = 1.54140E−04
C6 = 2.28490E−05
C8 = −9.89080E−07

Surface Number: 22

K = 1.0000
C4 = −1.16660E−04
C6 = 0.00000E+00
C8 = 0.00000E+00

TABLE 6-continued

[Variable Distances]

|    | W | M | T |
|---|---|---|---|
| | Focusing on infinity | | |
| f   | 6.55000   | 30.00000  | 60.10000  |
| D0  | ∞         | ∞         | ∞         |
| d5  | 0.90000   | 10.93565  | 13.96348  |
| d11 | 15.13311  | 5.09746   | 2.06963   |
| d19 | 5.66087   | 2.06239   | 8.70390   |
| d22 | 6.59264   | 10.19112  | 3.54961   |
| Bf  | 4.20934   | 4.20934   | 4.20934   |
| TL  | 64.49596  | 64.49596  | 64.49596  |
| | Focusing on a close object | | |
| β   | −0.04000  | −0.04000  | −0.10000  |
| D0  | 140.9181  | 683.8795  | 473.4833  |
| d5  | 0.90000   | 10.93565  | 13.96348  |
| d11 | 15.13311  | 5.09746   | 2.06963   |
| d19 | 5.38098   | 0.85734   | 2.30376   |
| d22 | 6.87253   | 11.39617  | 9.94975   |
| Bf  | 4.20934   | 4.20934   | 4.20934   |
| TL  | 64.49596  | 64.49596  | 64.49596  |

[Values for Conditional Expressions]

(1): Np = 1.4958
(2): νp = 80.14
(3): F1/Fw = 4.096
(4): Nn = 1.9272
(5): νn = 28.72
(6): F2/Fw = −0.790
(7): N2 = 1.8931

Figure 17A:
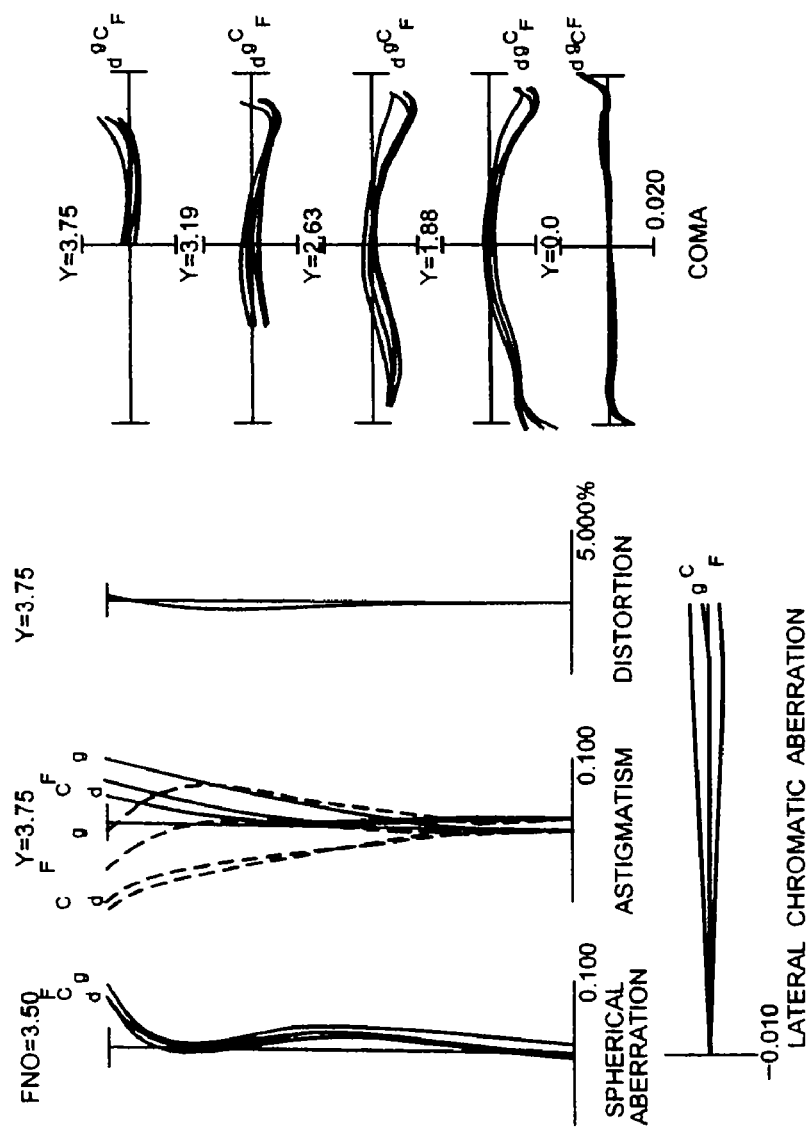
FIGS. 17A-17C are diagrams showing the various types of aberrations in the infinite distance state of the zoom lens in Example 6.
Figure 17B:
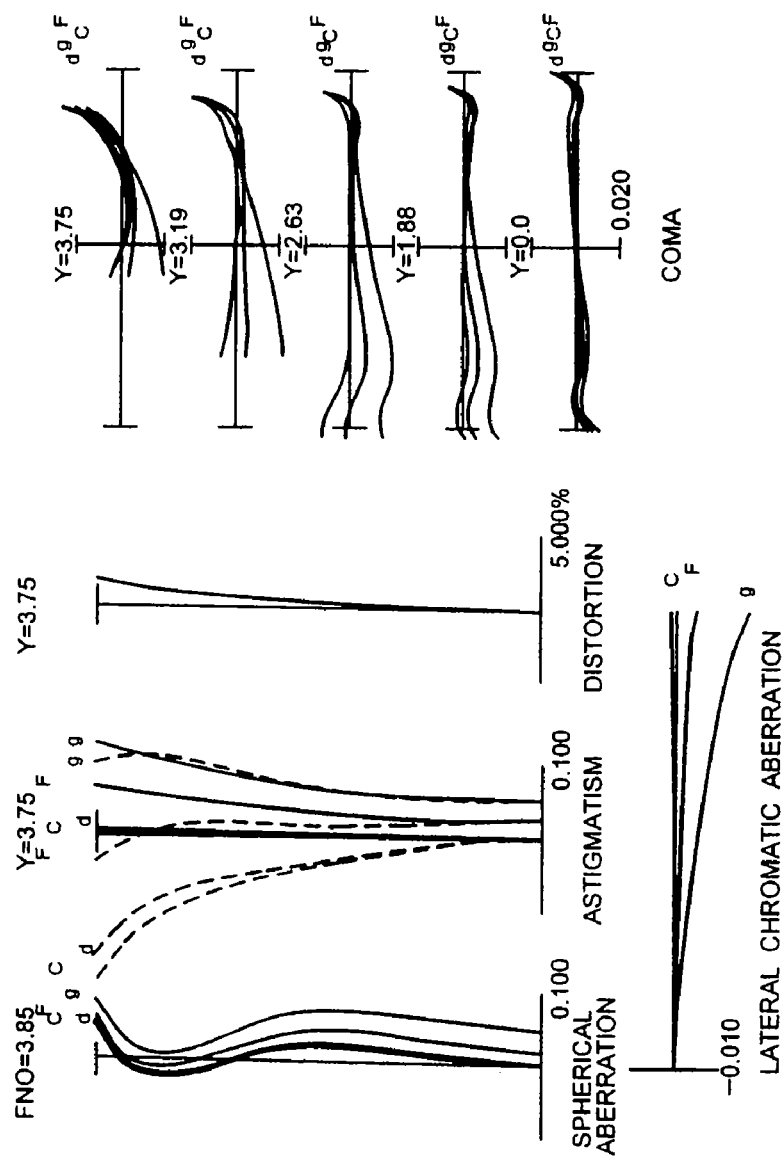
Figure 17C:
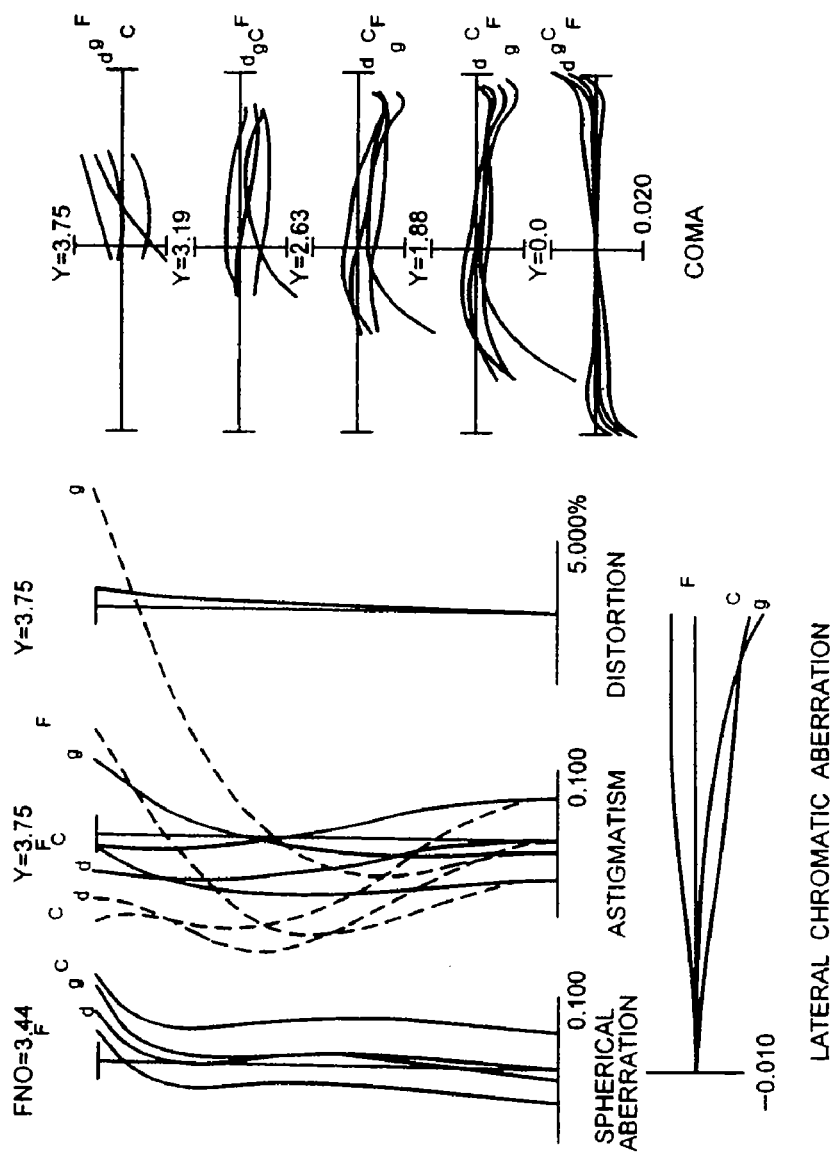
Figure 18A:
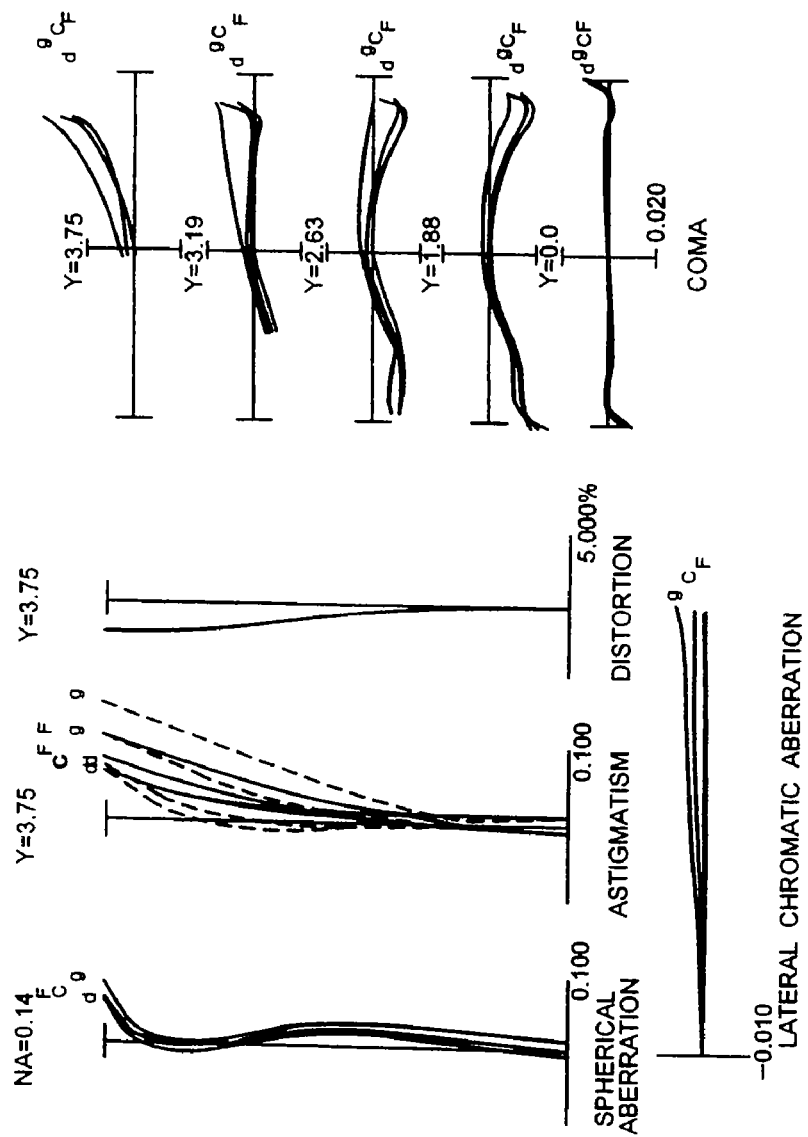
FIGS. 18A-18C are diagrams showing the various types of aberrations in the close photographing distance focusing state of the zoom lens in Example 6.
Figure 18B:
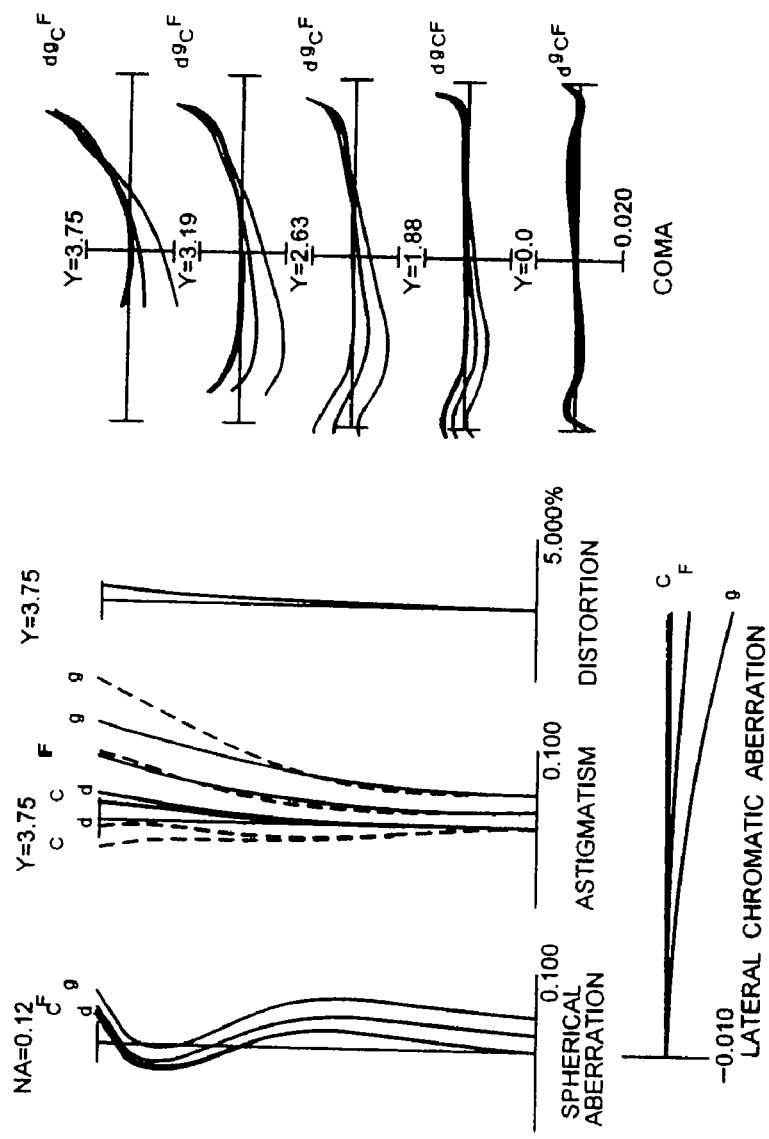
Figure 18C:
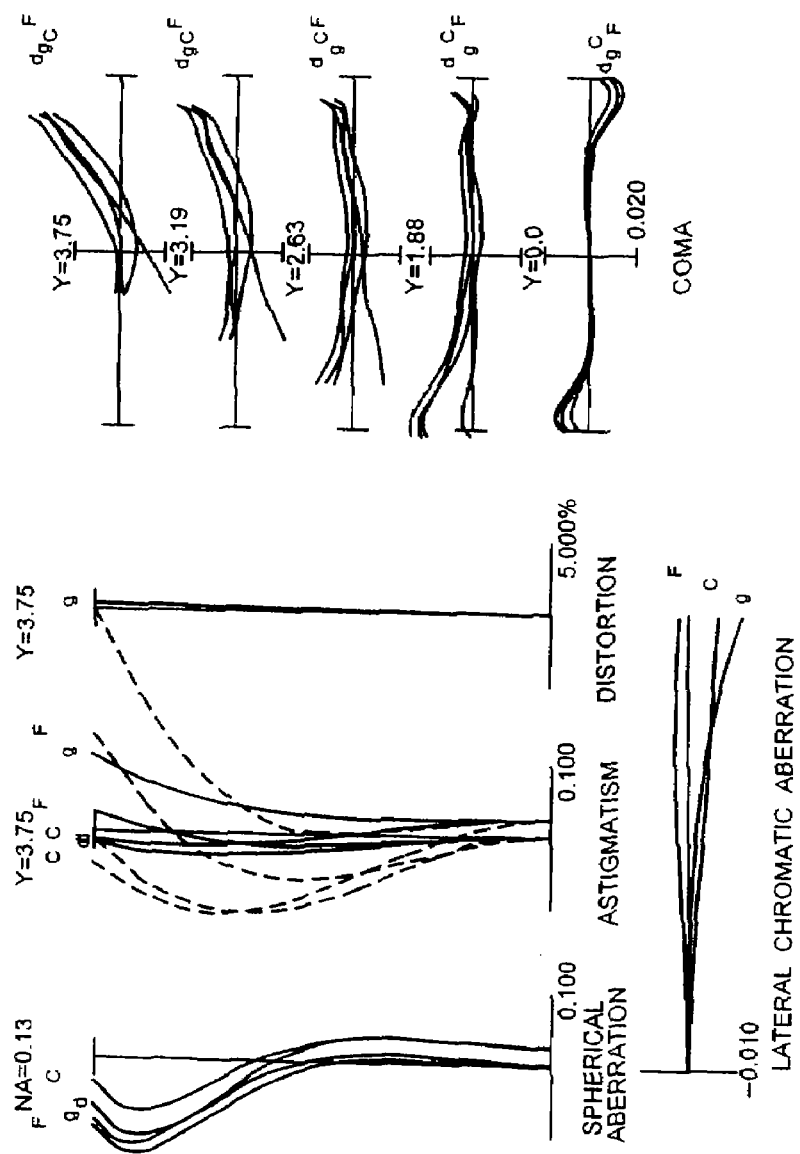

FIGS. 17A-17C are diagrams showing the various types of aberrations in the infinite distance state of the zoom lens in Example 6; FIG. 17A showing the respective aberrations in the wide-angle end state; FIG. 17B showing the aberrations in the intermediate focal length state; and FIG. 17C showing the aberrations in the telephoto end state. FIGS. 18A-18C are diagrams showing the various types of aberrations in the close photographing distance focusing state of the zoom lens in Example 6; FIG. 18A showing the respective aberrations when Rw=205 mm; FIG. 18B showing the aberrations when Rm=748 mm; and FIG. 18C showing the aberrations when Rt=538 mm.

It is recognized from the individual aberration diagrams that the zoom lens according to Example 6 exhibits an excellent image forming characteristic, wherein the various aberrations are well corrected over a range covering the wide-angle end state through the telephoto end state and further covering when making the vibration-reduction correction in each state.

Example 7

Figure 19:
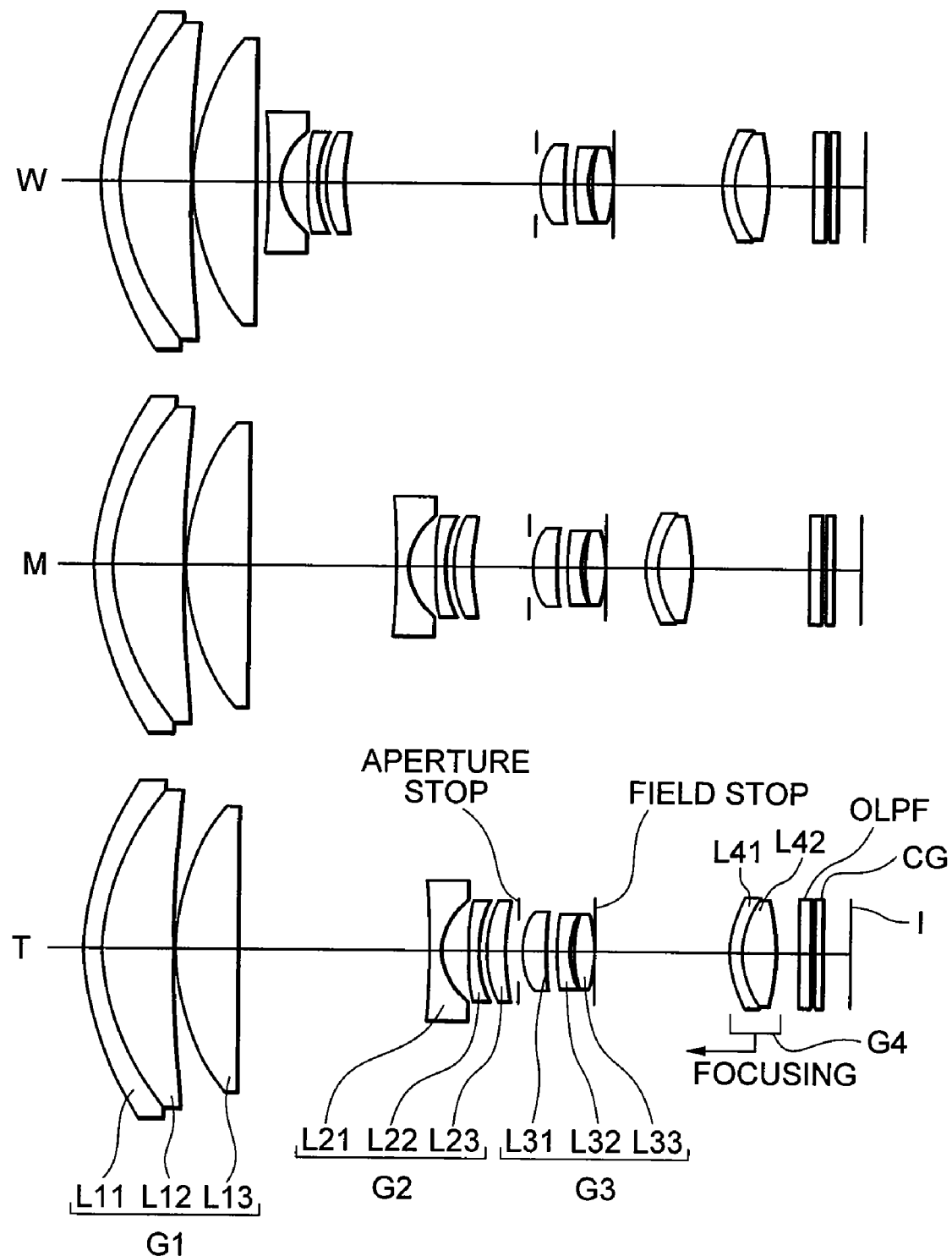
FIG. 19 is a diagram showing a lens configuration of the zoom lens according to Example 7, wherein W represents the wide-angle end state, M connotes the intermediate focal length state, and T represents the telephoto end sate, respectively.

FIG. 19 is a diagram showing a lens configuration of the zoom lens according to Example 7. Table 7 given below shows values in the data table of the zoom lens according to Example 7.

TABLE 7

[Specifications]

|       | W    | M     | T     |
|---|---|---|---|
| f =   | 6.55 | 30.00 | 60.10 |
| FNO = | 3.5  | 3.8   | 3.5   |

TABLE 7-continued

[Lens Data]

|     | r          | d       | νd    | nd       |
|---|---|---|---|---|
| 1)  | 23.8479    | 1.4000  | 25.46 | 2.000690 |
| 2)  | 18.7624    | 5.9000  | 95.25 | 1.433852 |
| 3)  | 167.9070   | 0.1000  |       |          |
| 4)  | 16.8888    | 5.3000  | 90.91 | 1.454570 |
| 5)  | −5137.1460 | (d5)    |       |          |
| 6)  | −46.5253   | 1.0000  | 40.10 | 1.851350 |
| 7)  | 4.2808     | 2.2000  |       |          |
| 8)  | 21.5453    | 1.0000  | 46.58 | 1.804000 |
| 9)  | 10.8456    | 0.6000  |       |          |
| 10) | 9.0254     | 1.5000  | 17.98 | 1.945950 |
| 11) | 20.1834    | (d11)   |       |          |
| 12> | 0.0000     | 0.3000  | Aperture Stop | |
| 13) | 5.4471     | 2.1000  | 63.97 | 1.514280 |
| 14) | 20.0657    | 0.9000  |       |          |
| 15) | 21.6048    | 1.0000  | 42.72 | 1.834810 |
| 16) | 6.2337     | 0.4000  |       |          |
| 17) | 10.2439    | 1.8000  | 91.20 | 1.456000 |
| 18) | −9.5325    | 0.0000  |       |          |
| 19) | 0.0000     | (d19)   | Field Stop | |
| 20) | 9.4629     | 1.0000  | 25.46 | 2.000690 |
| 21) | 6.5553     | 2.6000  | 95.25 | 1.433852 |
| 22) | −46.2338   | (d22)   |       |          |
| 23) | 0.0000     | 0.9000  | 70.51 | 1.544370 |
| 24) | 0.0000     | 0.5000  |       |          |
| 25) | 0.0000     | 0.5000  | 64.12 | 1.516800 |
| 26) | 0.0000     | Bf      |       |          |

[Aspherical Data]

Surface Number: 4

K = 0.5000
C4 = 3.36290E−06
C6 = 0.00000E+00
C8 = 0.00000E+00

Surface Number: 7

K = −0.4928
C4 = 1.29050E−03
C6 = −1.76320E−05
C8 = 0.00000E+00

Surface Number: 13

K = 0.6368
C4 = −2.96970E−04
C6 = 0.00000E+00
C8 = 0.00000E+00

Surface Number: 22

K = −99.0000
C4 = −3.01210E−04
C6 = 0.00000E+00
C8 = 0.00000E+00

[Variable Distances]

|     | W | M | T |
|---|---|---|---|
| | Focusing on infinity | | |
| f   | 6.55000  | 30.00000 | 60.10000 |
| D0  | ∞        | ∞        | ∞        |
| d5  | 1.02020  | 12.17258 | 15.26467 |
| d11 | 15.43955 | 4.28717  | 1.19508  |
| d19 | 8.90776  | 3.12446  | 10.80427 |
| d22 | 3.92934  | 9.71264  | 2.03283  |
| Bf  | 2.37189  | 2.37189  | 2.37189  |
| TL  | 62.66873 | 62.66873 | 62.66873 |
| | Focusing on a close object | | |
| β   | −0.04000 | −0.04000 | −0.10000 |
| D0  | 141.5092 | 674.0564 | 452.9397 |
| d5  | 1.02020  | 12.17258 | 15.26467 |
| d11 | 15.43955 | 4.28717  | 1.19508  |
| d19 | 8.45693  | 1.63190  | 2.08621  |

TABLE 7-continued

| | | | |
|---|---|---|---|
| d22 | 4.38017 | 11.20520 | 10.75089 |
| Bf | 2.37189 | 2.37189 | 2.37189 |
| TL | 62.66873 | 62.66873 | 62.66873 |

[Values for Conditional Expressions]

(1): Np = 1.4585
(2): νp = 87.32
(3): F1/Fw = 4.358
(4): Nn = 1.9454
(5): νn = 31.21
(6): F2/Fw = −0.835
(7): N2 = 1.8671

Figure 20A:
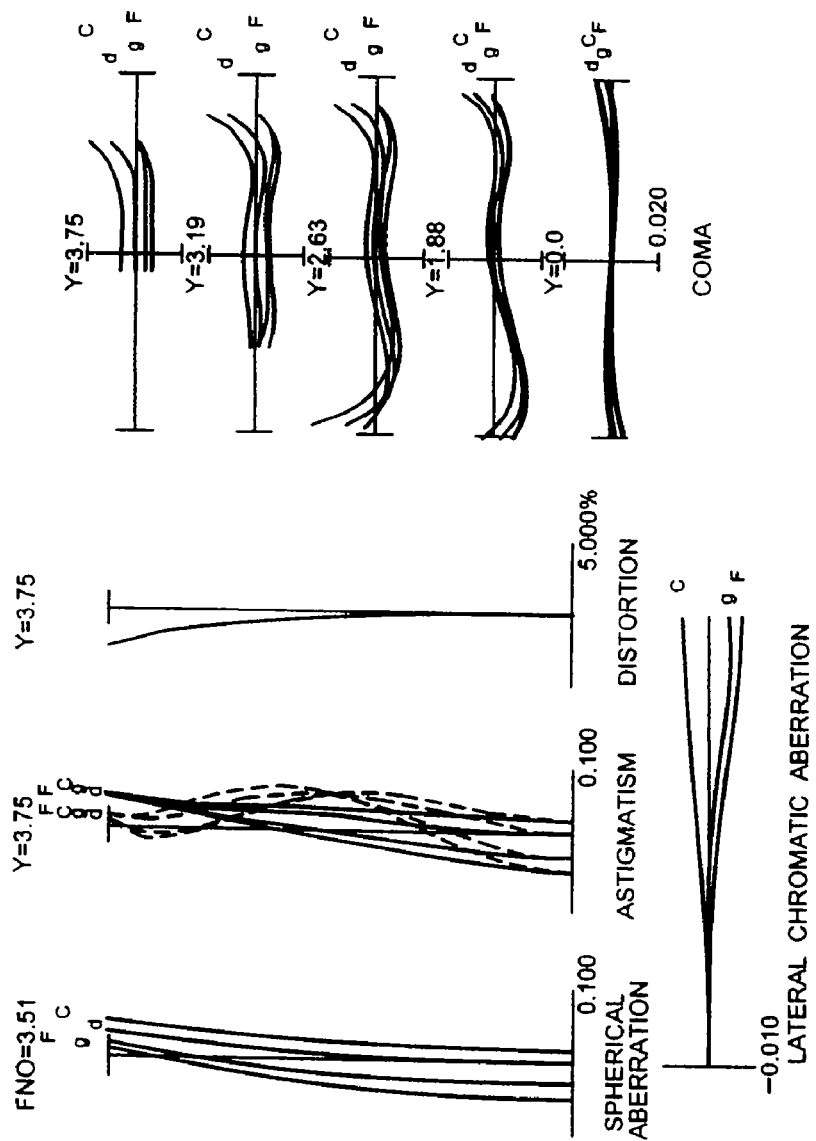
FIGS. 20A-20C are diagrams showing the various types of aberrations in the infinite distance state of the zoom lens in Example 7.
Figure 20B:
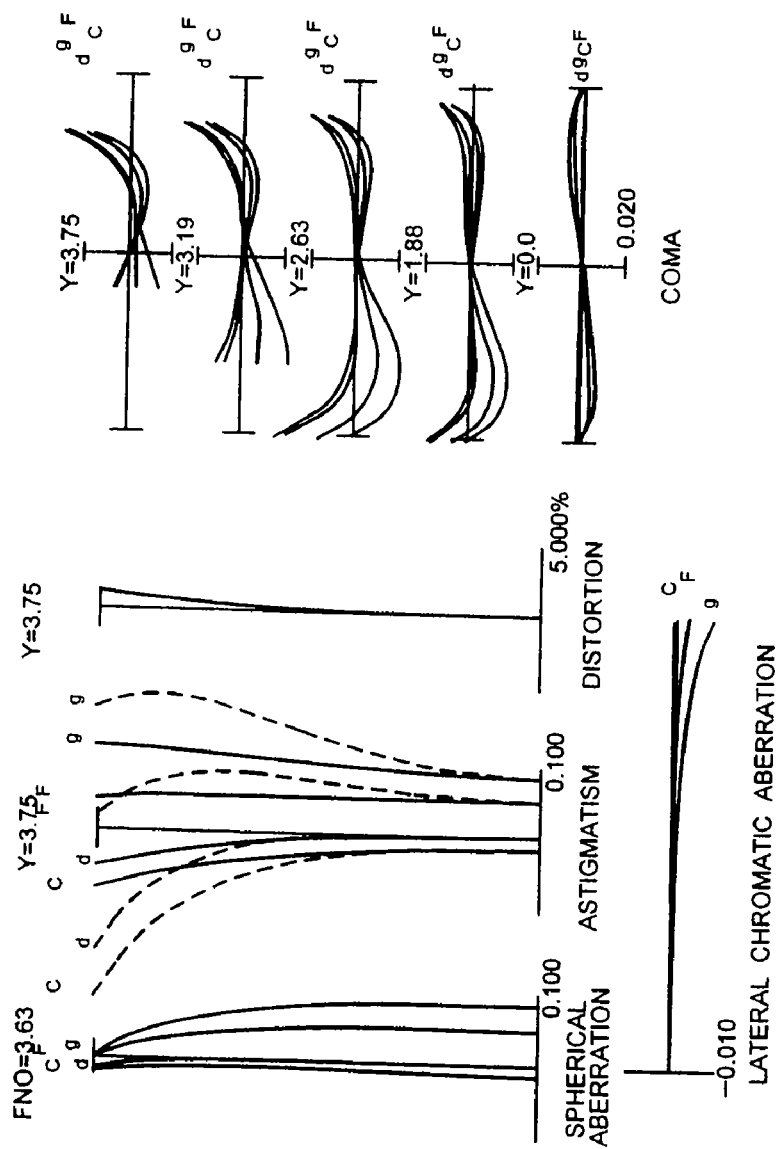
Figure 20C:
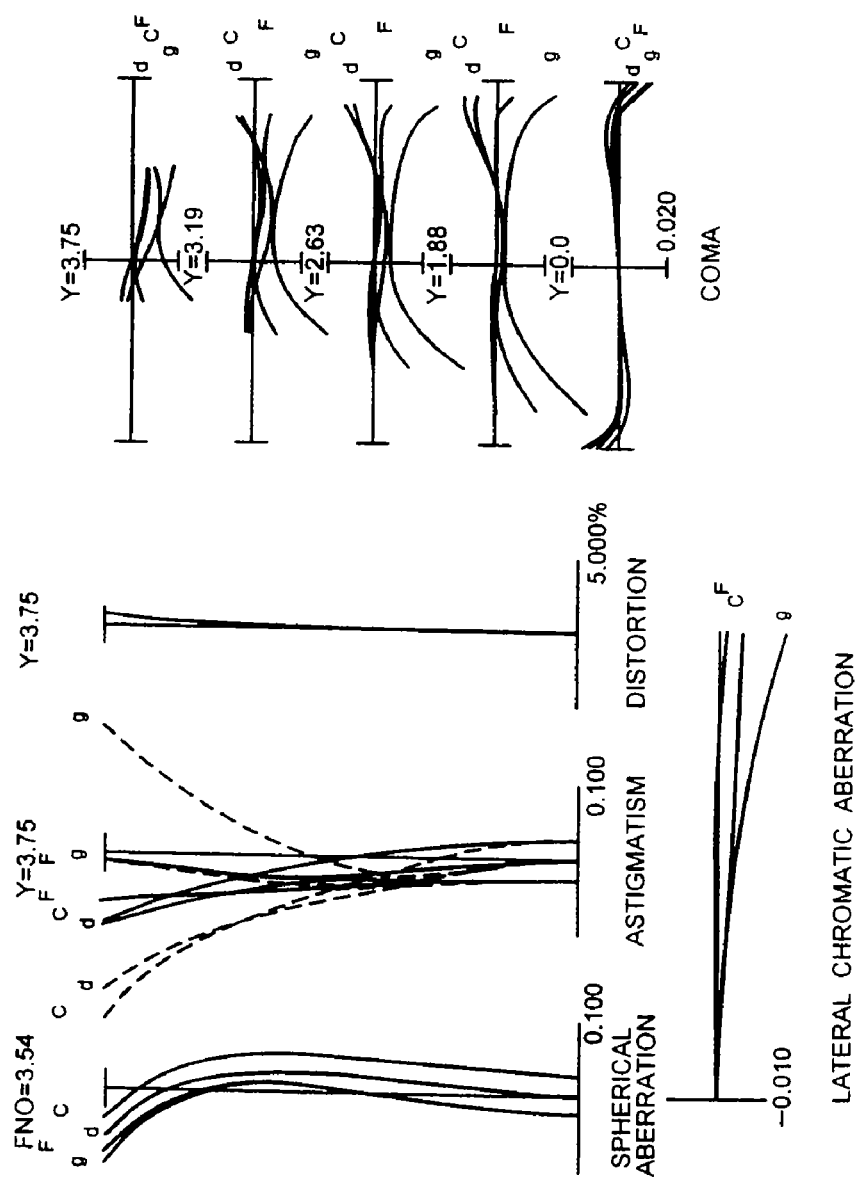
Figure 21A:
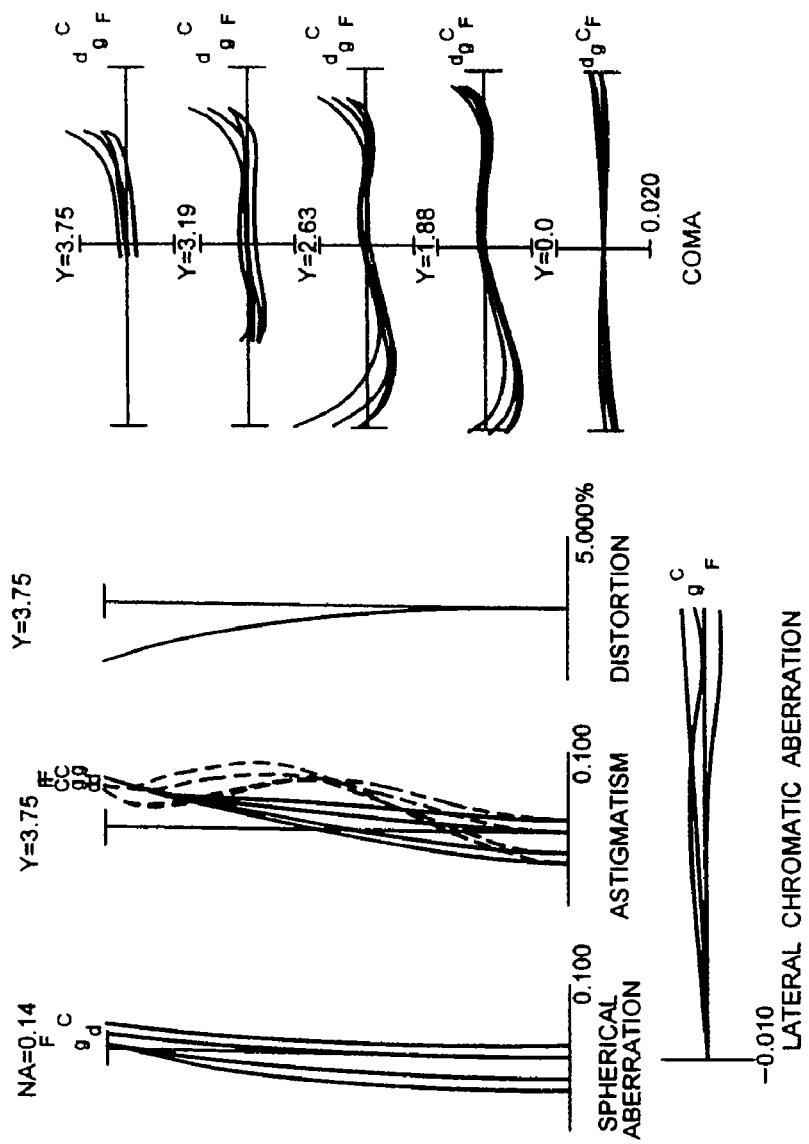
FIGS. 21A-21C are diagrams showing the various types of aberrations in the close photographing distance focusing state of the zoom lens in Example 7.
Figure 21B:
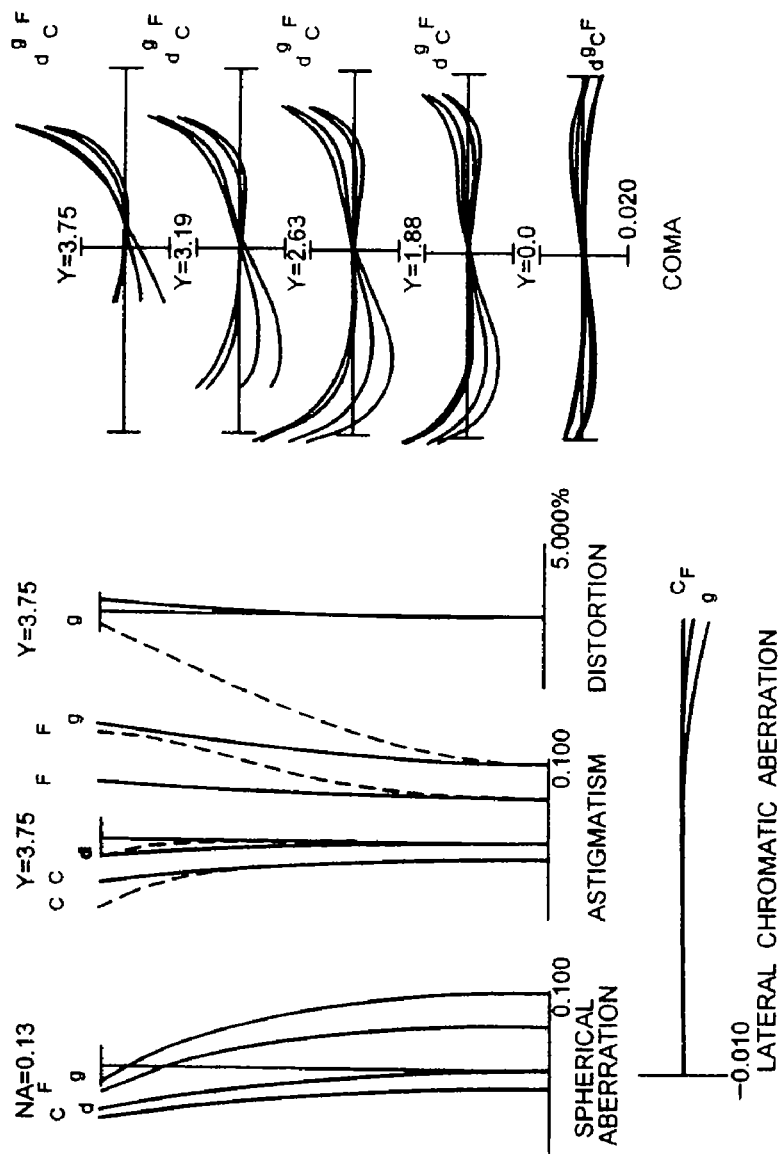
Figure 21C:
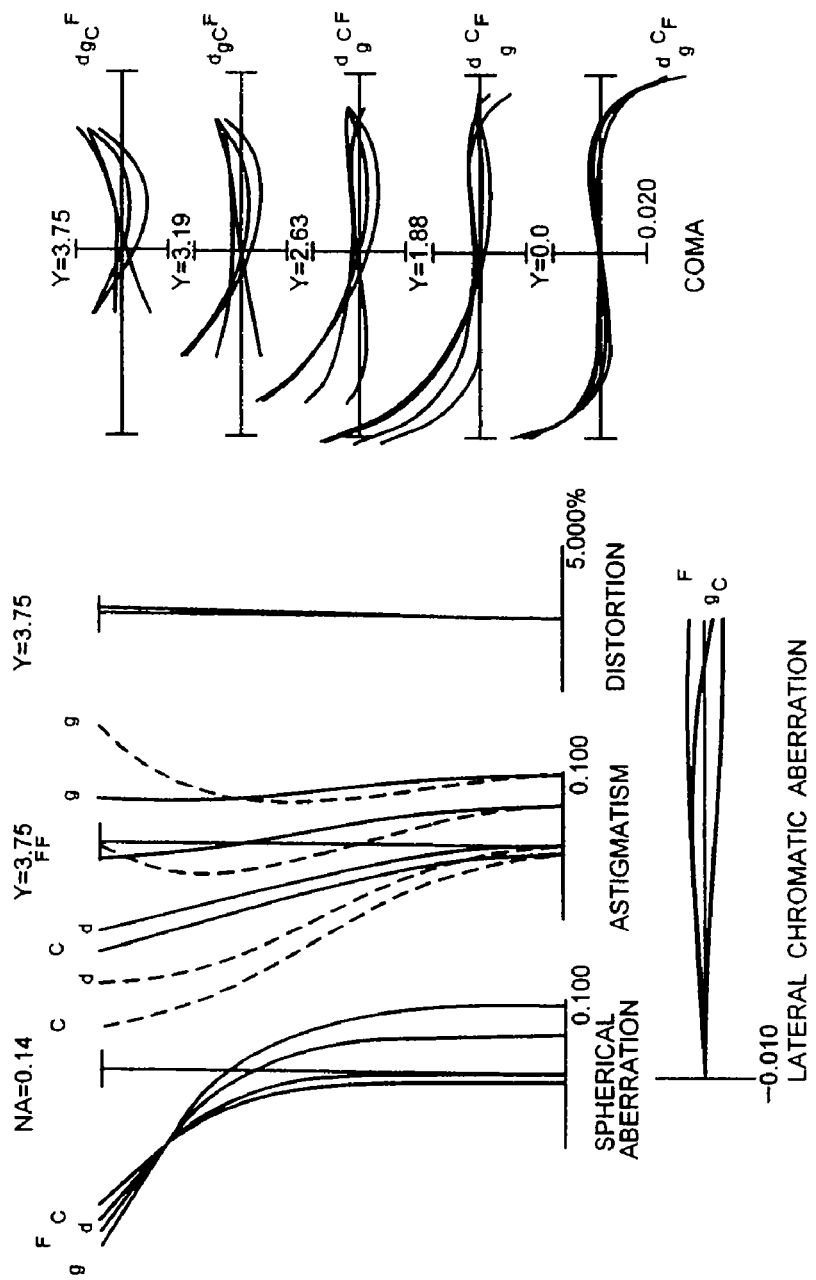

FIGS. 20A-20C are diagrams showing the various types of aberrations in the infinite distance state of the zoom lens in Example 7; FIG. 20A showing the respective aberrations in the wide-angle end state; FIG. 20B showing the aberrations in the intermediate focal length state; and FIG. 20C showing the aberrations in the telephoto end state. FIGS. 21A-21C are diagrams showing the various types of aberrations in the close photographing distance focusing state of the zoom lens in Example 7; FIG. 21A showing the respective aberrations when Rw=204 mm; FIG. 21B showing the aberrations when Rm=737 mm; and FIG. 21C showing the aberrations when Rt=516 mm.

It is recognized from the individual aberration diagrams that the zoom lens according to Example 7 exhibits an excellent image forming characteristic, wherein the various aberrations are well corrected over a range covering the wide-angle end state through the telephoto end state and further covering when making the vibration-reduction correction in each state.

Example 8

Figure 22:
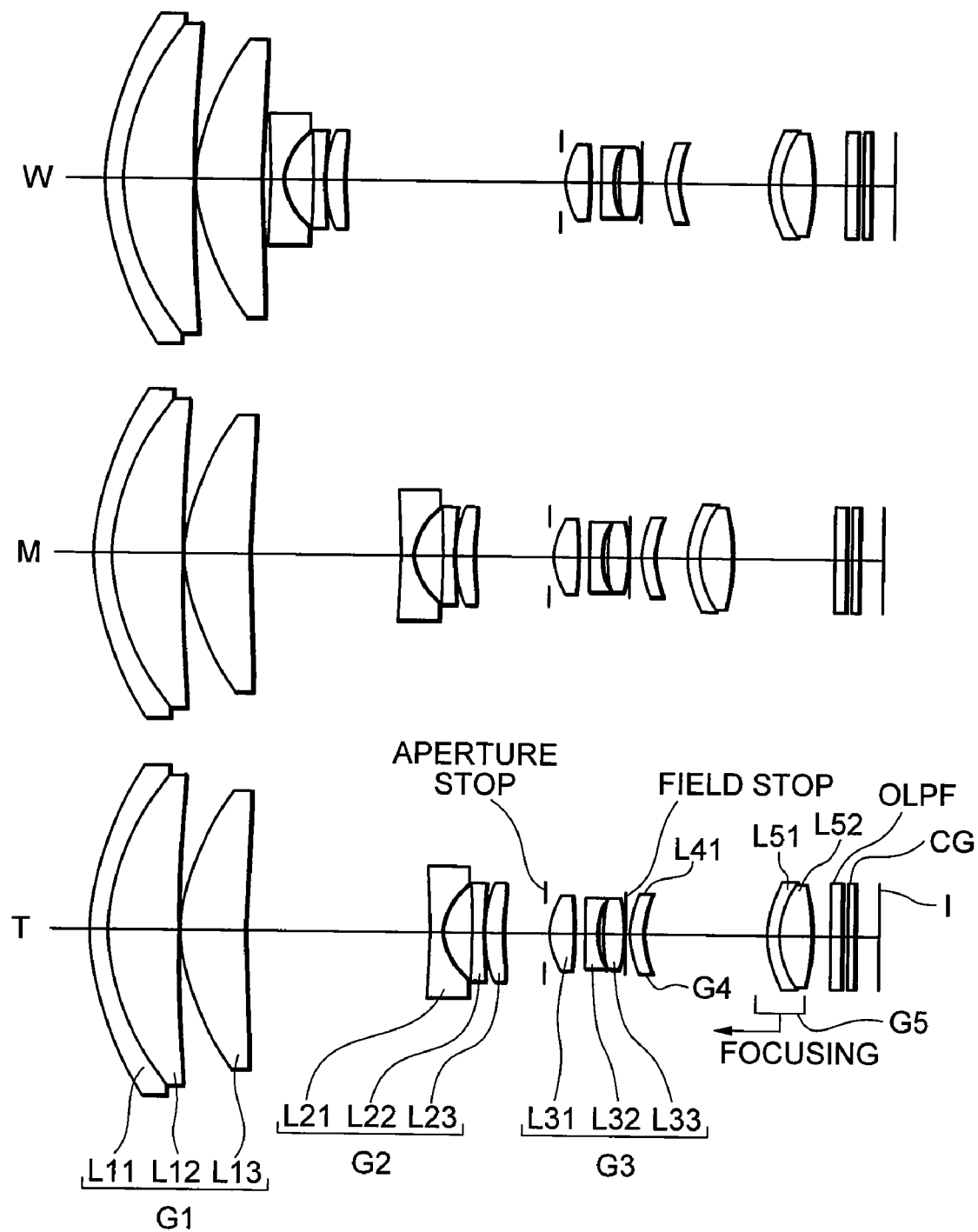
FIG. 22 is a diagram showing a lens configuration of the zoom lens according to Example 8, wherein W represents the wide-angle end state, M connotes the intermediate focal length state, and T represents the telephoto end sate, respectively.

FIG. 22 is a diagram showing a lens configuration of the zoom lens according to Example 8.

The zoom lens according to Example 8 is composed of, in order from the object side, a first lens group G1 with positive refractive power, a second lens group G2 with negative refractive power, an aperture stop, a third lens group G3 with positive refractive power, a field stop, a fourth lens group G4 with positive refractive power, a fifth lens group G5 with positive refractive power, an optical low-pass filter OLPF and a cover glass CG of the solid-state imaging device disposed on the image plane I.

The first lens group G1 is composed of, in order from the object side, a cemented lens of a negative meniscus lens L11 having a convex surface on the object side cemented with a positive meniscus lens L12 having a convex surface on the object side, and a positive lens L13 of which a radius of curvature on the object side is smaller than ⅙ of an absolute value of a radius of curvature on the image side.

The second lens group G2 is composed of, in order from the object side, a negative lens L21 having a concave surface on the image side, a negative lens L22 having a concave surface on the image side, and a positive meniscus lens L23 having a convex surface on the object side.

The third lens group G3 is composed of, in order from the object side, a positive lens L31 having a convex surface on the object side, a negative lens L32 having a concave surface on the image side and a positive lens L33 having a convex surface on the image side.

The fourth lens group G4 is composed of a negative meniscus lens L41 having a convex surface on the object side.

The fifth lens group G5 is composed of, in order from the object side, a cemented lens of a negative meniscus lens L51 having a convex surface on the object side cemented with a biconvex positive lens L52.

Formed as aspherical surfaces are the object side surface of the positive meniscus lens L13, the image side surface of the negative lens L21 having a concave surface on the image side, the object side surface of the positive lens L31 having a convex surface on the object side, the object side surface of the positive lens L41 having a convex surface on the object side and the image side surface of the biconvex positive lens L52.

Upon zooming from a wide-angle end state W to a telephoto end state T, the first lens group G1 is fixed, the second lens group G2 moves toward the image plane I, the third lens group G3 is fixed, the fourth lens group G4 moves toward the object side, and the fifth lens group G5 moves along the optical axis with a zooming locus having a convex shape on the object side.

On the occasion of focusing when the photographing object is at a finite distance, the fifth lens group G5 moves along the optical axis. Further, a diagonal length IH from the center of the solid-state imaging device according to Example 8 to a corner is on the order of 3.75 mm.

Table 8 given below shows values in the data table of the zoom lens according to Example 8.

TABLE 8

[Specifications]

| | W | M | T |
|---|---|---|---|
| f = | 6.55 | 30.00 | 61.00 |
| FNO = | 3.9 | 4.0 | 4.0 |

[Lens Data]

| | r | d | νd | nd |
|---|---|---|---|---|
| 1) | 25.9550 | 1.4000 | 20.88 | 1.922860 |
| 2) | 20.8100 | 5.9000 | 90.22 | 1.456500 |
| 3) | 222.0859 | 0.1000 | | |
| 4) | 17.1799 | 5.3000 | 90.91 | 1.454570 |
| 5) | 331.1581 | (d5) | | |
| 6) | −55.2024 | 1.0000 | 40.10 | 1.851350 |
| 7) | 4.0941 | 2.5000 | | |
| 8) | −52.5834 | 1.0000 | 40.77 | 1.883000 |
| 9) | 36.3122 | 0.1000 | | |
| 10) | 10.8248 | 1.5000 | 17.98 | 1.945950 |
| 11) | 42.0827 | (d11) | | |
| 12> | 0.0000 | 0.3000 | Aperture Stop | |
| 13) | 5.3590 | 2.1000 | 63.97 | 1.514280 |
| 14) | −18.4083 | 0.9000 | | |
| 15) | −105.1597 | 1.0000 | 42.72 | 1.834810 |
| 16) | 6.1759 | 0.5000 | | |
| 17) | 14.0411 | 1.8000 | 91.20 | 1.456000 |
| 18) | −12.8987 | 0.0000 | | |
| 19) | 0.0000 | (d19) | | |
| 20) | 7.6567 | 1.0000 | 82.56 | 1.497820 |
| 21) | 7.8294 | (d21) | | |
| 22) | 9.4449 | 1.0000 | 25.46 | 2.000690 |
| 23) | 6.5133 | 2.6000 | 91.30 | 1.455590 |
| 24) | −46.4002 | (d24) | | |
| 25) | 0.0000 | 0.9000 | 70.51 | 1.544370 |
| 26) | 0.0000 | 0.5000 | | |
| 27) | 0.0000 | 0.5000 | 64.12 | 1.516800 |
| 28) | 0.0000 | Bf | | |

[Aspherical Data]

Surface Number: 4

K = 0.5000
C4 = 3.64110E−06

TABLE 8-continued

C6 = 0.00000E+00
C8 = 0.00000E+00
Surface Number: 7

K = −0.8224
C4 = 2.14650E−03
C6 = −2.55770E−05
C8 = 0.00000E+00
Surface Number: 13

K = 0.3073
C4 = −1.33760E−04
C6 = 0.00000E+00
C8 = 0.00000E+00
Surface Number: 20

K = 0.4401
C4 = 0.00000E+00
C6 = 0.00000E+00
C8 = 0.00000E+00
Surface Number: 24

K = −99.0000
C4 = −3.15800E−04
C6 = 0.00000E+00
C8 = 0.00000E+00

[Variable Distances]

|  | W | M | T |
|---|---|---|---|
| Focusing on infinity | | | |
| f | 6.55000 | 30.00000 | 60.10000 |
| D0 | ∞ | ∞ | ∞ |
| d5 | 0.74690 | 12.21974 | 15.17127 |
| d11 | 17.63827 | 6.16543 | 3.21390 |
| d19 | 1.99764 | 0.85035 | 0.55520 |
| d21 | 7.68233 | 2.90191 | 10.59213 |
| d24 | 2.87011 | 8.79782 | 1.40275 |
| Bf | 2.04158 | 2.04158 | 2.04158 |
| TL | 64.87683 | 64.87683 | 64.87683 |
| Focusing on a close object | | | |
| β | −0.04000 | −0.04000 | −0.10000 |
| D0 | 140.7636 | 667.4376 | 435.3158 |
| d5 | 0.65678 | 12.21974 | 15.17127 |
| d11 | 17.72839 | 6.16543 | 3.21390 |
| d19 | 2.00665 | 0.85035 | 0.55520 |
| d21 | 7.26838 | 1.41864 | 1.84668 |
| d24 | 3.27505 | 10.28109 | 10.14820 |
| Bf | 2.04158 | 2.04158 | 2.04158 |
| TL | 64.87683 | 64.87683 | 64.87683 |

[Values for Conditional Expressions]

(1): Np = 1.4725
(2): νp = 85.03
(3): F1/Fw = 4.358
(4): Nn = 1.9195
(5): νn = 29.69
(6): F2/Fw = −0.835
(7): N2 = 1.8934

Figure 23A:
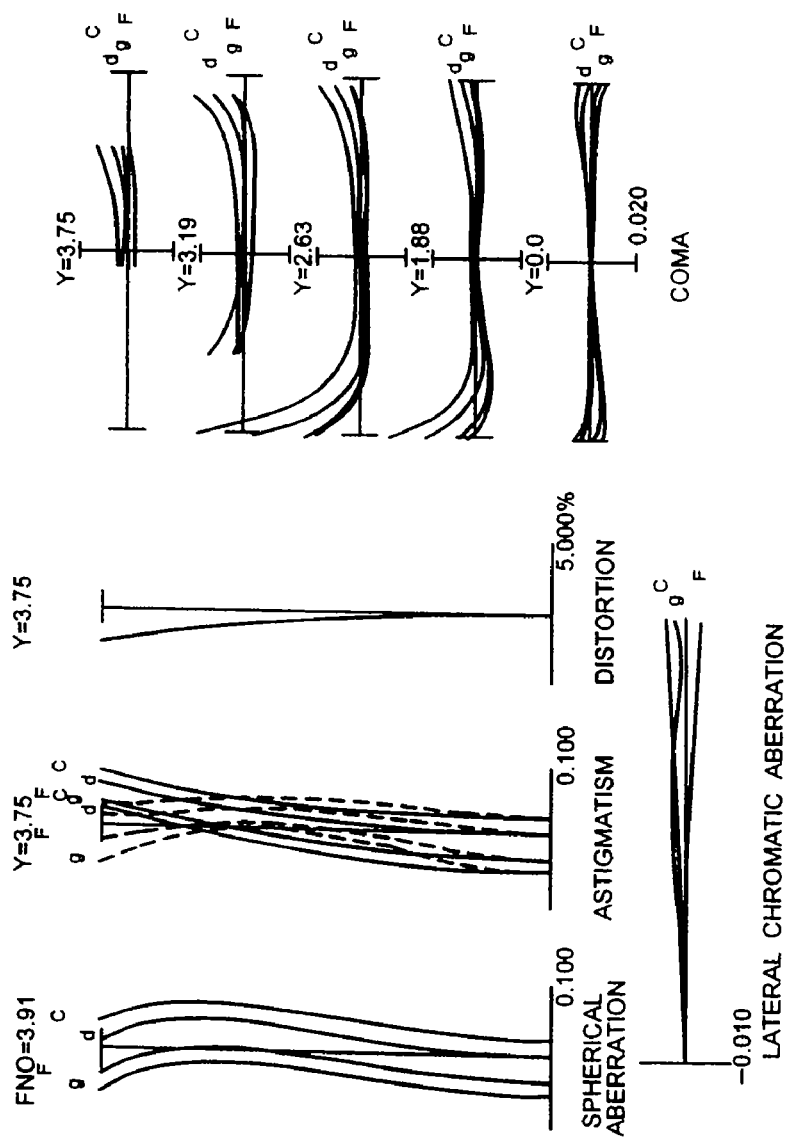
FIGS. 23A-23C are diagrams showing the various types of aberrations in the infinite distance state of the zoom lens in Example 8.
Figure 23B:
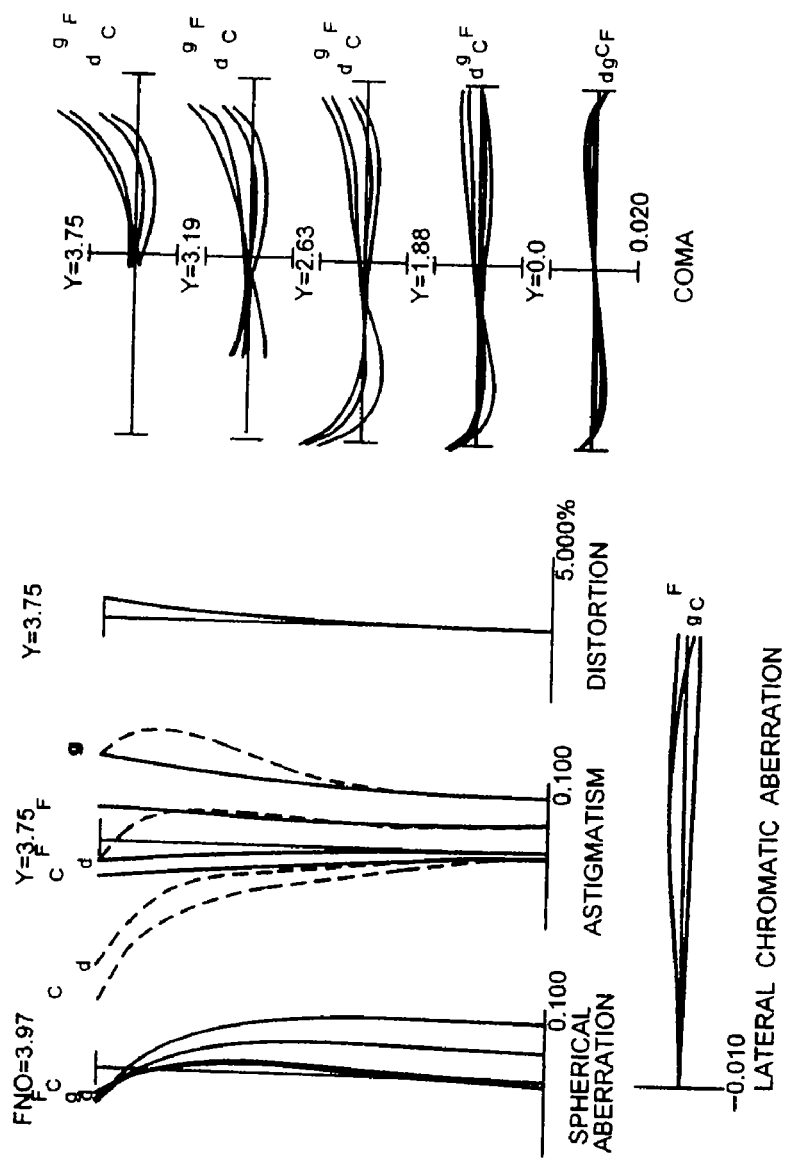
Figure 23C:
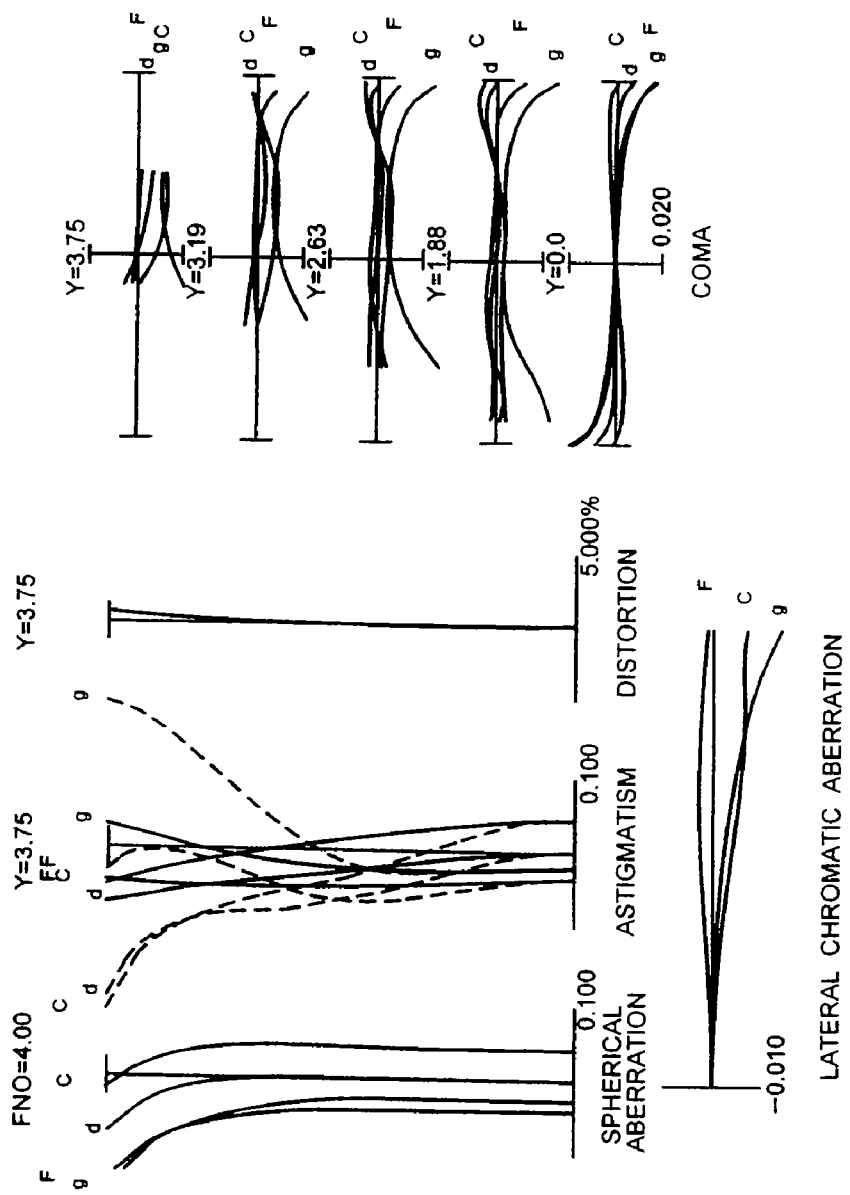
Figure 24A:
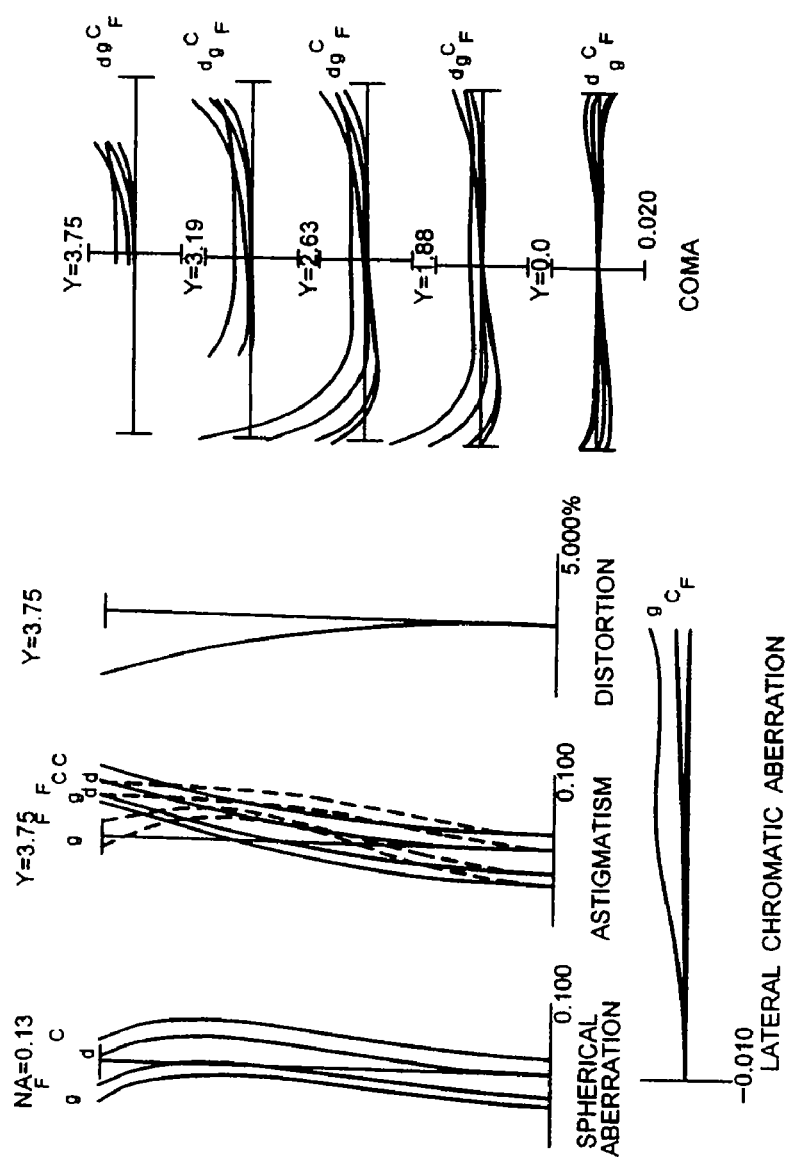
FIGS. 24A-24C are diagrams showing the various types of aberrations in the close photographing distance focusing state of the zoom lens in Example 8.
Figure 24B:
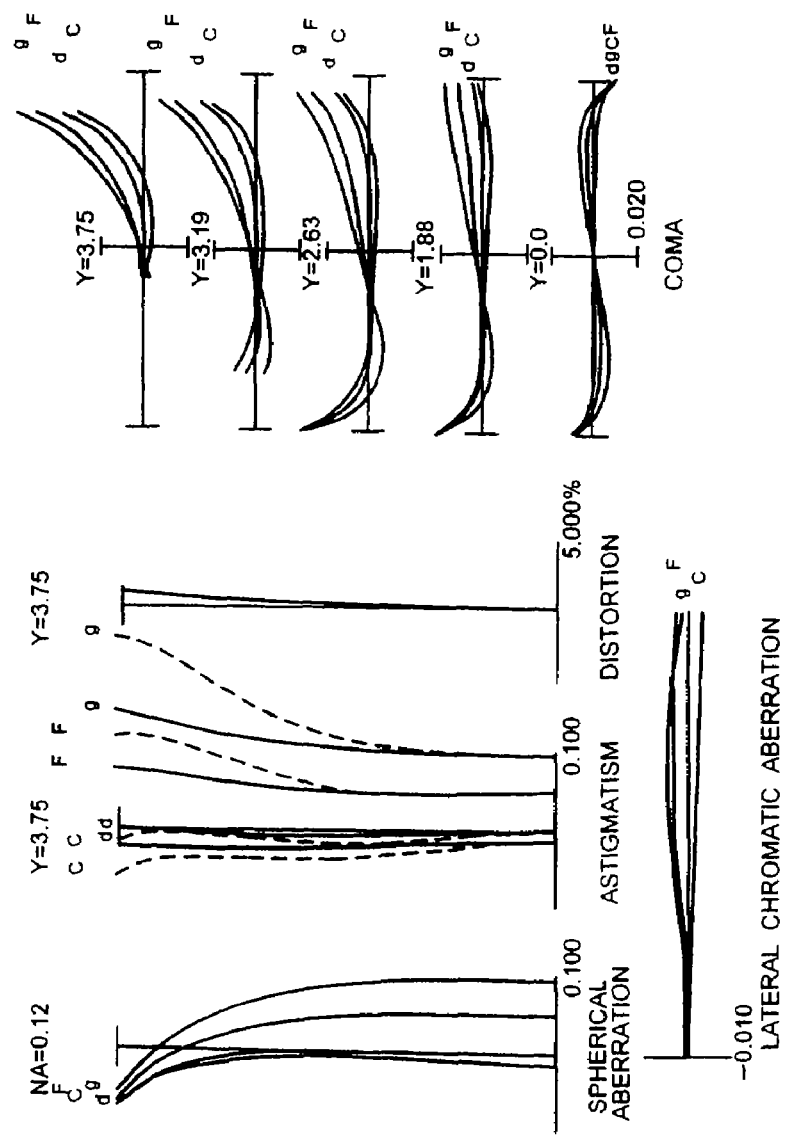
Figure 24C:
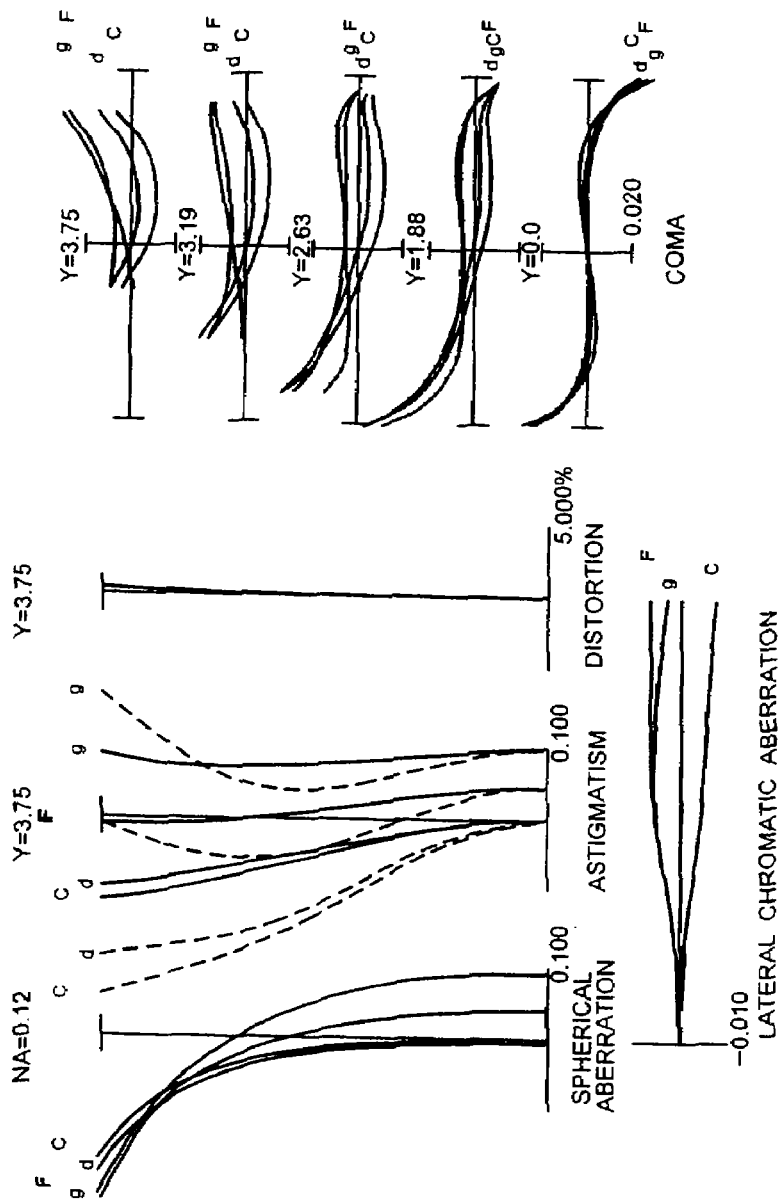

FIGS. 23A-23C are diagrams showing the various types of aberrations in the infinite distance state of the zoom lens in Example 8; FIG. 23A showing the respective aberrations in the wide-angle end state; FIG. 23B showing the aberrations in the intermediate focal length state; and FIG. 23C shows the aberrations in the telephoto end state. FIGS. 24A-24C are diagrams showing the various types of aberrations in the close photographing distance focusing state of the zoom lens in Example 8; FIG. 24A showing the respective aberrations when Rw=206 mm; FIG. 24B showing the aberrations when Rm=732 mm; and FIG. 24C showing the aberrations when Rt=500 mm.

It is recognized from the individual aberration diagrams that the zoom lens according to Example 8 exhibits an excellent image forming characteristic, wherein the various aberrations are well corrected over a range covering the wide-angle end state through the telephoto end state and further covering when making the vibration-reduction correction in each state.

A camera including the zoom lens according to the embodiment will hereinafter be described.

Figure 25A:
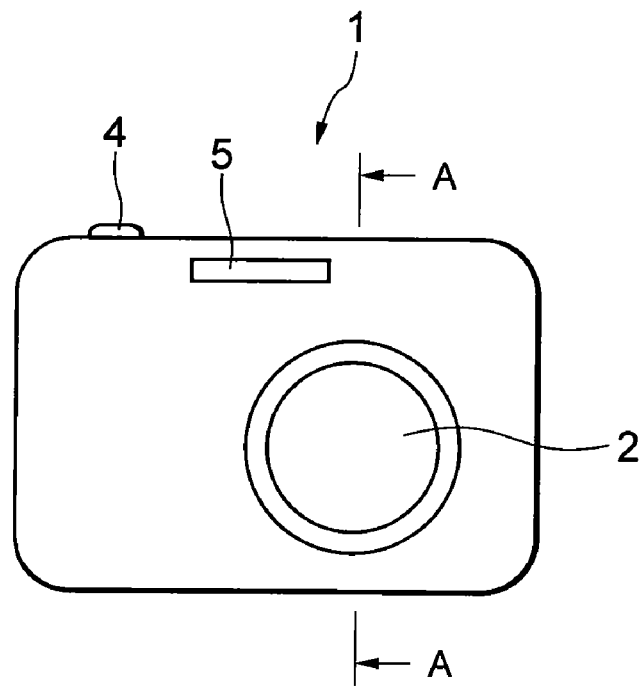
FIGS. 25A and 25B are views illustrating an electronic still camera incorporating the zoom lens according to the embodiment.
Figure 25B:
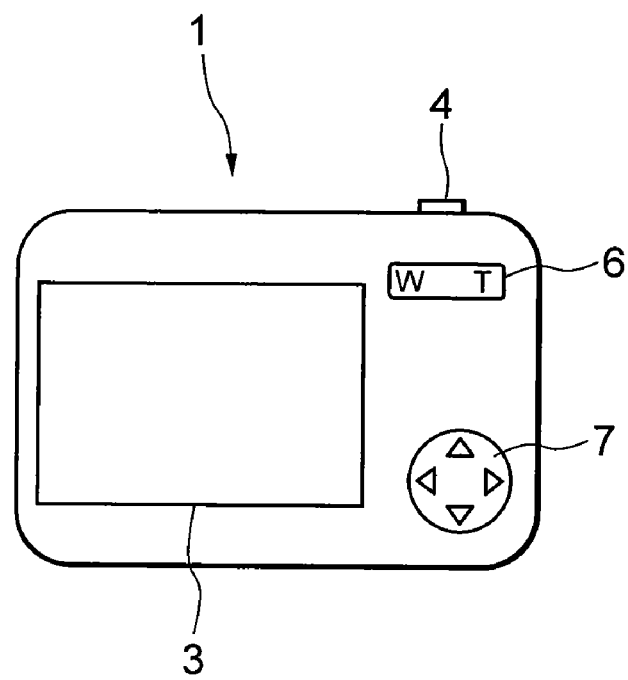
Figure 26:
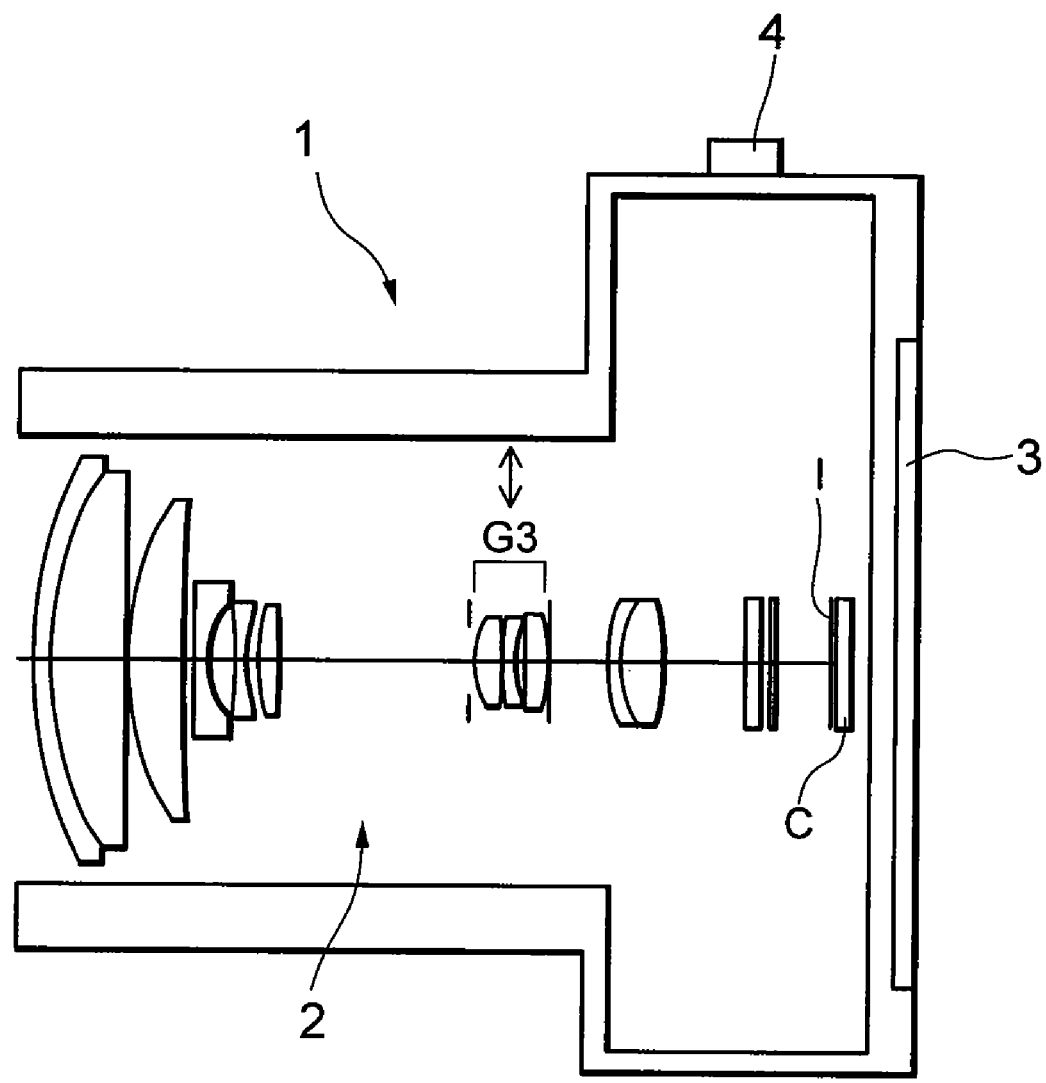
FIG. 26 is a sectional view taken along the line A-A in FIG. 25A.

FIGS. 25A and 25B illustrate an electronic still camera incorporating the zoom lens according to the embodiment. FIG. 25A is a front view thereof, and FIG. 25B is a rear view thereof. FIG. 26 is a sectional view taken along the line A-A in FIG. 25A.

Referring to FIGS. 25A, 25B and 26, in an electronic still camera 1 (which will hereinafter be simply termed the camera), when pressing an unillustrated power button, an unillustrated shutter of a photographing lens 2 is released, then the light beams from an unillustrated object are converged through the photographing lens 2, thereby forming an image on imaging device C (e.g., a CCD (Charge Coupled Device), a CMOS (Complementary Metal Oxide Semiconductor), etc) disposed on the image plane I. The object image formed on the imaging device C is displayed on a liquid crystal monitor 3 disposed at the back of the camera 1. A photographer, after determining a composition of the object image while seeing the liquid crystal monitor 3, presses down a release button 4 to capture the image with the imaging device C, and records and stores the image in an unillustrated memory. On this occasion, a shake of the camera 1, which is caused by a movement of the hands, is detected by an unillustrated angular velocity sensor built in the camera 1. Then, a vibration-reduction lens G3 provided in the photographing lens 2 is shifted in the direction perpendicular to the optical axis of the photographing lens 2 by an unillustrated vibration-reduction mechanism, thus correcting an image blur on the image plane I, which occurs due to the shake of the camera 1.

The photographing lens 2 is composed of the zoom lens according to the embodiment that has been described before. Further, the camera 1 includes an auxiliary light emitting unit 5 that emits auxiliary beams of light when the object is dark, a wide-angle (W)-telephoto (T) button 6 used upon zooming the zoom lens as a photographing lens 2 from a wide-angle end state (W) to a telephoto end state (T), and a function button 7 employed for setting a variety of conditions of the camera 1.

Thus, the camera 1 having the built-in zoom lens according to the embodiment is constructed.

As discussed above, according to the present embodiment, a compact zoom lens exhibiting the excellent optical performance can be attained, wherein the various aberrations are well corrected on such a condition that a half angle of view in the telephoto end state is equal to or smaller than 3.0 degrees, a zoom ratio is approximately ten or more, and an f-number in the telephoto end state is equal to or smaller than 5.

Note that in Examples given above, the first lens group and the third lens group are fixed upon zooming, however, what the present application intends is not limited to only the zooming method. For example, if the zooming mechanism of the first lens group is constructed to have less decentering, an available scheme is that the first lens group moves toward the object side, the second lens group moves toward the image side, the third lens group is fixed, and the fourth lens group moves along the convex shape toward the object side.

Moreover, if the vibration-reduction correction mechanism and the zooming mechanism of the third lens group can be set coexisting, another available scheme is that the first lens group is fixed, the second lens group moves toward the image side, the third lens group moves toward the object side, and the lens group closest to the image plane side moves along the convex shape toward the object side.

Further, if the zooming mechanism of the first lens group is constructed to have less decentering and if the vibration-reduction correction mechanism and the zooming mechanism of the third lens group can be set coexisting, still another available scheme is that the first lens group moves toward the object side, the second lens group moves toward the image side, the third lens group moves toward the object side, and the lens group closest to the image surface side moves along the convex shape toward the object side.

Furthermore, Example 1 involves correcting an image blur caused by a so-called camera shake, in a way that deviates the whole third lens group G3 from the center in the direction perpendicular to the optical axis, however, the image blur may be corrected in the other Examples. Moreover, an image blur may also be corrected by moving an arbitrary lens or lens group in the example given above without being limited to the whole third lens group G3 in the direction perpendicular to the optical axis. Further, the fourth lens group G4 may also be composed of one piece of convex lens in order to reduce the cost.

Further, the close distance focusing in each of Examples is performed by the fourth lens group or the fifth lens group defined as the lens group closest to the image plane side. If the zooming mechanism and the close distance focusing mechanism of the first lens group can coexist, however, the close distance focusing may also be conducted by the whole or part of the first lens group.

Further, the working examples have exemplified the 4- or 5-group configuration, however, the present invention can be applied to other types configurations such as a 3- or 6-group configuration.

Moreover, any inconvenience may not be caused by forming the lens surface as an aspherical surface. Further, any types of aspherical surfaces may be taken, such as an aspherical surface formed by a fine-grinding, a glass-mold aspherical surface that involves forming the glass into a shape of the aspherical surface by using a die, and a composite type aspherical surface that involves coating a resin in the shape of the aspherical surface over the glass surface.

Still further, the aperture stop is disposed preferably in the vicinity of the third lens group, however, a lens frame may serve as a substitute for a role of the aperture stop without providing a member for the aperture stop.

Yet further, if an anti-reflection coating having a high transmittance in a broad wavelength range is coated over each of the lens surfaces, it is possible to attain the optical performance having a high contrast by reducing a flare and a ghost.

It should be noted that the discussion has been made with the requirements for the configuration in the embodiment in order to facilitate the understanding of the present invention, however, as a matter of course, the present invention is not limited to this mode.

What is claimed is:

1. A zoom lens comprising:
   a plurality of lens groups,
   the plurality of lens groups including at least three lens groups with positive refractive power,
   each of the at least three lens groups with positive refractive power having a positive lens,
   wherein the following conditional expressions are satisfied:

$1.440 < Np < 1.525$ $70.0 < vp < 92.0$ where Np is an average refractive index of all positive lenses of the at least three lens groups with positive refractive power, and vp denotes an average Abbe number of the positive lenses.

2. The zoom lens according to claim 1, wherein the plurality of lens groups includes, in order from an object side, a first lens group with positive refractive power, a second lens group with negative refractive power, a third lens group with positive refractive power and a fourth lens group with positive refractive power, and
   the at least three lens groups with positive refractive power are the first lens group, the third lens group and the fourth lens group.

3. The zoom lens according to claim 2, wherein the first lens group with positive refractive power includes an aspherical surface.

4. The zoom lens according to claim 2, wherein the following conditional expression is satisfied:

$3.00 < F1/Fw < 5.50$ where Fw is a focal length in a wide-angle end state, and F1 is a focal length of the first lens group.

5. The zoom lens according to claim 2, wherein the following conditional expression is satisfied:

$1.900 < Nn < 2.000$ where Nn is an average refractive index of negative lenses of the first lens group, the third lens group and the fourth lens group in the plurality of lens groups.

6. The zoom lens according to 2, wherein the following conditional expression is satisfied:

$27.0 < vn < 40.0$ where vn is an average Abbe number of negative lenses of the first lens group, the third lens group and the fourth lens group in the plurality of lens groups.

7. The zoom lens according to claim 2, wherein a concave surface of the second lens group has an aspherical surface, and
   the following conditional expression is satisfied:

$-1.00 < F2/Fw < -0.50$ where F2 is a focal length of the second lens group, and Fw is a focal length of the zoom lens in the wide-angle end state.

8. The zoom lens according to claim 2, wherein the following conditional expression is satisfied:

$1.85 < N2 < 1.95$ where N2 is an average refractive index of all of the lenses in the second lens group.

9. The zoom lens according to claim 2, wherein upon zooming from a wide-angle end state to a telephoto end state, a distance between the first lens group and the second lens group increases, while a distance between the second lens group and the third lens group decreases, and the lens group closest to an image plane side in the plurality of lens groups moves along an optical axis.

10. The zoom lens according to claim 1, wherein each of the at least three lens groups with positive refractive power has a negative lens, and
    the following conditional expression is satisfied:

$1.900 < Nn < 2.000$ where Nn is an average refractive index of the negative lenses.

11. The zoom lens according to claim 1, wherein each of the at least three lens groups with positive refractive power has a negative lens, and
the following conditional expression is satisfied:

$$27.0 < \nu n < 40.0$$

where νn is an average Abbe number of the negative lenses.

12. The zoom lens according to claim 1, wherein each of the at least three lens groups with positive refractive power has a positive lens including an aspherical surface.

13. An optical apparatus including the zoom lens according to claim 1.

14. The zoom lens according to claim 1, wherein the following conditional expression is satisfied:

$$1.440 < Np < 1.50.$$

15. A method for forming an image of an object by a zoom lens, the method comprising steps of:
   providing the zoom lens including:
   a plurality of lens groups,
   the plurality of lens groups including at least three lens groups with positive refractive power,
   each of the at least three lens groups with positive refractive power having a positive lens,
   wherein the following conditional expressions are satisfied:

$$1.440 < Np < 1.525$$

$$70.0 < \nu p < 92.0$$

where Np is an average refractive index of all positive lenses of the at least three lens groups with positive refractive power, and νp denotes an average Abbe number of the positive lenses; and
forming the image of the object by the zoom lens.

16. The method according to claim 15, wherein the plurality of lens groups includes, in order from an object side, a first lens group with positive refractive power, a second lens group with negative refractive power, a third lens group with positive refractive power and a fourth lens group with positive refractive power, and
the at least three lens groups with positive refractive power are the first lens group, the third lens group and the fourth lens group.

17. The method according to claim 15, wherein the following conditional expression is satisfied:

$$1.440 < Np < 1.50.$$

* * * * *